United States Patent [19]
Katsuta et al.

[11] Patent Number: 6,151,478
[45] Date of Patent: Nov. 21, 2000

[54] DOCUMENT FEEDER FOR A COPYING MACHINE

[75] Inventors: Kunihiko Katsuta, deceased, late of Komaki, by Shikou Katsuta, Hiroko Katsuta, legal representatives; Akiyoshi Johdai, Toyokawa; Keiko Toyoda, Toyokawa; Yoshiki Ohmichi, Toyokawa, all of Japan

[73] Assignee: Minolta Co., Ltd., Osaka, Japan

[21] Appl. No.: 08/925,336

[22] Filed: Sep. 8, 1997

[30] Foreign Application Priority Data

Sep. 9, 1996 [JP] Japan .................................... 8-238273
Sep. 9, 1996 [JP] Japan .................................... 8-261468

[51] Int. Cl.$^7$ .............................. G03G 15/00; B65H 5/00
[52] U.S. Cl. ................... 399/372; 271/258.01; 358/498; 399/367; 399/374
[58] Field of Search ..................................... 399/371, 372, 399/373, 374, 367; 271/225, 258.01, 259, 265.02, 270, 902; 358/498, 474

[56] References Cited

U.S. PATENT DOCUMENTS

| | | | |
|---|---|---|---|
| 4,662,738 | 5/1987 | Kasuya | 271/258.01 X |
| 4,775,139 | 10/1988 | Honjo et al. | 271/259 X |
| 4,996,568 | 2/1991 | Hamakawa | 399/372 X |
| 5,453,852 | 9/1995 | Morikawa et al. | 358/498 |
| 5,461,468 | 10/1995 | Dempsey et al. | 399/396 |

FOREIGN PATENT DOCUMENTS

| | | |
|---|---|---|
| 58-176653 | 10/1983 | Japan . |
| 1-236136 | 9/1989 | Japan . |
| 5-122433 | 5/1993 | Japan . |
| 7-114232 | 5/1995 | Japan . |
| 7-319228 | 8/1995 | Japan . |

*Primary Examiner*—Sophia S. Chen
*Attorney, Agent, or Firm*—Burns, Doane, Swecker & Mathis, LLP

[57] ABSTRACT

A document feeder which has a feed roller for feeding a document picked up from a tray toward a reading position, a first pair of rollers which is located immediately before the reading position, a second pair of rollers which is located immediately after the reading position, and a document sensor. After the leading edge of the document transported by the feed roller comes to the first pair of rollers, the feed roller keeps rotating for a specified time, whereby, registration of the document is carried out. In response to a signal which is generated when the document sensor detects the trailing edge of the document, feeding of a next document is started.

8 Claims, 63 Drawing Sheets

FIG. 16a

S4: FEEDING

S41: FEEDING WAIT F. = 0 ?
- NO → (loop back)
- YES ↓

S42: FEED STATE ?
- 0 → S43
- 1 → S45
- 2 → S46
- 3 → S48

S43: SE1 OFF ?
- NO → (return path)
- YES ↓

S44: CL1 ← ON
FEED STATE ← 1

S45: Vn ← REF
M1 ← CW
M1 ← ON
FEED STATE ← 2

S46: SE6 ON-EDGE ?
- NO → (return)
- YES ↓

S47: TMRFA STARTED
SIZE DET. STATE ← 1
FEED STATE ← 3

S48: TMRFA END ?
- NO → D
- YES ↓

S49: CL1 ← OFF
TMRFA RESET
FEED STATE ← 4

RETURN

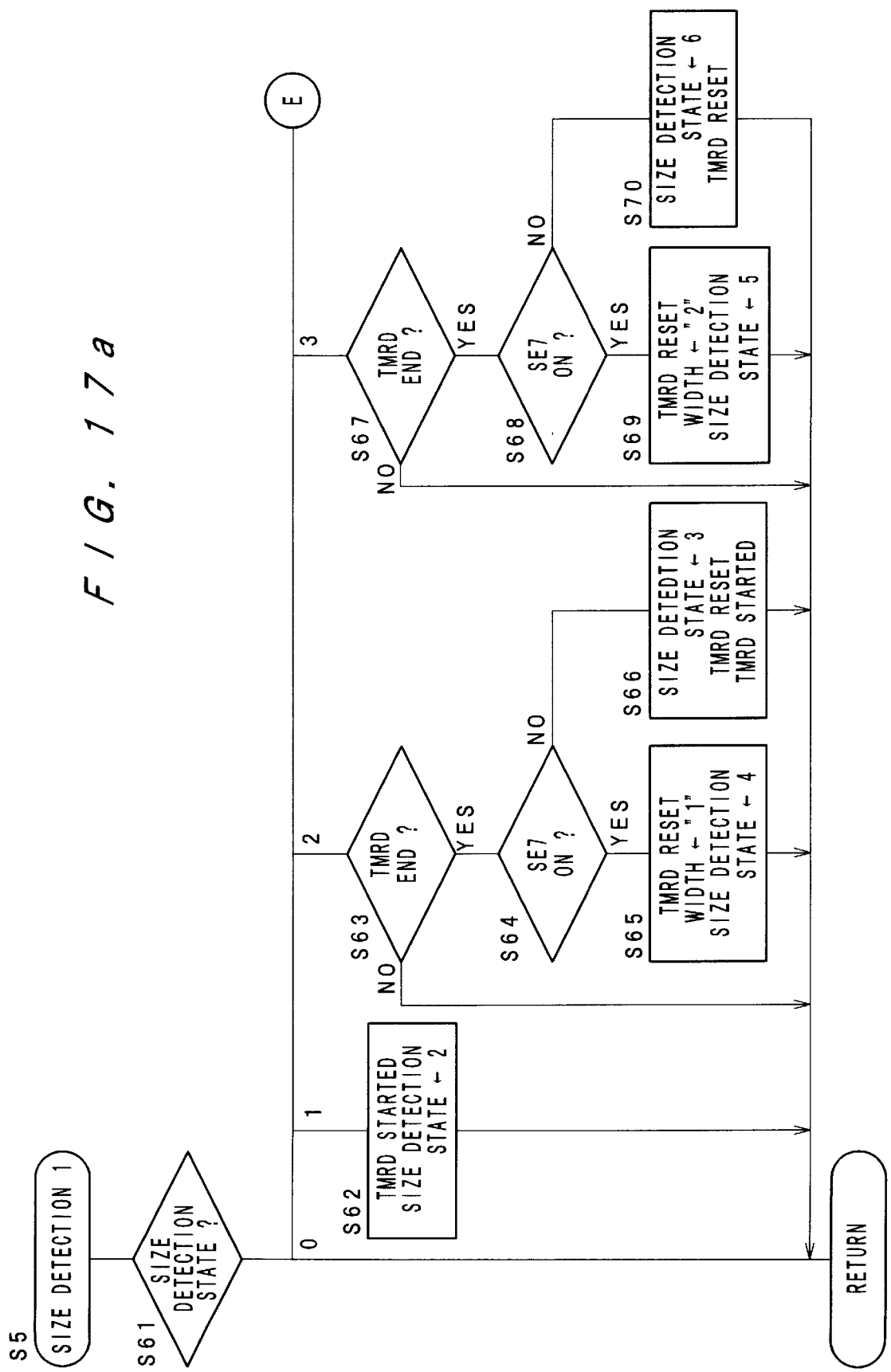

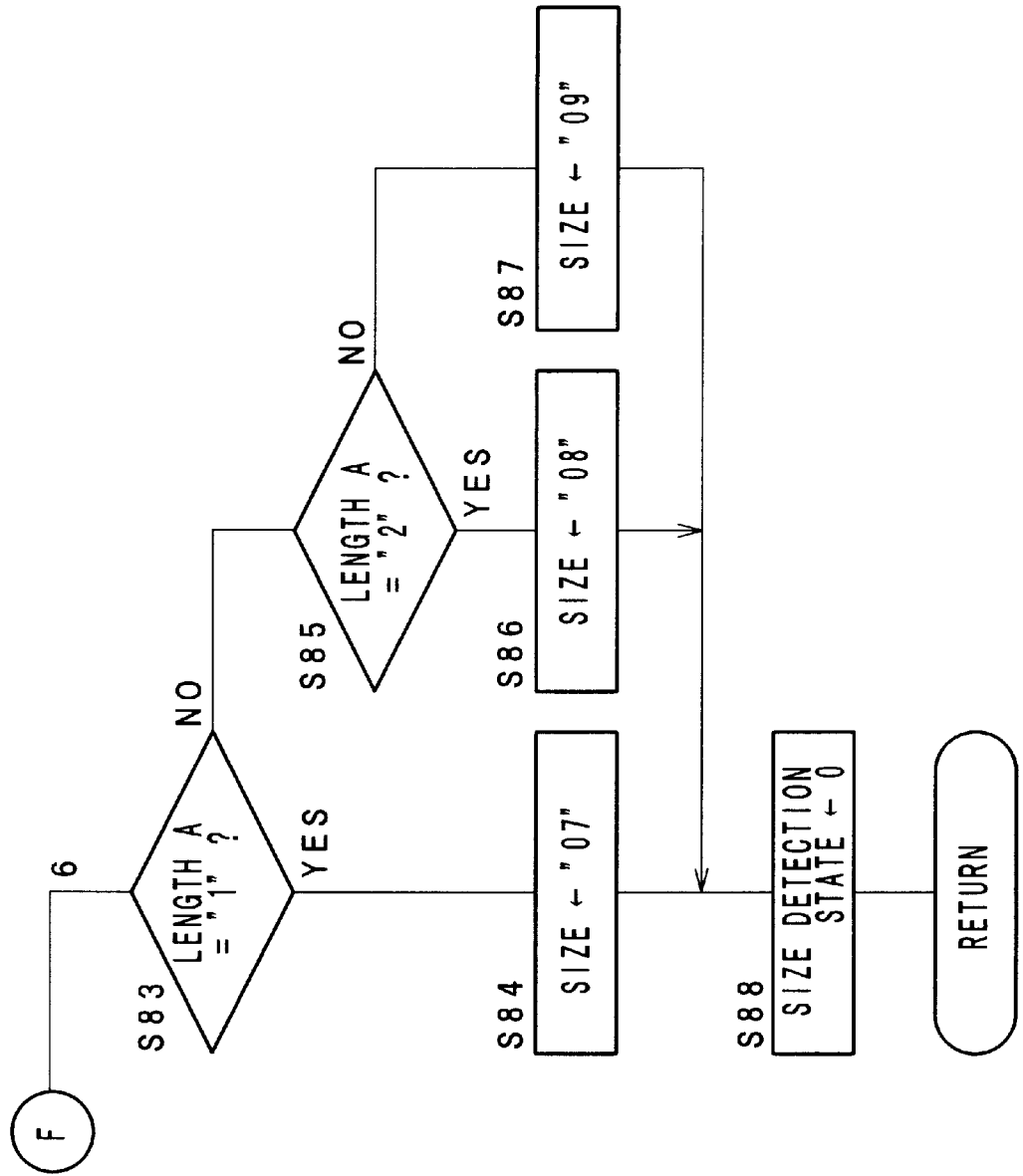

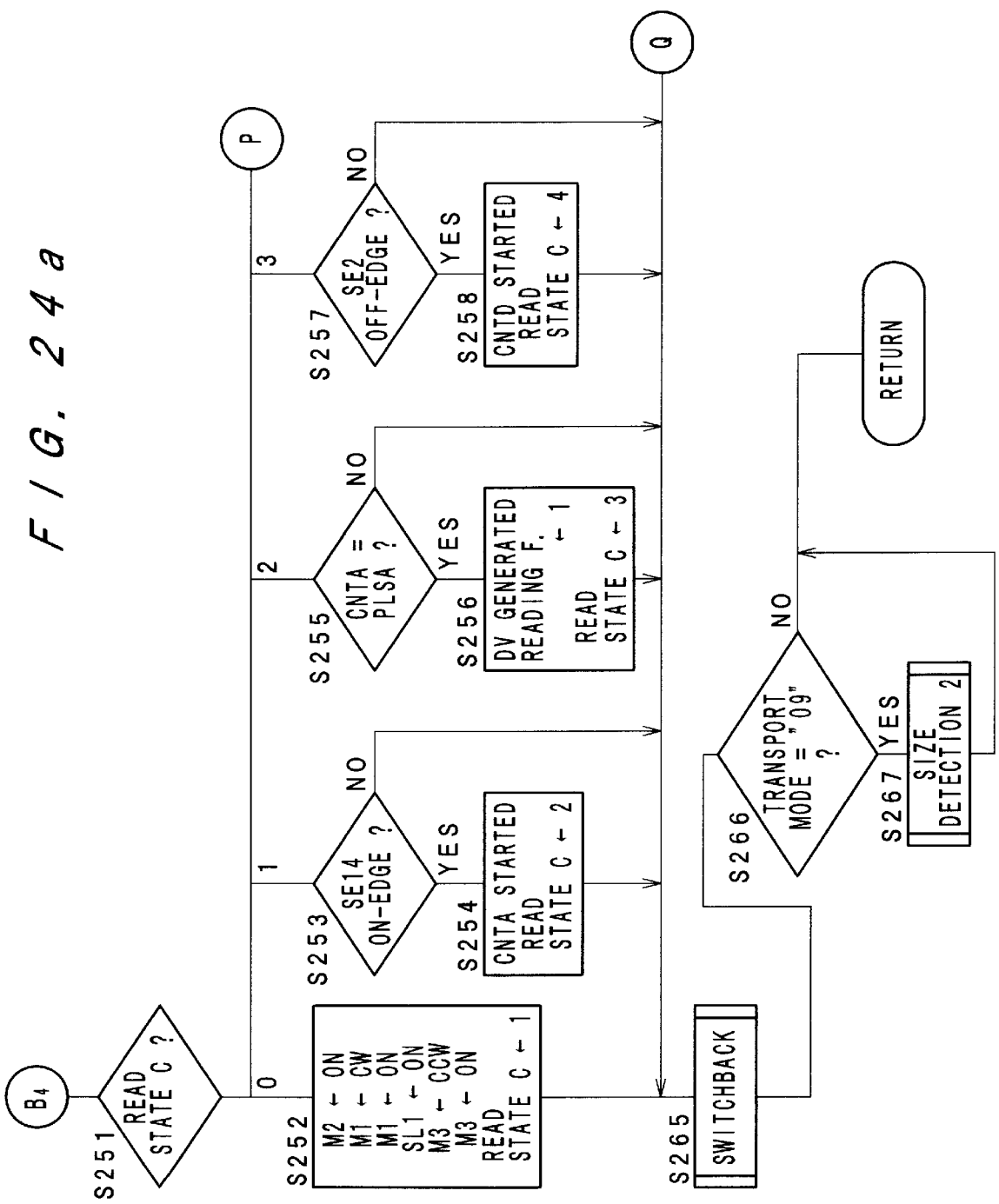

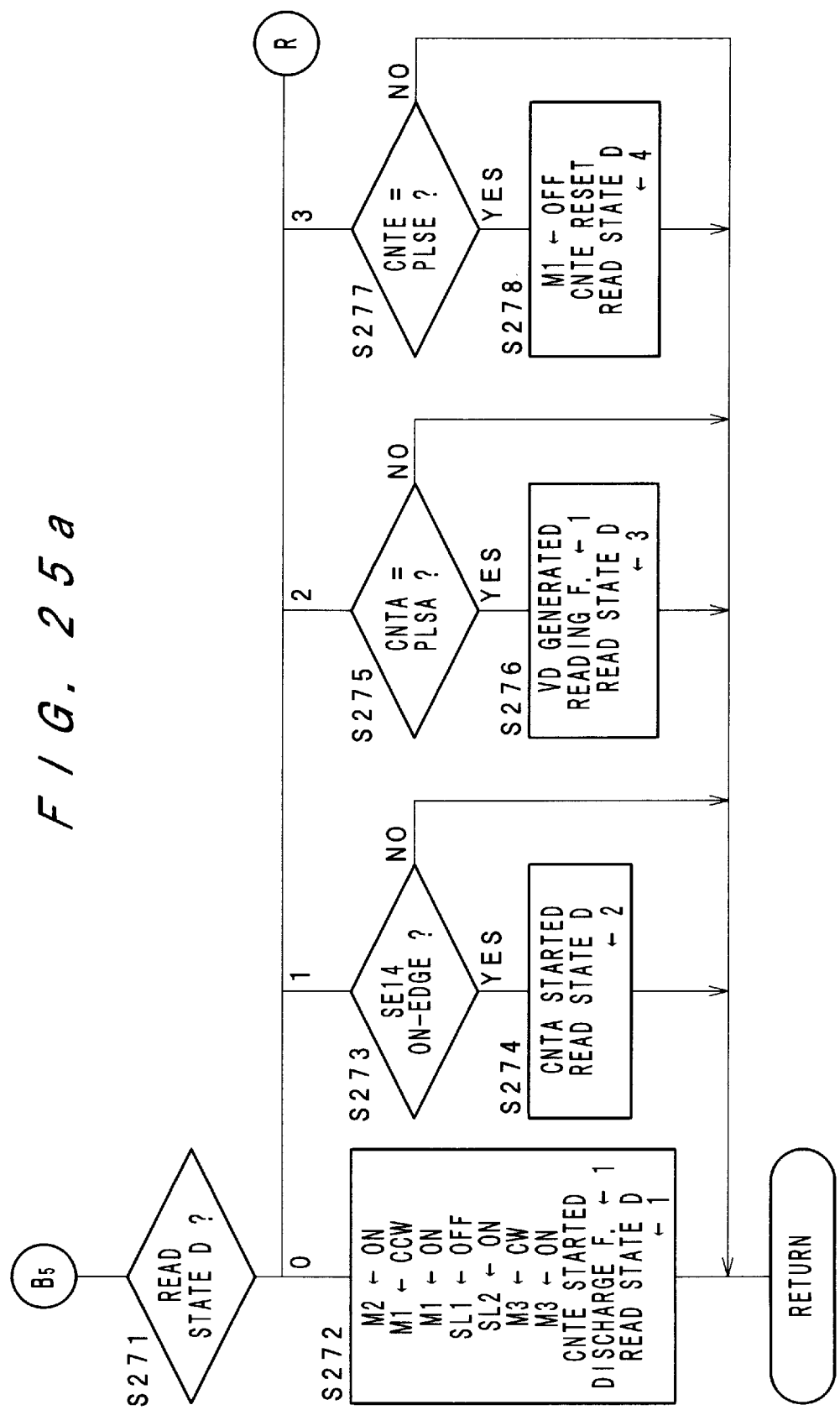
F I G. 25a

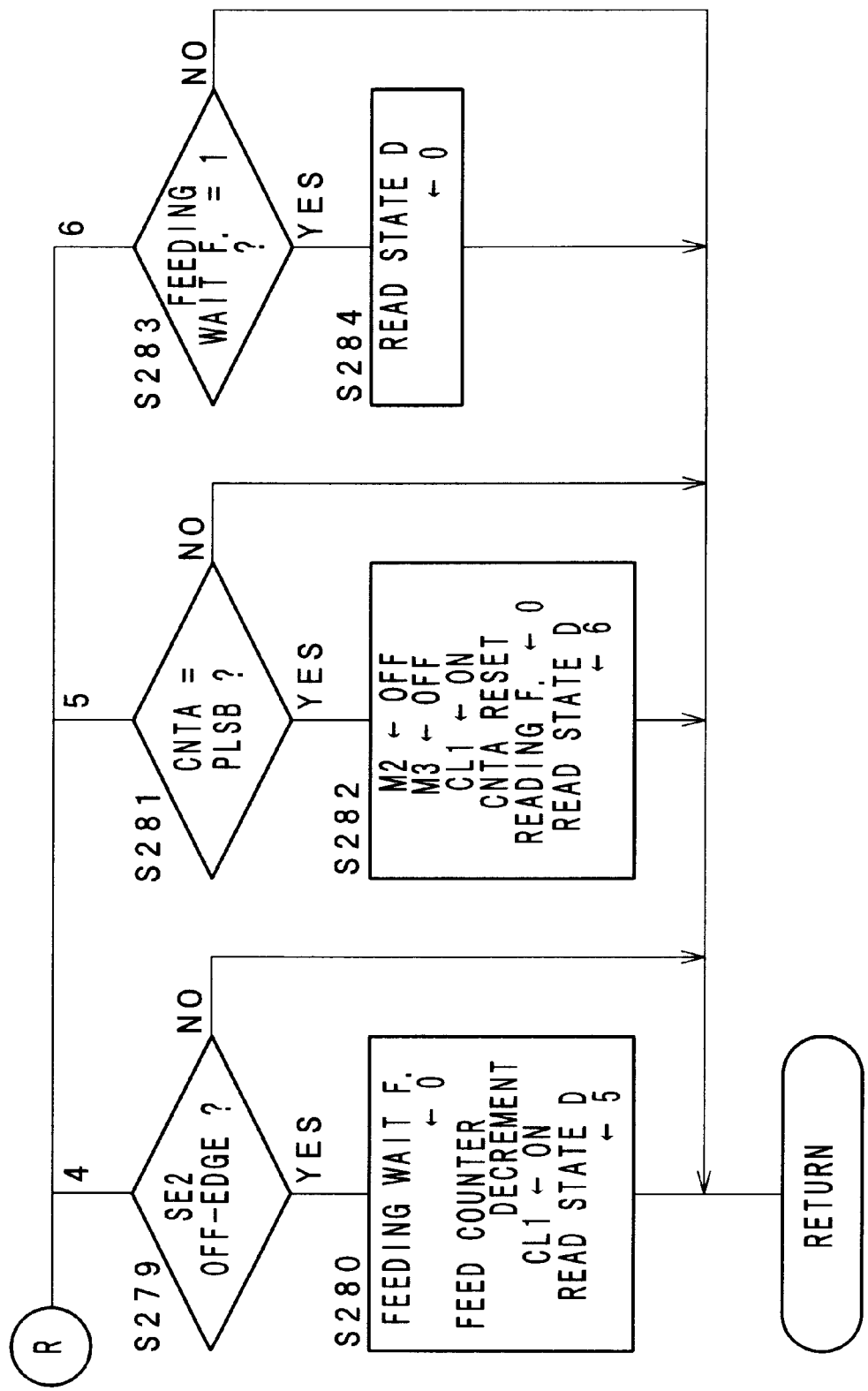

F I G. 34
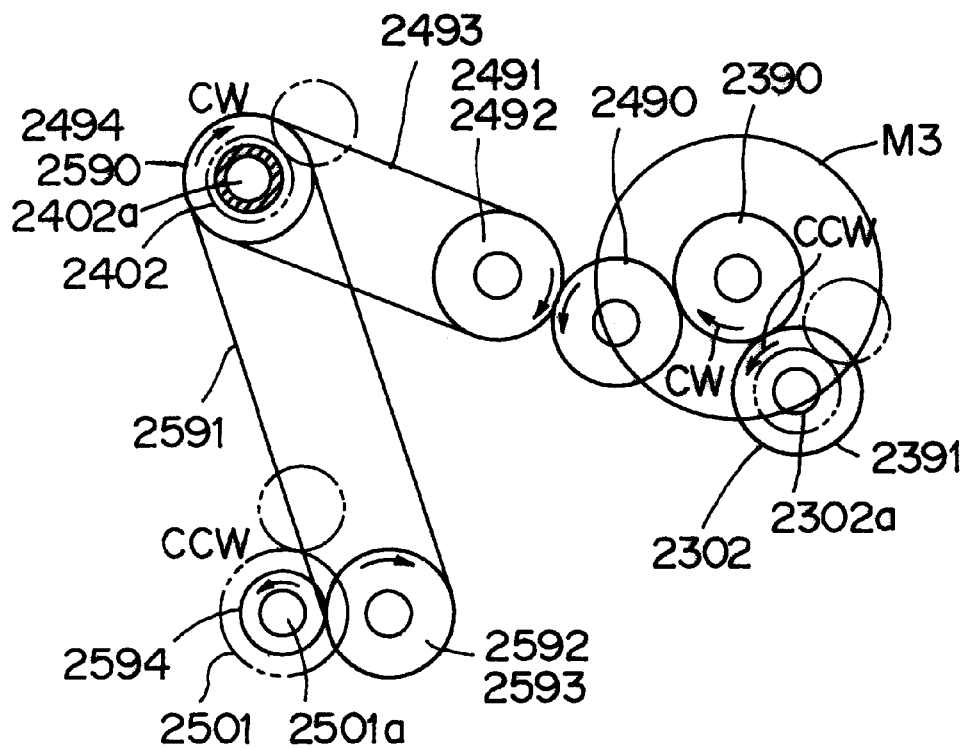
F I G. 35
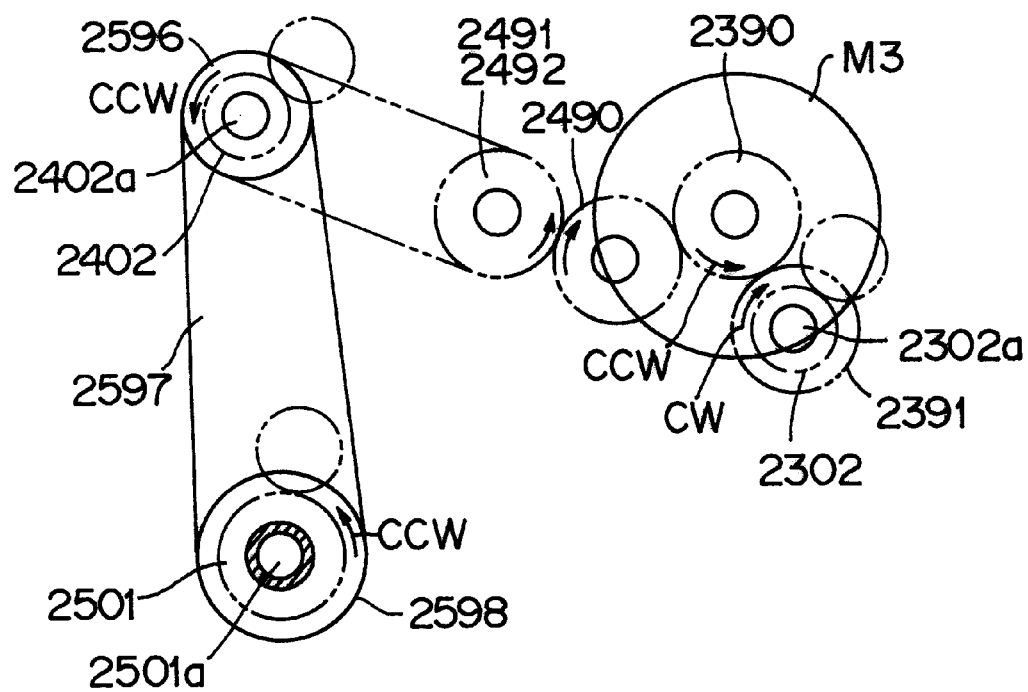

F/G. 37a
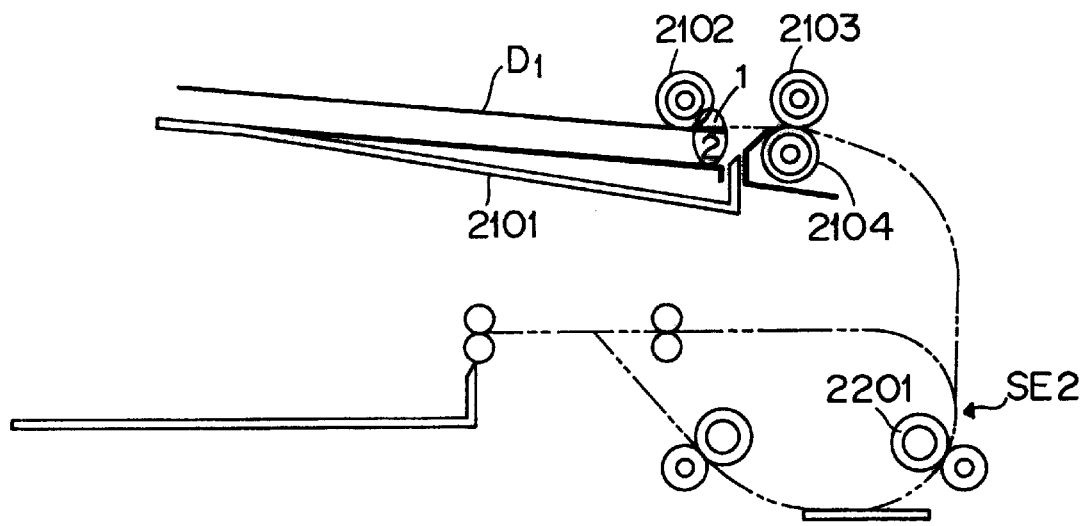
F/G. 37b
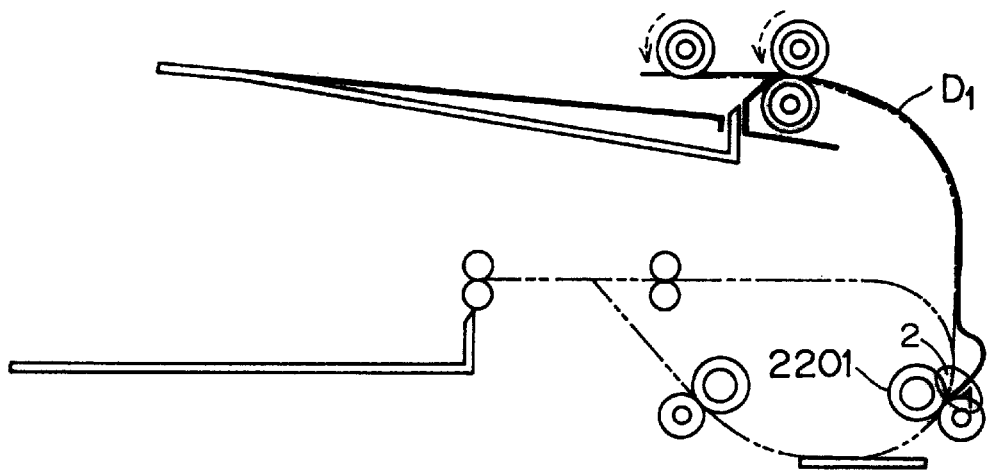

F I G. 38g
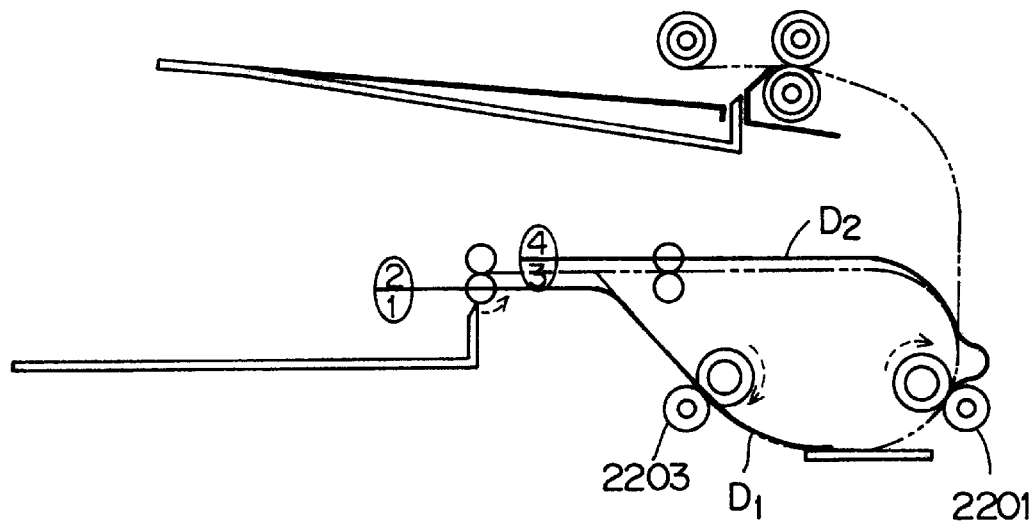
F I G. 38h
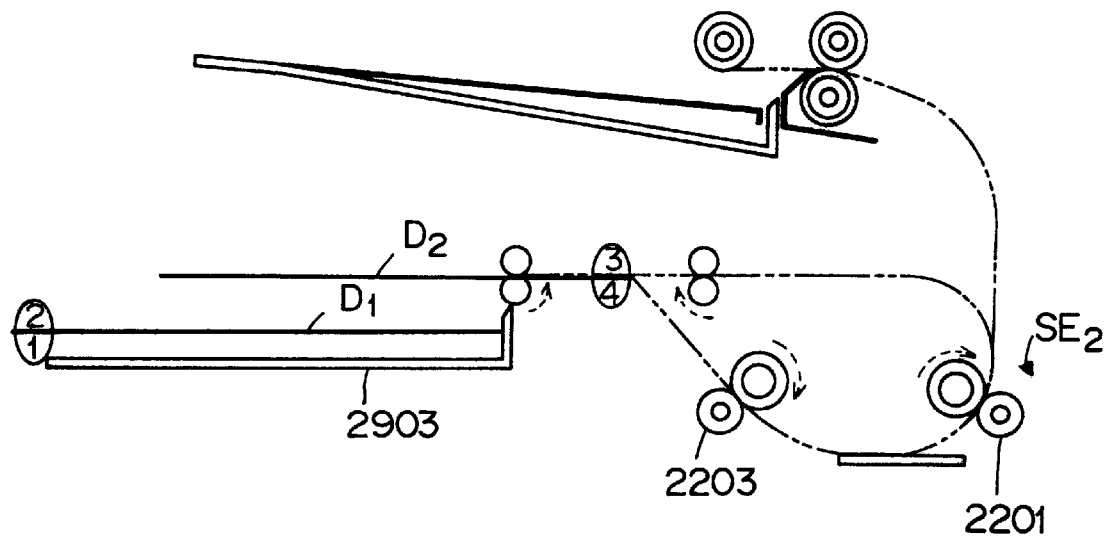

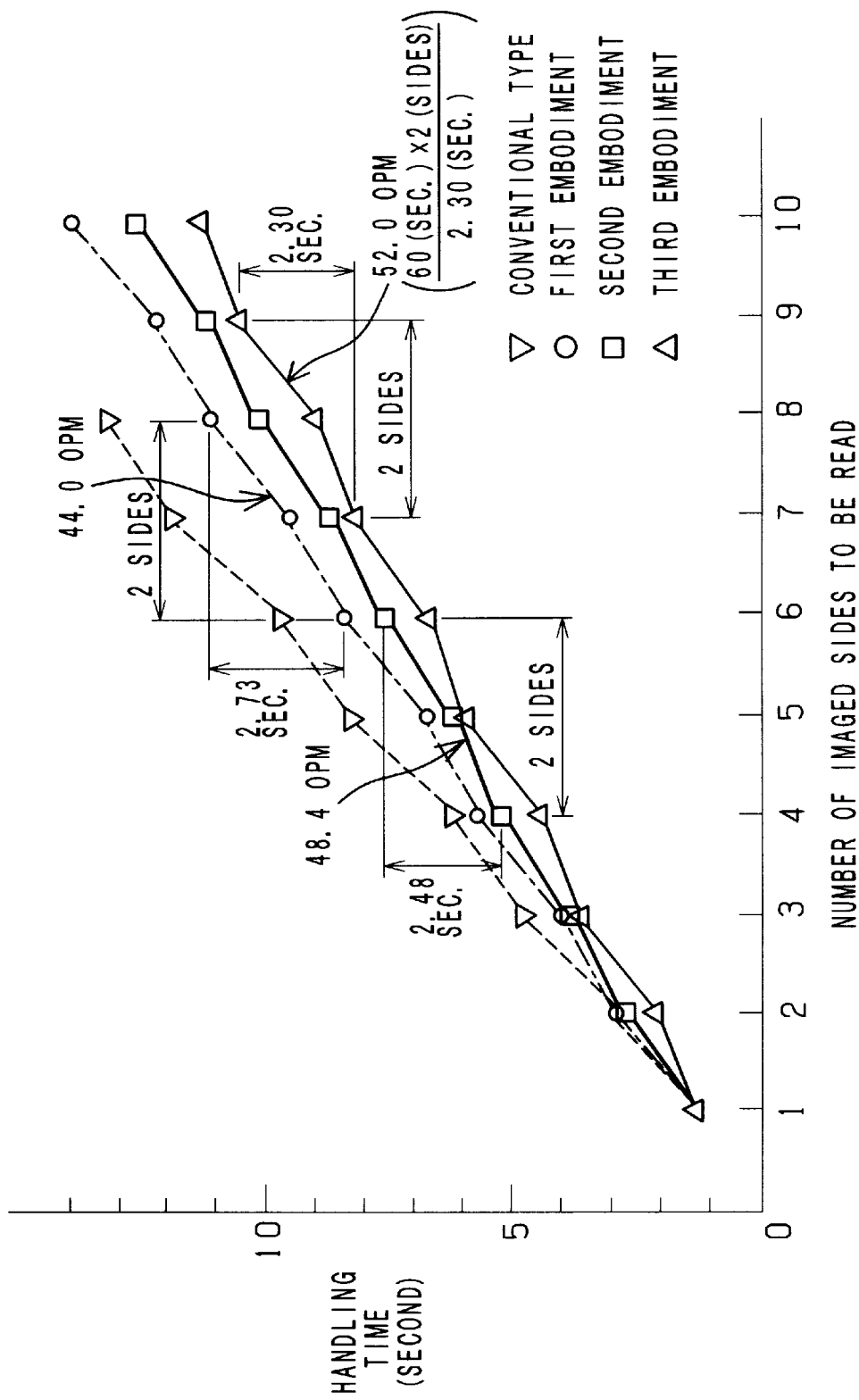

DOCUMENT FEEDER FOR A COPYING MACHINE

BACKGROUND OF THE INVENTION

1. Field of the Invention

The present invention relates to a document feeder, and more particularly to a document feeder which picks up one document from a stack of documents and feeds the document at a constant speed over a stationary image reading device.

2. Description of Related Art

As disclosed by U.S. Pat. No. 5,461,468, a type of document feeder which reads an image of a document with a raster input scanner which is parked at a position while feeding the document on a reading position over the parked input scanner at a constant speed is well known. This is called a feed-scan reading type. In the document feeder disclosed by U.S. Pat. No. 5,461,468, a nudger roller which comes down for feeding of a document picks up some documents from a stack on a tray, and a first feed roller and a retard roller separate one from the other documents. Then, take-away rollers and registration rollers feed the single document toward the reading position correcting possible skew of the document, and a plurality of CVT (constant velocity transport) rollers transport the document on the reading position at a constant speed. In order to minimize the interdocument gap, the nudger roller, the first feed roller and the take-away rollers are driven at a comparatively high speed, and then, when the leading edge of the document reaches the registration rollers, the speed is lowered. The registration rollers and the CVT rollers are driven at the same speed.

In this feed-scan reading type document feeder, skew of a document is corrected by the registration rollers which are located upstream of the first CVT rollers which are located right before the reading position. Therefore, skew of a document which occurs after the registration rollers cannot be corrected, and the document may be transported askew on the reading position. Also, the fact that the registration rollers are away from the reading position makes it impossible to deskew the next document during image reading of the previous document, and this limits minimization of the interdocument gap. Further, if during image reading of a document, the next document comes into the nip portion of the registration rollers, the load increases suddenly, which influences the constancy of the transport speed. Consequently, the reproductivity of the document image deteriorates.

Further, in the feed-scan reading type document feeder, in handling duplex documents which have images on respective both sides, in order to keep the page order of the documents, each document must be fed through the reading position three times. More specifically, a document is circulated three times for inversion and then discharged onto a discharge tray, and thereafter, the next document is picked up and fed to the reading position. However, in this type, the efficiency of image reading is bad, and the copy productivity is low.

Recently, copying machines are operable in an APS mode wherein a copy sheet size is automatically selected in accordance with the document size, in an AMS mode wherein a copying magnification is automatically selected, in a four-in-one mode wherein four document images are copied on a single copy sheet, and/or in a two-in-one mode wherein two document images are copied on a single copy sheet. In operations in these modes, it is preferred that a document is picked up and fed toward the reading position and is detected by a document size detector provided in the transport path as early as possible. However, in the above-described way of handling duplex documents, feeding of the next document is delayed, and it is impossible to heighten the copy productivity efficiently in operations in the above modes.

Further, in using a digital image reader, the required capacity depends on the size and the number of documents, and if the capacity of the memory is too small to store the data of the documents, image reading must be interrupted. For judgment on the interruption, feeding of the next document and detection of the document size must be carried out as early as possible. Also, since digital image readers take more time for processing, early feeding of the next document is desired.

SUMMARY OF THE INVENTION

An object of the present invention is to provide a feed-scan reading type document feeder which can prevent a document from passing a reading position askew and can minimize the interdocument gap without deteriorating the constancy of the transport speed.

Another object of the present invention is to provide a feed-scan reading type document feeder which, in handling duplex documents, improves the efficiency of transport of the documents (efficiency of image reading), thereby improving the copy productivity.

In order to attain the objects above, a document feeder according to the present invention comprises a transport roller for transporting a fed document toward a reading position, a first roller which is located immediately before the reading position, a second roller which is located immediately after the reading position, and a sensor which is located between the transport roller and the first roller. When the trailing edge of the document passes the reading position, the first roller is stopped, and feeding of the next document is started in response to a signal which is generated when the sensor detects the trailing edge of the document.

Further, in the document feeder, the following condition is fulfilled: $(L_C/V_B) < (L_A/V_A) < (L_B/V_B)$, wherein $L_A$ is the distance between the sensor and the reading position, $V_A$ is the transport speed of the first roller and the second roller, $L_B$ is the distance between the transport roller and the first roller, $V_B$ is the transport speed of the transport roller, and $L_C$ is the distance between the transport roller and the sensor.

In the above structure, a fed document is transported by the transport roller and is deskewed by the first roller which has stopped. Thereafter, the document is transported to the reading position by the first roller. Because the first roller is located immediately before the reading position, the document deskewed by the first roller is transported to the reading position without skew. When the trailing edge of the document passes the reading position, the first roller is stopped, and when the sensor detects the trailing edge of the document, feeding of the next document is started. Therefore, it never happens that two documents overlap in the reading position, and succeeding documents can be transported with a minimum interdocument gap. More specifically, the interdocument gap can be set to a value not less than the distance between the first roller and the reading position and not more than the distance between the sensor and the reading position.

The document feeder further comprises a circular inversion path including the reading position, which enables image reading of both sides of a duplex document, and control means for, while a document, which has passed the reading position once and has been transported to the reading position via the circular inversion path, is passing the reading position for the second time, starting feeding of the next document before the trailing edge of the document passes the reading position.

Generally, a duplex document passes the reading position three times in order to keep the page order on a discharge tray. According to the present invention, before completion of the second passage of a first document through the reading position, feeding of a second document is started, and the second document is transported into the circular inversion path subsequent to the second passage of the first document through the reading position. In other words, the second document is fed to the reading position before the first document is transported to the reading position for the third time. Therefore, efficiency of transport of documents (efficiency of image reading) is much improved. Moreover, because the size of the second document can be detected before the third passage of the first document through the reading position, control for various processes in various modes can be carried out smoothly, and the copy productivity can be improved.

BRIEF DESCRIPTION OF THE DRAWINGS

These and other objects and features of the present invention will be apparent from the following description with reference to the accompanying drawings, in which:

FIGS. 16a and 16b are flowcharts which show a subroutine for feeding of a document;

FIGS. 17a, 17b and 17c are flowcharts which show a subroutine for document size detection 1;

FIGS. 24a and 24b are flowcharts which show a subroutine for fourth case of handling after image reading;

FIGS. 25a and 25b are flowcharts which show a subroutine for a fifth case of handling after image reading;

FIG. 34 is an elevational view of the transport driving system;

FIG. 35 is another elevational view of the transport driving system;

FIGS. 37a through 37f are illustrations which show transport operation when there is one document;

FIGS. 38a through 38i are illustrations which show transport operation when there are two or more documents;

FIG. 39 is a graph which shows the efficiency of image reading; and

DETAILED DESCRIPTION OF THE PREFERRED EMBODIMENTS

Figure 1:
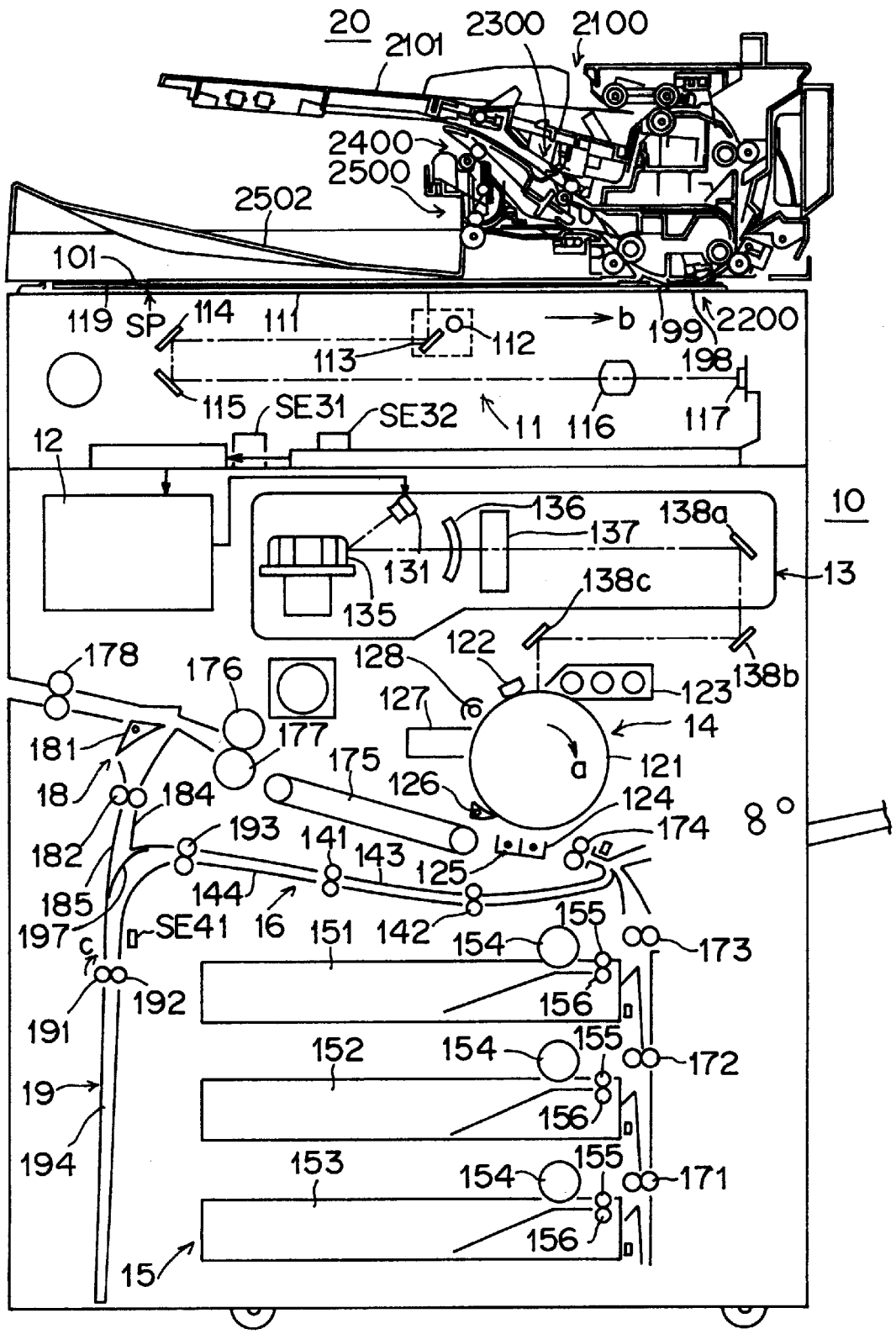
FIG. 1 is a schematic view of an electrophotographic copying machine provided with a document feeder which is a first embodiment of the present invention.

Preferred embodiments of the present invention are described referring to the accompanying drawings. Each of the embodiments is a document feeder attached to an electrophotographic copying machine.

General Structure of the Copying Machine

The copying machine 10 is mainly composed of an image reading optical system 11, a laser optical unit 13, an image forming section 14 and a sheet feeding section 15.

Image Reading Optical System

The image reading optical system 11 is located right under a platen glass 111, which is an upper surface of the copying machine 10. The image reading optical system 11 comprises a lamp 112 which irradiates a document set on the platen glass 111, reflective mirrors 113, 114 and 115, a lens 116 with a variable power, a CCD sensor 117 and a shading correction plate 119 which is provided on the platen glass 111 to correct variations in sensitivity of the CCD sensor 117.

At the left end of the platen glass 111, a document scale 101 for positioning of a document on the platen glass 111 is provided. An operator lifts a document feeder 20 (which will be described later) and sets a document on the platen glass 111 with its imaged side facing down and with its one end positioned at the scale 101. The image reading optical system 11 scans the document while the lamp 112 which is lit and the mirrors 113, 114 and 115 are moving in a direction indicated by arrow "b", and reads the image of the document with the CCD sensor 117 which receives a light through the lens 116. Before the scanning of the document, the CCD sensor 117 reads a light reflected from the shading correction plate 119, and variations in sensitivity of the elements of the sensor 117 are corrected accordingly. Then, the scanning of the document starts at a document reference position SP.

The lamp 112 and the mirror 113 move in the direction of arrow "b" at a speed of V/m (V: circumferential speed of a photosensitive drum 121, which is constant regardless of the copying magnification, m: copying magnification). Simultaneously, the mirrors 114 and 115 move in the direction of arrow "b" at a speed of V/2m. Thus, image reading is carried out with the optical path length during scanning kept constant.

At the right end of the platen glass 111, a slit glass 198 for image reading of a document which is fed at a constant speed by the document feeder 20 as will be described later is provided. For this mode of image reading, the lamp 112 and the mirror 113 are parked right under the slit glass 198, and the mirrors 114 and 115 are parked in positions to form a necessary optical path length. The lamp 112 irradiates the document which passes over the slit glass 198 at a constant speed (which is changed in accordance with the copying magnification), and the CCD sensor 117 reads the image. A guide plate 199 is provided by the left side of the slit glass 198 to catch the document from the slit glass 198.

The structure wherein the document feeder 20 can be lifted for manual setting of a document on the platen glass 111 is well known. Documents of ordinary sizes are subjected to the above-described feed-scan image reading using the document feeder 20. Documents of materials or sizes which are not suited to be handled by the document feeder 20 are set on the platen glass 111 manually and are subjected to image reading wherein the image reading optical system 11 moves for scanning.

Laser Optical Unit

The image data read by the CCD sensor 117 are outputted from the laser optical unit 13, and accordingly, an electrostatic latent image is formed on the photosensitive drum 121. More specifically, the image data read by the CCD sensor 117 are subjected to various processes in an image processing section 12 and converted into print data, and the laser diode 131 is modulated in accordance with the print data. A laser beam emitted from the laser diode 131 is deflected by a polygon mirror 135 which rotates at a high speed and passes through lenses 136 and 137 which have an fθ function. Then, the laser beam irradiates the photosensitive drum 121 through reflective mirrors 138a, 138b and 138c.

Image Forming Section

In the image forming section 14, there are provided an electrifying charger 122, a developing device 123, a transfer charger 124, an erasing charger 125, a sheet separating pawl 126, a residual toner cleaner 127 and a residual charge eraser 128 around the photosensitive drum 121 in order in the direction of rotation of the photosensitive drum 121 indicated by arrow "a". The structure and operation of each of these elements are well known, and the description thereof is omitted.

Sheet Feeding Section

The sheet feeding section 15 for feeding copy sheets comprises cassettes 151, 152 and 153 which contain copy sheets, sheet transport paths, etc. The cassettes 151, 152 and 153 are arranged in three levels, and a pick-up roller 154, a feed roller 155 and a separation roller 156 are attached to each of the cassettes 151, 152 and 153.

The size of a document which was set on the platen glass 111 manually is detected by sensors SE31 and SE32. One of the cassettes 151, 152 and 153 which contains sheets of a proper size is selected in accordance with the detected size, and sheets are fed out of the selected cassette one by one in response to a feed signal. The fed sheet is transported upward by transport rollers 171, 172 and/or 173, and is stopped temporarily at a pair of timing rollers 174. Then, the timing rollers 174 are driven in synchronization with an image formed on the photosensitive drum 121, whereby the sheet is fed to a transfer section.

The sheet receives a toner image at the transfer section and immediately is peeled off the photosensitive drum 121. The sheet is fed between fixing rollers 176 and 177 via a conveyer belt 175, where the toner image is fixed on the sheet. Then, the sheet is discharged from the copying machine 10 to a tray or a sorter through a pair of discharge rollers 178.

Further, in the copying machine 10, there are provided a transporting section 18 which diverges at a point right before the discharge rollers 178, a switchback section 19 and a refeeding section 16. The transporting section 18 comprises a diverter 181, a pair of transport rollers 182 and sheet guide plates 184 and 185. The switchback section 19 comprises a transport roller 191 which can be rotated forward and in reverse and a follower roller 192 which rotates following the roller 191, a pair of transport rollers 193, a sheet guide plate 194 and a sensor SE41. At the border between the transporting section 18 and the switchback section 19, a flexible resin film 197 is provided to prevent a sheet from going backward. The refeeding section 16 comprises pairs of transport rollers 141 and 142, and sheet guide plates 143 and 144.

In a duplex copy mode, a copy sheet which has obtained an image on its first side is guided to the transporting section 18 and further to the switchback section 19 via the diverter 181 which has been pivoted counterclockwise slightly from the position indicated by the solid line in FIG. 1. The transport roller 191 is driven to rotate forward (in a direction indicated by arrow "c") when the leading edge of the copy sheet is detected by the sensor SE41. Thereafter, when the trailing edge of the copy sheet is detected by the sensor SE41, the transport roller 191 is switched to reverse rotation. Thereby, the copy sheet is inverted upside down and leading edge trailing and is transported to the refeeding section 16 guided by the resin film 197. Then, the sheet is transported to the timing rollers 174 again. This refed sheet receives an image on its second side and is discharged from the copying machine 10 through the discharge rollers 178.

Copy Mode

In combination with the document feeder 20, the copying machine 10 can perform copying basically in an APS mode, in an AMS mode and in a manual mode. The APS mode is an automatic paper selection mode wherein copying is carried out with the copy sheet size automatically determined depending on the copying magnification set by the operator and the detected document size. The AMS mode is an automatic magnification selection mode wherein copying is carried out with the copying magnification automatically determined depending on the copy sheet size selected by the operator and the detected document size. The manual mode is a mode wherein copying is carried out with the copy sheet size and the copying magnification set as selected by the operator regardless of the detected document size.

In the copying machine 10, further, the image processing section 12 is capable of processing the image data read by the image reading optical system 11 and sending the processed data to the laser optical unit 13 as print data. Thereby, the copying machine 10 can form a rotated image and carry out copying in a two-in-one mode or in a four-in-one mode. More specifically, even if a document is set in a different direction from the set direction of copy sheets, the image of the document can be rotated at 90 degrees on a horizontal plane to match the set direction of copy sheets. The two-in-one mode is a mode wherein two document images are copied on one sheet, and the four-in-one mode is a mode wherein four document images are copied on one sheet.

Further, independently of the above copy modes, either a single size load mode or a mixed load mode can be selected. In the single size load mode, documents of a size are continuously read, and in the mixed load mode, documents of various sizes, including different set directions, are continuously read. When the single size load mode is selected in combination with the APS mode or the AMS mode, since copying of all the documents is carried out in accordance with the detected size of the first document, the second and successive documents are fed promptly, and the copy productivity in this case is as high as that in the manual mode. On the other hand, when the mixed load mode is selected in combination with the APS mode or the AMS mode, copying of each document is carried out in accordance with the detected size of the document.

General Structure of the Document Feeder

Figure 2:
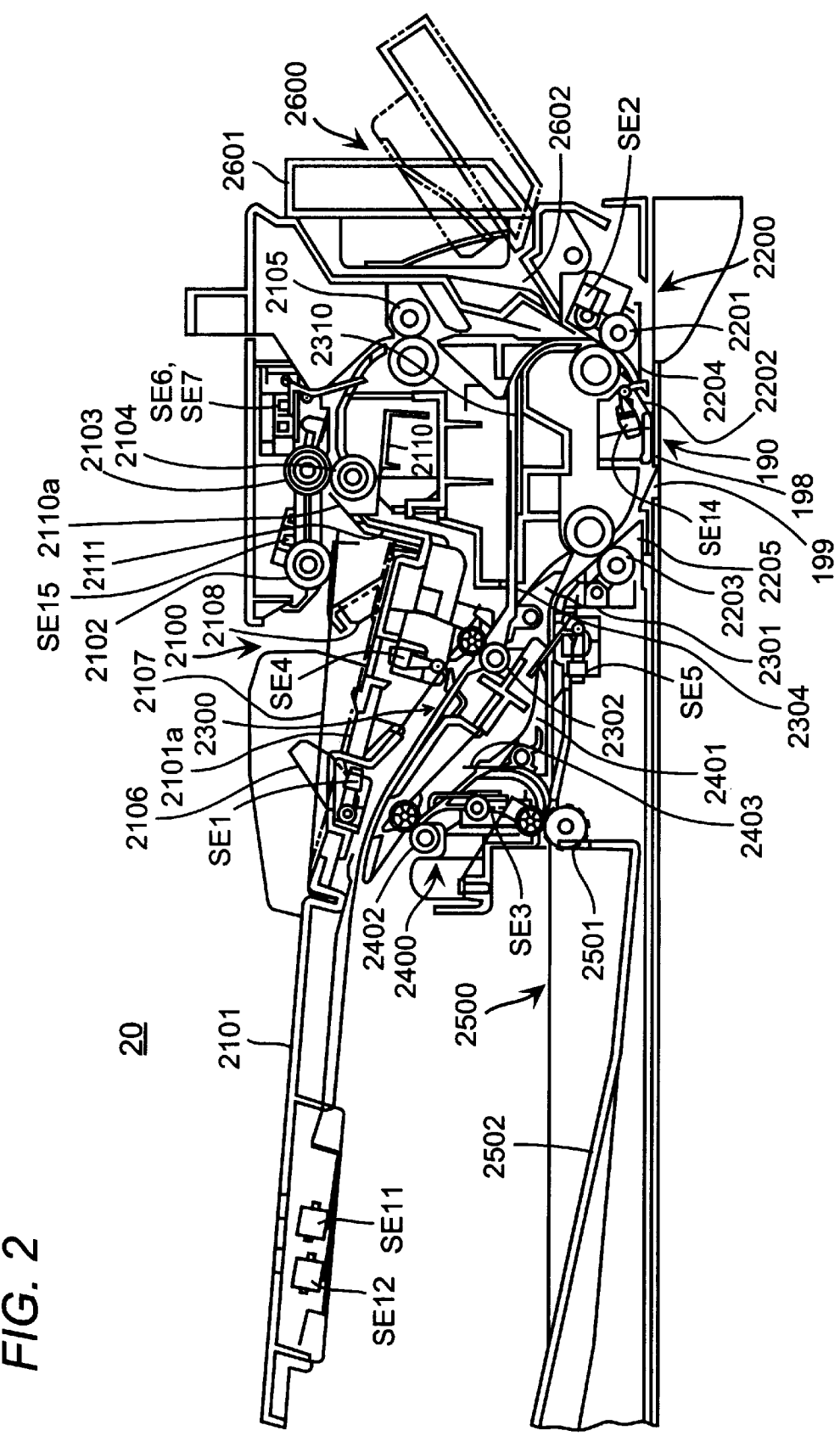
FIG. 2 is a sectional view of the document feeder which shows the internal structure.

As shown in FIG. 2, the document feeder 20 is mainly composed of the following sections:

a feeding section 2100 which comprises a document tray 2101, a pick-up roller 2102, a feed roller 2103, a separation roller 2104, a pair of intermediate transport rollers 2105;

a reading section 2200 which comprises a pair of first read rollers 2201, a pressing guide plate 2202, a pair of second read rollers 2203, an entrance guide plate 2204 and an exit guide plate 2205;

a circular inverting section 2300 which comprises a diverter 2301, a pair of circular inversion rollers 2302 and a circular path 2310;

a discharge inverting section 2400 which comprises a diverter 2401 and a pair of discharge inversion rollers 2402;

a discharging section 2500 which comprises a pair of discharge rollers 2501 and a discharge tray 2502;

a manual feeding section 2600 which comprises a manual feed tray 2601 and a manual feed port 2602; and a document pressing plate which presses a document set manually onto the platen glass 111.

The document feeder 20 is operable in a simplex document mode for image reading of documents with images on respective one sides, in a duplex document mode for image reading of documents with images on respective both sides and in a single feed mode for handling of documents which are not suited to be automatically fed by the feeding section 2100.

Structure of the Feeding Section

The document tray 2101 has an inclined portion 2101a at its radical half, and at the end of the inclined portion 2101a, a leading edge regulating plate 2111 is provided. A lift-up plate 2107 which is pivotable up and down on its left end is initially set to be on a level with the inclined portion 2101a.

Documents are stacked on the tray 2101 with the leading edges in contact with the regulating plate 2111. A driving lever 2108 is moved up by a lift-up motor, which is accompanied by an upward movement of the lift-up plate 2107, and the upper surface of the stack of documents comes into contact with the pick-up roller 2102. The pick-up roller 2102 is supported by an arm 2106 fitted to a shaft of the feed roller 2103 and is pivotable up and down on the shaft. The pick-up roller 2102 is pulled downward by its own weight and a spring (not shown). With the upward movement of the lift-up plate 2107, the pick-up roller 2102 is pushed up, and when an upper limit sensor SE15 detects that the arm 2116 has reached a specified level, the driving lever 2108 is stopped. The state of the upper limit sensor SE15 is monitored at all times, and when the pick-up roller 2102 is detected moving down from the specified level, the driving lever 2108 is moved to move up the lift-up plate 2107. Thereby, the pick-up roller 2102 is kept being on the same level and provides the same pressure to the stack of documents at all times, and the documents are fed from the same level. This means that the leading edges of the picked-up documents comes into contact with a pre-separating guide tab 2110a at a specified angle on a specified level at all times, and accordingly, stable performance of feeding becomes possible.

The pre-separating guide tab 2110a is supported by a holder 2110 and is arranged to extend upward from the upper end of the regulation plate 2111. The edge of the pre-separating guide tab 2110a is right before (slightly separate from) the nip portion between the feed roller 2103 and the separation roller 2104. A plurality of documents are picked up by the pick-up roller 2102, but when the leading edges of the documents come to the pre-separating guide tab 2110a, the upper the document is, the further the document is fed. Then, only a few documents come to the nip portion between the rollers 2103 and 2104.

The feed roller 2103 is driven to rotate counterclockwise. The uppermost one of the documents which have come to the nip portion between the rollers 2103 and 2104 is transported to the right in FIG. 2 by the feed roller 2103, and the other documents are prevented from going further by the separation roller 2104. More specifically, the feed roller 2103 is driven to rotate at a fixed position shown in FIG. 2, while the separation roller 2104 is rotatably fitted to the holder 2110 which is pulled by a spring (not shown) so as to be elastically in contact with the feed roller 2103. A torque limiter is provided to the separation roller 2104. The torque of the torque limiter is such a value that when only one document is between the rollers 2103 and 2104, the separation roller 2104 rotates clockwise accompanying the document transported by the feed roller 2103. When some documents come to the nip portion between the rollers 2103 and 2104, the separation roller 2104 stops to prevent the documents other than the uppermost document from going further.

Feeding of a Document

A set of documents is placed on the document tray 2101 with the first page facing up. When the operator presses a copy start key (not shown) (when the first page is to be fed) or when an actuator lever 2106 on the document tray 2101 is pressed by documents and an empty sensor SE1 is detecting the presence of documents on the tray 2101 (when the second or the succeeding page is to be fed), the pick-up roller 2102 is driven to rotate counterclockwise at a specified time to feed documents to the right in FIG. 2.

The picked-up documents are subjected to preliminary separation by the pre-separating guide tab 2110a and separation between the feed roller 2103 and the separation roller 2104, and thus, only a single document passes through the nip portion between the rollers 2103 and 2104.

Handling of the document thereafter is different between the simplex document mode and the duplex document mode.

Simplex Document Mode

The document separated from the others is transported by the intermediate transport rollers 2105. A specified time after the leading edge of the document is detected by a registration sensor SE2, and more specifically, when the leading edge of the document hits the nip portion between the first read rollers 2201 which have stopped and the leading portion is bent by a proper amount, the intermediate transport rollers 2105 are stopped. With this arrangement, a possible skew of the document is corrected at the nip portion between the first read rollers 2201.

Next, when the read rollers 2201 and 2203 are driven to rotate, the document is fed on the slit glass 198 guided by the guide plate 2202. During the movement of the document on the slit glass 198, the image of the document is read by the optical system 11. The intermediate transport rollers 2105 is kept rotating until the trailing edge of the document passes the nip portion between the transport rollers 2105.

Further, the document is transported from the second read rollers 2203 to the left guided by the lower surfaces of the diverters 2301 and 2401. Then, the document is discharged onto the discharge tray 2502 through the discharge rollers 2501 with its imaged side facing down. As will be described later, feeding of the next document is started based on the detection of the trailing edge of the document by the sensor SE6.

The speed of rotation of the read rollers 2201 and 2203 is changed in accordance with the copying magnification, and the speed of rotation of the intermediate transport rollers 2105 is changed accordingly. If the transport speed of the read rollers 2201 and 2203 when the copying magnification is 1 is V (equal to the circumferential speed of the photosensitive drum 121), the transport speed of the read rollers 2201 and 2203 when the copying magnification is m is automatically set to V/m as will be described later.

Image reading by the optical system 11 is started a specified time after a read sensor SE14 which is located right after the first read rollers 2201 detects the leading edge of a document. More specifically, by monitoring the driving amount of a motor M2 (which will be described later) which drives the read rollers 2201 and 2203 after the detection of the leading edge of the document by the sensor SE14, the start of image reading is timed with the arrival of the leading edge of the document at a reading position 190.

Manual Feeding

The manual feed port 2602 is located in an upstream position of the first read rollers 2201, and the port 2602 becomes open when the manual feed tray 2601 is pulled outward. In this state, the operator inserts a document in the port 2602 to make the leading edge of the document come into contact with the nip portion between the first read rollers 2201. At this time, the read rollers 2201 and 2203 are driven, and thereby, the document is fed on the slit glass 198 and is subjected to image reading in the same manner as described in connection with the simplex document mode. The rotation of the read rollers 2201 and 2203 is started a specified time after the leading edge of the document is detected by the registration sensor SE2.

Duplex Document Mode

A duplex document (a document with images on both sides) fed from the document tray 2101 is fed on the slit glass 198 as described above, and the image on the first side is read. At this time, the diverter 2301 is set in a position which is slightly clockwise from the position shown by the solid line in FIG. 2. Thereby, the document of which first side has been subjected to image reading is guided by the curved surface of the diverter 2301 to the circular inversion rollers 2302. When the trailing edge of the document has passed the resin film 2304, the inversion rollers 2302 are rotated in reverse, whereby the document is fed into the circular path 2310 with the leading edge trailing. Thereafter, the document is transported to the first read rollers 2201, and thus, the document is inverted. When the leading portion of the document is bent at the nip portion between the first read rollers 2201, the inversion rollers 2302 are stopped. With this arrangement, possible skew of the document is corrected.

Then, the read rollers 2201 and 2203 are rotated, whereby the document is fed on the slit glass 198 with its second side facing down, and the image of the second side is read. At this time, the diverter 2301 is back in the position shown by the solid line in FIG. 2, and the diverter 2401 is set in a position which is slightly clockwise from the position shown by the solid line in FIG. 2. Accordingly, the document of which second side has been subjected to image reading is guided by the lower surface of the diverter 2301 and the upper surface of the diverter 2401 to the discharge inversion rollers 2402. When the trailing edge of the document has passed the resin film 2403, the discharge inversion rollers 2402 are rotated in reverse. Thereby, the document is guided by the resin film 2403 and transported to the discharge rollers 2501 with the leading edge trailing. In this way, the document is inverted, and the document is discharged onto the discharge tray 2502 with its first side facing down. Thus, the pagination of documents is corrected. In this duplex document mode, when the trailing edge of the document is detected by the registration sensor SE2 during image reading of the second side, feeding of the next document is started.

Driving System

Figure 5:
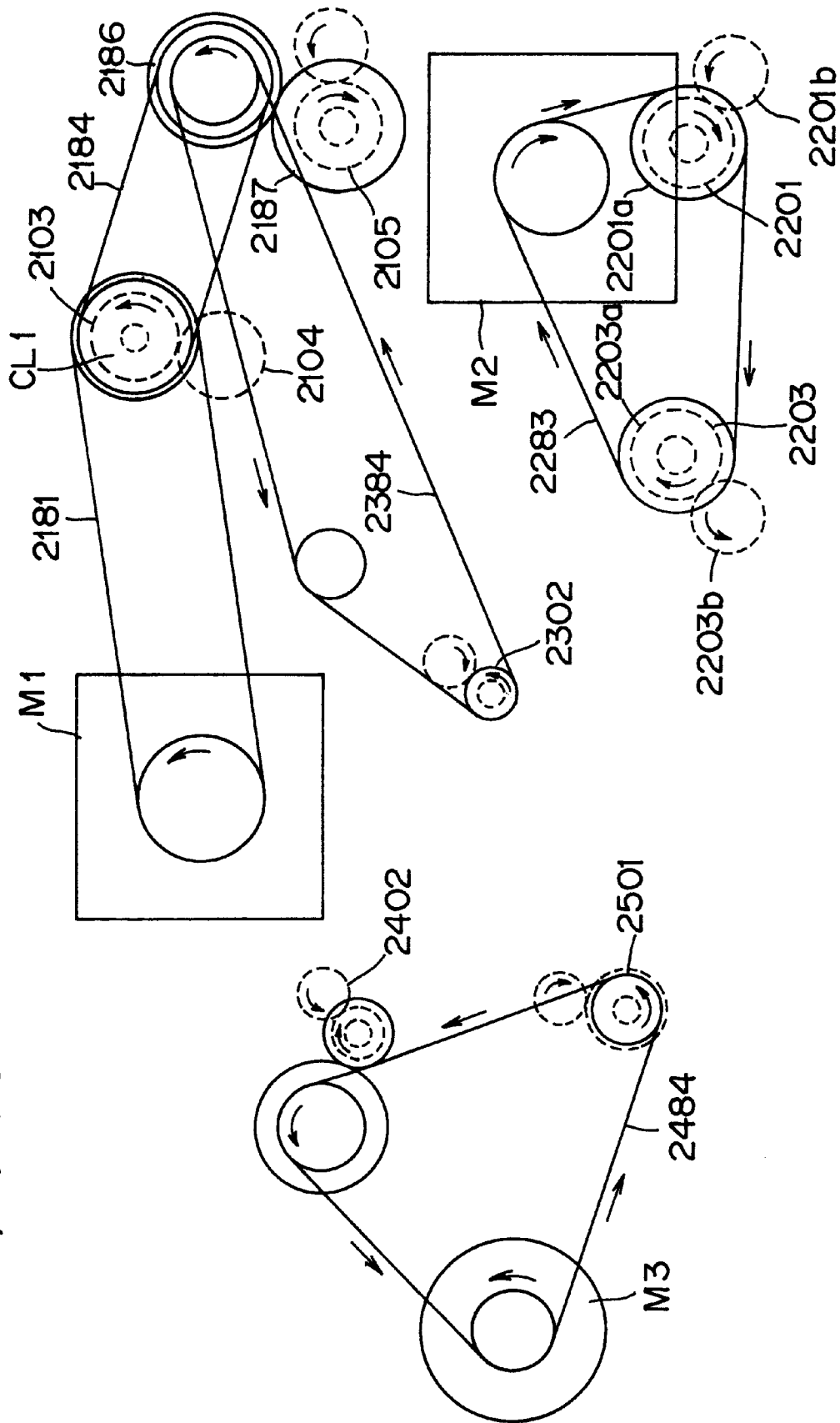
FIG. 5 is an illustration which shows a transport driving system of the document feeder.

In order to realize the above-described operations, as shown in FIG. 5, the feed roller 2103, the intermediate transport rollers 2105 and the circular inversion rollers 2302 are driven by a feed motor M1 which is rotatable forward and in reverse. The feed roller 2103 is connected to the motor M1 by a belt 2181 via a clutch CL1. The pick-up roller 2102 is provided with a rotating force via the feed roller 2103. While a document is being transported by the read rollers 2201 and 2203, the clutch CL1 is off, and the pick-up roller 2102 and the feed roller 2103 rotate pulled by the document. In order to lighten the resistance at this time, a one-way clutch is attached to each of the rollers 2102 and 2103. The intermediate transport rollers 2105 are connected to the motor M1 by belts 2181 and 2184 via gears 2186 and 2187, not via the clutch CL1. The circular inversion rollers 2302 is connected to the motor M1 by belts 2181, 2184 and 2384. While the intermediate transport rollers 2105 are rotated to transport a document to the read rollers 2201, the circular inversion rollers 2302 are rotated to transport the document in the left upward direction in FIG. 2.

The read rollers 2201 and 2203 are driven by a transport motor M2 via a belt 2283.

The discharge inversion rollers 2402 and the discharge rollers 2501 are driven by a discharge motor M3 which is rotatable forward and in reverse via a belt 2484. While the discharge inversion rollers 2402 are rotated to transport a document in the right downward direction in FIG. 2, the discharge rollers 2501 are rotated to transport the document to the tray 2502.

The document feeder 20 handles documents in the simplex document mode or in the duplex document mode in accordance with the operator's selection. When a plurality of documents are set on the document tray 2101, the documents are fed and transported one by one in the above-described manner. When a plural number is inputted by the operator as the number of copies to be made, image data read by the image reading optical system 11 are stored in a memory, and the inputted number of copies are made in accordance with the stored data.

Detection of Document Size

In order to carry out various kinds of copying processes effectively and rapidly in the copying machine 10 using the document feeder 20, the sizes of documents must be detected.

First, the length of documents is detected on the document tray 2101. In order to recognize a plurality of different lengths, sensors SE11 and SE12 are provided on the tray 2101 at its end portion. By the sensors SE11 and SE12, three kinds of lengths can be recognized.

Figure 6:
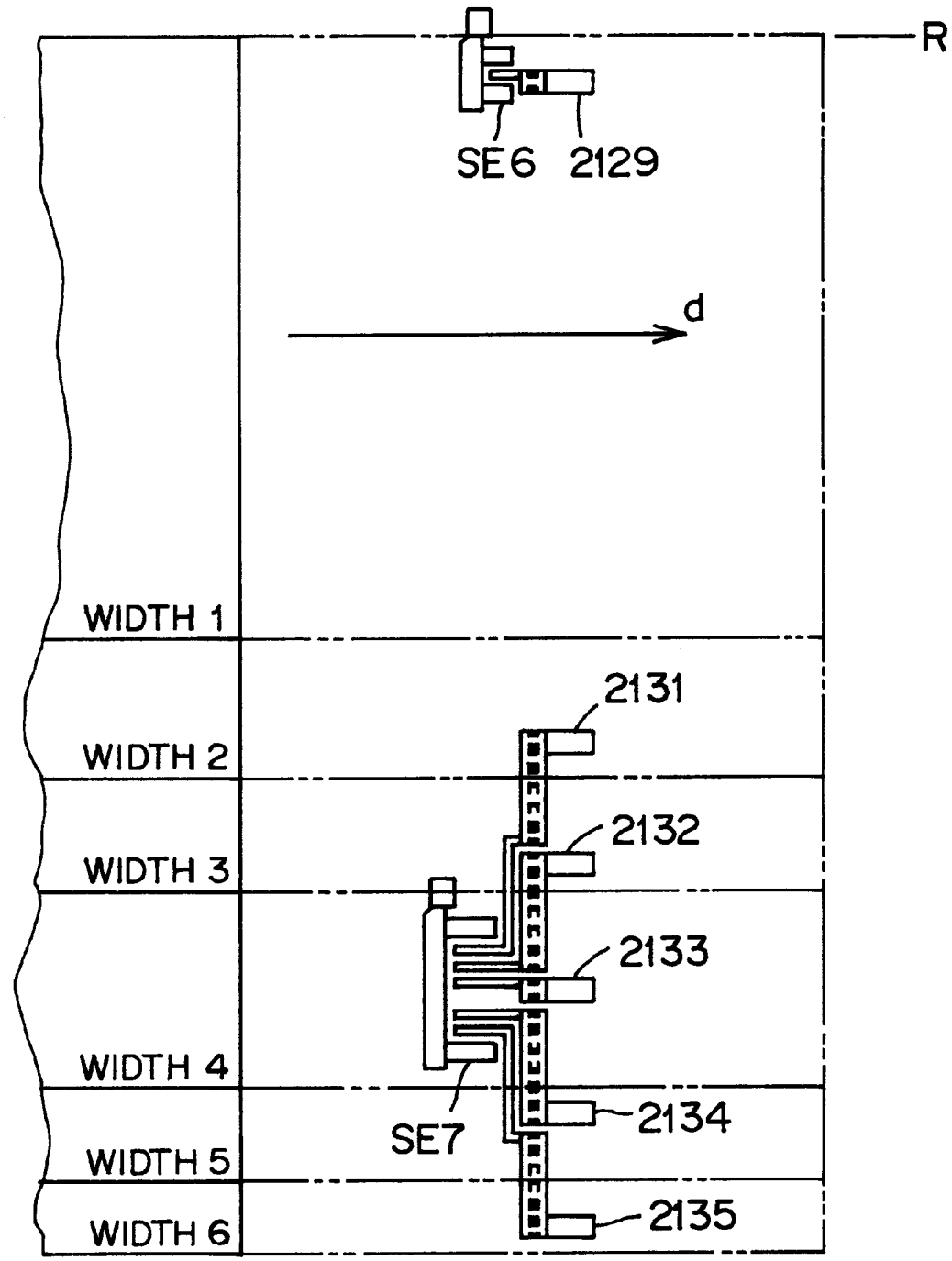
FIG. 6 is a plan view of a document width detection mechanism of the document feeder.
Figure 7:
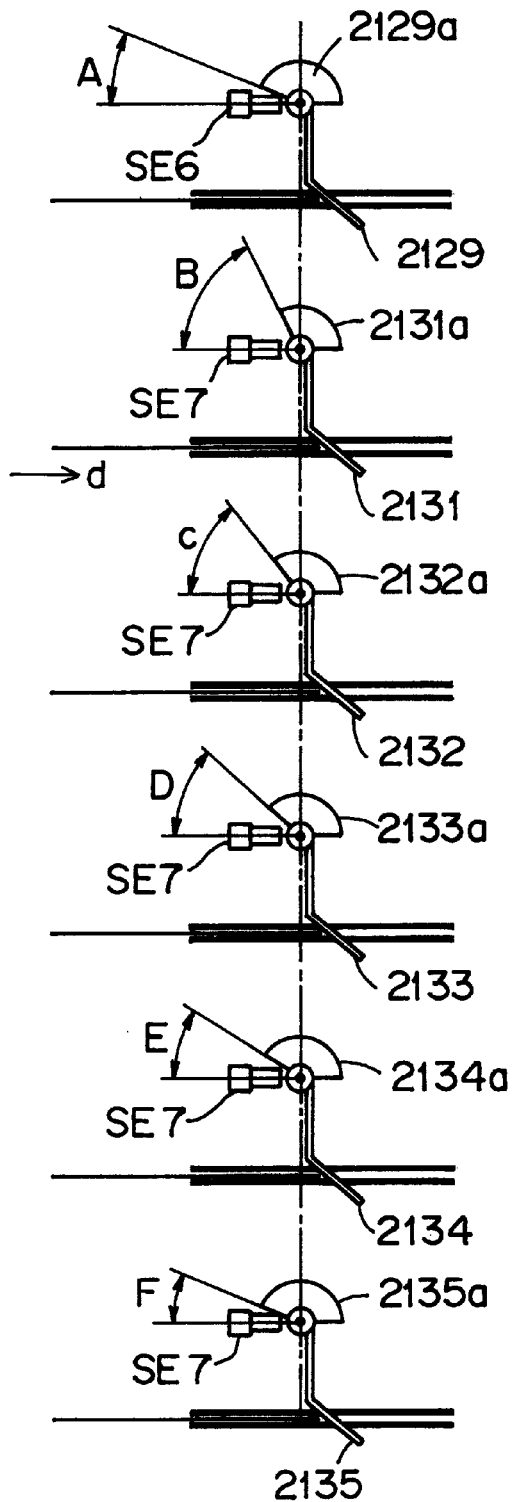
FIG. 7 is an illustration which shows operation of the document width detection mechanism.
Figure 8:
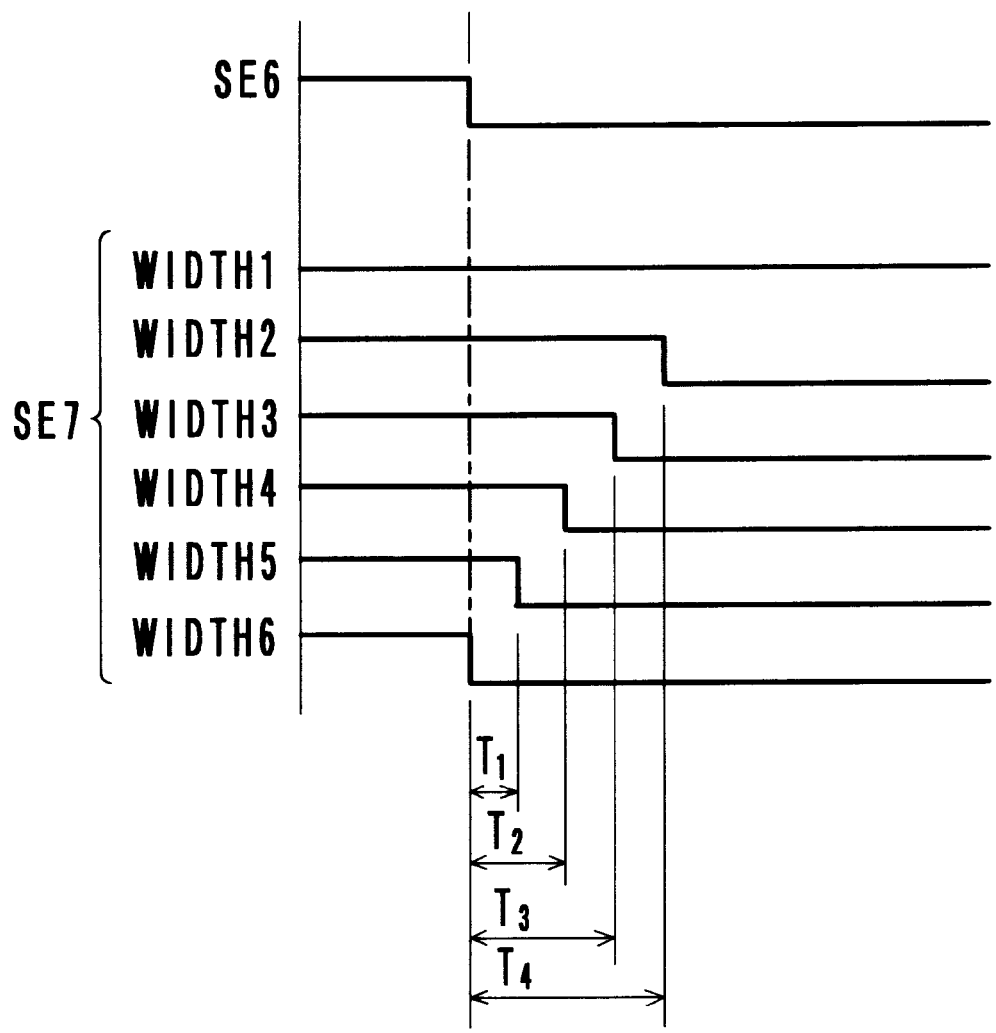
FIG. 8 is a time chart which shows operation of the document width detection mechanism.

Further, right after the feed roller 2103, a width reference sensor SE6 and a width sensor SE7 are provided. As shown in FIG. 6, a document is fed in a direction indicated by arrow "d" with its one side set to a reference line R. The sensor SE6 is located by the side of the reference line R so as to detect a document of any size. The sensor SE7 is located at the other side from the sensor SE6. The sensors SE6 and SE7 are transmitting type optical sensors. The sensor SE6 has a lever 2129 which is to interfere with a document, and the sensor SE7 has levers 2131 through 2135 which are pivotable independently of each other. The levers 2129 and 2131 through 2135 are arranged in line in a direction perpendicular to the direction of arrow "d" and are in the document transport path by their own weights. The levers 2129 and 2131 through 2135 are actuated simultaneously by the leading edge of a document fed in the direction of arrow "d". The levers 2131 through 2135 are to detect widths 2, 3, 4, 5 and 6 of regular sizes, respectively. The narrowest width 1 can be recognized when the document actuates only the lever 2129 of the sensor SEE. As shown in FIG. 7, the levers 2129 and 2131 through 2135 have shutters 2129a and 2131a through 2135a respectively, which have shutting angles A through F respectively. The shutting angles A through F are in the following relationship: A=F<E<D<C<B. Accordingly, when a document has come to the sensors SE6 and SE7, detection signals are generated from the sensors SE6 and SE7 with time lags as shown in FIG. 8. By monitoring these detection signals and the time lags $T_1$, $T_2$, $T_3$ and $T_4$, the width of the document can be recognized.

In this embodiment, with respect to the width detection signals based on the states of the levers 2131 through 2135, the detection signal based on the state of the lever 2135 which is the farthest from the reference line R is generated first, and the detection signal based on the state of the lever 2134, that based on the state of the lever 2133, that based on the state of the lever 2132 and that based on the state of the lever 2131 which is the closest to the reference line R are generated in order with time lags. With this arrangement, even if the leading edge of a document reaches the sensor SE7 delaying from the arrival at the sensor SE6 because of a skew, the logic for recognition of the width as shown in FIG. 8 can be adopted. If the sensor SE7 is so designed that the detection signals based on the states of the levers 2131 through 2135 are generated with time lags in the reverse order, the following problem will occur. If a document comes to the sensors SE6 and SE7 askew in the same way as mentioned above, the lever 2131 is actuated first, and the width of the document may be misjudged to be smaller than the actual width.

Further, the sensor SE6 is dispensable, and any reference signal can be used instead of the signal from the sensor SE6. Also, the length of a document can be detected by a combination of sensors provided in the transport path (for example, sensor SE6 and sensor SE2) and a counter as well as by the sensors SE11 and SE12.

In order to control copying processes in various modes in the copying machine 10 rapidly, it is preferred that the size of a document is judged as earliest as possible. The earliest way is detecting the document size on the document tray 2101. However, when documents of various sizes are stacked on the tray 2101, the detection on the tray 2101 is impossible. Therefore, with regard to such cases, it is the best way to provide the sensors SE6 and SE7 right after the feed roller 2103 so as to detect early the size of the document which is to be copied next. When documents of a size are set on the document tray 2101, right after the start of feeding of the first document, the size of all the documents can be judged. If documents of various sizes are set on the tray 2101, when the trailing edge of each document has passed the sensors SE6 and SE7, the size of the document is judged. In this structure, the waiting time of the copying machine 10 to start feeding of a copy sheet can be minimized. Accordingly, the time from the start of a copying operation to the completion of making a first copy can be shortened, and the copy productivity can be improved.

In cases of using the image memory of the copying machine 10 for sorting of copy sheets and processes in the two-in-one mode, in the four-in-one mode or any other mode, the number of images which can be memorized for data processing depends on the capacity of the memory. However, because a memory is expensive, it is difficult to install a memory with enough capacity. By Judging the size of a document before image reading, image data processing can be carried out using a minimum essential of the capacity of the memory without decreasing the copy productivity.

However, in a case where documents of various sizes are set on the tray 2101, the size of each document cannot be Judged until the trailing edge passes the sensors SE6 and SE7, and image reading of the document is started before the judgment of the size. In order to carry out copying in the APS mode in such a case, in a conventional apparatus, it is necessary to secure a capacity in the memory to store image data of the maximum size for each document. Otherwise, in order to start image reading after judgment of the document size, in a conventional apparatus, each document is once fed through the reading section 2200 without being subjected to image reading before being fed for image reading, or the distance between the sensors SE6 and SE7 and the image reading position 190 is designed larger than the maximum size document. Taking such conventional ways, however, results in having low copy productivity or increasing the size of the document feeder 20.

In this embodiment, since the width sensor SE7 is provided right after the feed roller 2103, at least the width of a document can be detected before the start of image reading, and the size of the document is judged to have the detected width and the largest length which can be inferred from the width. This arrangement saves the capacity of the memory and enables efficient usage of the memory. Thus, even by use of a memory with the same capacity as one installed in a conventional apparatus, more images can be processed, and more various processes become possible.

Structure of the Reading Section

Now, the reading section 2200 is described.

As mentioned above, the first read rollers 2201, which are located right before the slit glass 198, receive the leading edge of a document transported from the intermediate transport rollers 2105 at the nip portion and have a registration function.

The pressing guide plate 2202 is located to face the slit glass 198 with a specified gap, and more specifically, a gap which is a little larger than the thickness of documents, in-between. The guide plate 2202 is to guide a document onto the slit glass 198 and also to prevent the document from floating. In order to assure the prevention of floating of a document, a resin film which is flexible and slippery may be provided to extend from the guide plate 2202 toward the slit glass 198. The slit glass 198 is fixed on the copying machine 10, and the guide plate 2202 is attached to the document feeder 20. Therefore, if documents jam in the reading section 2200, by lifting up the document feeder 20, the glass 198 and the guide plate 2202 are separated from each other, and the jammed documents can be removed easily.

In order to obtain a copy of high quality using the document feeder 20, a document must be fed accurately at the above-described speed V/m and fed keeping in focus of the image reading optical system 11, that is, keeping in contact with the slit glass 198.

As described above, the read rollers 2201 and 2203 are driven by a single motor M2 via the belt 2283. Thereby, the identity of the speed of the rollers 2201 and the speed of the rollers 2203 can be assured, and vibrations of the rollers 2201 and 2203 due to mechanical chatter, which is unavoidable in a gear system, can be avoided. This ensures transport of a document at a constant speed and enables stable image reading. Moreover, since the rollers 2201 and 2203 are driven independently of the other transport sections in this way, the drive of the rollers 2201 and 2203 is not influenced by noise due to load changes of the other transport sections, thereby further assuring the constancy of the transport speed of the rollers 2201 and 2203.

It is fundamental and the best that the read rollers 2201 and 2203 are equal in diameter (which means that the rollers 2201 and 2203 are equal in transport speed). However, if the transport speed of the second read rollers 2203 which is located downstream becomes slower than that of the first read rollers 2201 which is located upstream, a document fed on the slit glass 198 will slack and/or bounce. Then, the image surface of the document may be out of focus of the optical system 11, and image reading may not be performed well. Therefore, it is preferred to keep the transport speed of the second read rollers 2203 not less than the transport speed of the first read rollers 2201.

In each pair of the read rollers 2201 and 2203, as shown in FIG. 5, one of the pair 2201a or 2203a is driven by the motor M2, and the other 2201b or 2203b rotates following the rotation of the roller 2201a or 2203a. With respect to prevention of a slip of a document, it is advantageous to use gears or the like for transmission of the rotating force of the driven rollers 2201a and 2203a to the follower rollers 2201b and 2203b. However, this brings out a problem that load changes occurring due to shocks of gear teeth causes the transport speed of the rollers 2201 and 2203 to fluctuate. In this embodiment, the constancy of the transport speed is much thought of, and the follower rollers 2201b and 2203b are rotated by friction with the driven rollers 2201a and 2203a and a document.

Further, the driven rollers 2201a and 2203a are made of rubber with a high coefficient of friction (for example, EPDM or PUR). The hardness of the rubber is relatively high (approximately 70 to 90) so that deformation of the driven rollers 2201a and 2203a, which is followed by a change in circumferential speed of the rollers 2201a and 2203a, will not occur with a change in pressing force and/or eccentricity of the follower rollers 2201b and 2203b. The high hardness of the rubber means that the rubber has a high bonding strength of molecules, and the rubber is not apt to change its diameter with a change in temperature. Also, in this point, a change in circumferential speed of the rollers 2201a and 2203a can be prevented. A change in circumferential speed of the rollers 2201a and 2203a results in an error in copying magnification. On the other hand, the follower roller 2203b of the second read rollers 2203 is made of a material with a low coefficient of friction (for example, POM). Thereby, even if the leading edge of a document fed from the first read rollers 2201 hits the second read rollers 2203 at an upstream point of the nip portion, the document can be guided to the nip portion smoothly without stopping there.

The accuracy of image reading is likely to deteriorate due to slack and bounce of a document when the guide clearance over the slit glass 198 is large, when the level difference between the first read rollers 2201 and the slit glass 198 is large, when the angle of movement of a document from the entrance guide plate 2204 onto the slit glass 198 is large, when the angle of lift of a document from the slit glass 198 to the guide plate 199 is large, when the angle of movement of a document from the guide plate 199 to the exit guide plate 2205 is large, or when the angle of movement of a document to the second read rollers 2203 is large. Therefore, this section is required to have such a configuration and such a structure as to make a document pass through smoothly. Further, while a document is being transported only by the first read rollers 2201, the leading edge of the document is influenced by the frictional resistance of the guide surface, and the transport speed may become unstable. A preferable way of avoiding this trouble is to slightly enlarge the guide clearance right after the pressing guide plate 2202 so as to decrease the transport resistance. It is also preferred that the angles of movement of a document from the slit glass 198 to the guide surfaces are set as small as possible. Further, it is preferred that the distance between the read rollers 2201 and 2203 is set as short as possible.

Transport Speed in the Reading Section

Transport of a document for image reading is started when the feed motor M1 and the transport motor M2 are turned on in synchronization with each other after registration of the leading edge of the document at the nip portion between the first read rollers 2201. It is necessary to keep the curve of the document formed between the intermediate transport rollers 2105 and the first read rollers 2201 during the document transport for image reading. For this purpose, the transport speed of the intermediate transport rollers 2105 must be not less than the transport speed of the first read rollers 2201. Also, the transport speed of the read rollers 2201 and 2203 and the transport speed of the intermediate transport rollers 2105 must be changed in proportion to a change in copying magnification and have a relationship expressed by the following expression (1).

$$Vn \geq Vm = V/M \tag{1}$$

M: copying magnification

V: transport speed of the read rollers when the copying magnification is 1

Vm: transport speed of the read rollers when the copying magnification is M

Vn: transport speed of the intermediate transport rollers when the copying magnification is M Thereby, when a document does not slack and is tense while the document is nipped not only by the read rollers 2201 and 2203 but also other rollers, the constancy of the transport speed of the read rollers 2201 and 2203 can be kept even if the rollers 2201 and 2203 are influenced by noise which occurs in the other drive systems (noise caused by turning-on and turning-off of clutches, load changes of the rollers 2103 and 2104 when the trailing edge of a document passes the rollers 2103 and 2104, etc.). The transport speed of the circular inversion rollers 2302 and the transport speed of the read rollers 2201 and 2203 have a relationship similar to the relationship (1).

Positions and Speeds of Transport Members

Figure 3:
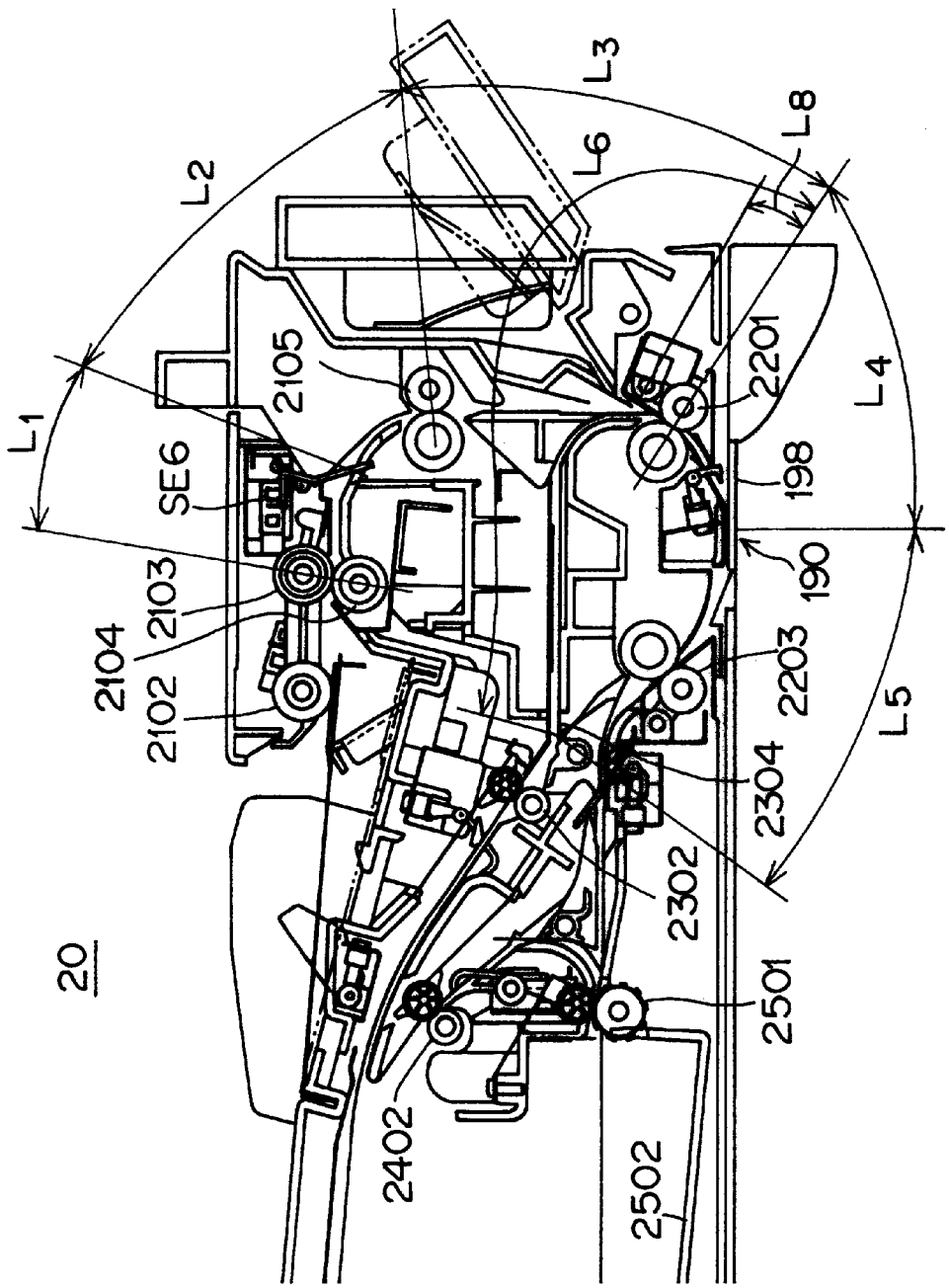
FIG. 3 is an illustration which shows the lengths of transport paths in the document feeder.

In the document feeder 20, the positions and the transport speeds of transport members which are denoted by the following symbols (see FIG. 3) are set as expressed by the following expressions (2), (3) and (4) so as to increase the volume of image reading per a unit time.

$L_1$: distance between the feed roller 2103 and the sensor SE6

$L_2$: distance between the sensor SE6 and the intermediate transport rollers 2105

$L_3$: distance between the intermediate transport rollers 2105 and the first read rollers 2201

$L_4$: distance between the first read rollers 2201 and the reading position 190

$L_5$: distance between the reading position 190 and the resin film 2304

$L_6$: distance between the resin film 2304 and the first read rollers 2201

$V_{01}$: transport speed of the pick-up roller 2102 and the feed roller 2103

$V_{02}$: transport speed of the intermediate transport rollers 2105 for registration $V_{03}$: transport speed of the intermediate transport rollers 2105 for image reading:

$V_{04}$: transport speed of the read rollers 2201 and 2203

$V_{05}$: transport speed of the circular inversion rollers 2302 for image reading $V_{06}$: transport speed of the circular inversion rollers 2302 for inversion $V_{07}$: transport speed of the discharge inversion rollers 2402 for image reading $V_{08}$: transport speed of the discharge inversion rollers 2402 for inversion $V_{09}$: transport speed of the discharge rollers 2501 for image reading $V_{10}$: transport speed of the discharge rollers 2501 for discharge $V_{11}$: transport speed of the discharge rollers 2501

$$V_{03} = V_{04} = V_{05} = V_{07} = V_{09} \tag{2}$$

$$V_{01} = V_{02} \tag{3}$$

$$V_{08} = V_{11} \tag{4}$$

Operation in Simplex Document Mode not Combined with Mixed Load Mode and/or AMS Mode A first document, after registration by the first read rollers 2201 which have stopped, is transported at the speed $V_{04}$ by the read rollers 2201 and 2203 which are driven by the transport motor M2 and is subjected to image reading. In this moment, the intermediate transport rollers 2105 are driven to rotate at the speed $V_{03}$ by the feed motor M1. Then, the discharge rollers 2501 are driven to rotate at the speed $V_{09}$ by the discharge motor M3 before the leading edge of the document reaches the discharge rollers 2501. In a case where there is a second document on the document tray 2101, right after the trailing edge of the first document has passed the reading position 190, the transport motor M2 and the discharge motor M3 are turned off, so that the first document stops in the position. Feeding of the second document was started when the trailing edge of the first document passed the width reference sensor SE6. For the start of feeding of the second document, the clutch CL1 is turned on, and the drive of the feed motor M1 is changed to the speed $V_{01}$. Then, the second document is registered by the first read rollers 2201 which have stopped. When the time from the passage of the trailing edge of the first document by the reading position 190 to the arrival of the leading edge of the second document at the reading position 190 is minimized, the substantial time for image reading t is expressed as follows.

$$t = (L_P + L_4)/V_{04} \tag{5}$$

$L_P$: length of a document

By so designing the document feeder 20 that the distance $L_4$ is as short as possible and that the following expression (6) is as close as possible to an equation, the time t becomes close to $L_P/V_{04}$, and the efficiency of image reading becomes high.

$$\{(L_2 + L_3 + L_4)/V_{04}\} \leq \{(L_1 + L_2)/V_{01} + L_3/V_{02}\} \tag{6}$$

When the copying magnification is large, the transport speed of the read rollers 2201 and 2203 is slow, and in such a case, the expressing (6) may not be fulfilled, and a document which is being fed from the tray 2101 may overlap a document which is being subjected to image reading. However, this trouble is avoidable. Since the time which is required for the trailing edge of the document being subjected for image reading to move from the sensor SE6 to the reading position 190 can be calculated by $(L_2+L_3+L_4)/V_{04}$, the speed $V_{01}$ of the pick-up roller 2102 and the feed roller 2103 and the speed $V_{02}$ of the intermediate transport rollers 2105 can be lowered so as to fulfill the expression (6), or the turning-on of the clutch CL1 can be delayed by a time which corresponds to the difference between the left-hand side and the right-hand side of the expression (6).

Back to the transport of the second document, when the second document reaches the reading position 190, the first document is discharged onto the discharge tray 2502 through the discharge rollers 2501. Subsequently, the second document is transported toward the discharge tray 2502. In this moment, the transport speed of the discharge rollers 2501 is $V_{09}$ because the distance between the first document and the second document is $L_4$.

On the other hand, when the copying magnification is small, the transport speed of the read rollers 2201 and 2203 is high. If documents are discharged onto the discharge tray 2501 at the high speed, the discharged documents cannot be kept in alignment on the tray 2501. In order to avoid this trouble, when a document comes to a state to be provided with a transporting force only by the discharge rollers 2501, the transport speed of the discharge rollers 2501 is lowered from $V_{09}$ to $V_{10}$.

Operation in Duplex Document Mode not Combined with Mixed Load Mode and/or AMS Mode As in the simplex document mode, a first document, after registration by the first read rollers 2201 which have stopped, is subjected to image reading. At this time, the first side of the document is read. In this moment, the diverter 2301 is set to a position slightly clockwise from the position shown by the solid line in FIG. 2. The transport motor M2 drives the read rollers 2201 and 2203 at the speed $V_{04}$, and the feed motor M1 drives the intermediate transport rollers 2105 at the speed $V_{03}$ and the circular inversion rollers 2302 at the speed $V_{05}$. When the trailing edge of the document has passed the second read rollers 2203, the feed motor M1 accelerates the drive of the circular inversion rollers 2302 to the speed $V_{06}$, and the transport motor M2 is turned off. Then, when the trailing edge of the document has passed the resin film 2304, the feed motor M1 is reversed keeping the drive speed $V_{06}$. Thereby, the document is transported in the circular path 2310 with the leading edge trailing and registered by the read rollers 2201 which have stopped. After the registration, the feed motor M1 is turned off. Further, with respect to the switch of the speed of the circular inversion rollers 2302 from $V_{05}$ to $V_{06}$, the following arrangement is possible: when the trailing edge of the document has passed the reading position 190, the switch is performed, and at the same time, the transport motor M2 is switched to drive the read rollers 2203 at the speed $V_{06}$.

The document feeder 20 is so designed that the distances $L_5$ and $L_6$ are as short as possible in order to minimize the time for transportation of a document for image reading of its second side.

For image reading of the second side of the document, the transport motor M2 drives the read rollers 2201 and 2203 at the speed $V_{04}$, and the feed motor M1 drives the circular inversion rollers 2302 at the speed $V_{05}$ in reverse. The diverter 2301 is returned to the position shown by the solid line in FIG. 2, and the diverter 2401 is set to a position slightly clockwise from the position shown by the solid line in FIG. 2. The discharge motor M3 drives the discharge inversion rollers 2402 in reverse at the speed $V_{07}$ until the leading edge of the document reaches the discharge inversion rollers 2402. After image reading of the second side, when the leading edge of the document has passed the reading position 190, the transport motor M2 and the discharge motor M3 are turned off. Before that, when the trailing edge of the inverted document passed the circular inversion rollers 2302, the feed motor M1 was switched forward to drive the intermediate transport rollers 2105 at the speed $V_{02}$. Then, when the trailing edge of the document passed the registration sensor SE2, the clutch CL1 was turned on, and thereby, feeding of a second document was started. Thus, the loss time from the completion of image reading of the second side of the first document to the start of image reading of the first side of the second document is short.

Further, if feeding of the second document is started when the first document travels by the distance $L_2+L_3$ after the arrival of the leading edge of the first document at the first read rollers 2201 for image reading of the second side, that is, a time $L_P-(L_2+L_3)/V_{04}$ after the start of image reading of the second side of the first document, the loss time is further shortened, and the efficiency of image reading is as high as that in the simplex document mode.

Subsequently, for image reading of the first side of the second document, the transport motor M2 and the feed motor M1 are turned on, and the discharge motor M3 drives the discharge inversion rollers 2402 at the speed $V_{07}$. The discharge motor M3 is switched to accelerate the speed of the discharge inversion rollers 2402 to $V_{08}$ when the trailing edge of the first document has passed the second read rollers 2203. Then, when the trailing edge of the first document has passed the diverter 2301, the diverter 2301 is set to a position slightly clockwise from the position shown by the solid line in FIG. 2. When the trailing edge of the first document has passed the resin film 2403, the discharge motor M3 is switched forward to transport the document to the discharge rollers 2501 which are driven at the speed $V_{11}$. When the trailing edge of the document has passed the discharge inversion rollers 2402, the discharge motor M3 lowers the speed of the discharge rollers 2501 to $V_{10}$, and the document is discharged onto the discharge tray 2502 at the speed $V_{10}$.

Mixed Load Mode

When the operator sets documents of various sizes on the document tray 2101 and selects the mixed load mode, the document feeder 20 operates differently from the above-described way. The length sensors SE11 and SE12 provided on the document tray 2101 can detect only the longest size in the set of documents, and the other shorter sizes are recognized when the trailing edge of each document has passed the width reference sensor SE6, that is, after the start of image reading. If the APS mode is also selected in this case, right after the start of feeding of a document, a storing area required for the maximum size which can be inferred from the outputs from the sensors SE6, SE7, SE11 and SE12 is determined as a storing area for the document in the image data memory of the copying machine 10. Since the distance $L_8$ between the registration sensor SE2 and the first read rollers 2201 is known, by monitoring the distance of travel of the document from the start of transportation of the document after the registration until the trailing edge of the document has passed the registration sensor SE2 (denoted by $L_9$), the length of the document $L_P$ can be calculated as $L_8+L_9$. If the actual size of the document determined from the length $L_P$ and the outputs from the sensors SE6 and SE7 is smaller than the inferred maximum size, data only in the region for the actual document size in the storing area which was determined in the above-described way is outputted from the laser optical unit 13. In the operation in a combination of the mixed load mode and the APS mode, feeding of the second and succeeding documents is started at the same timing as in operation in the single-size load mode.

If setting of a copy sheet selected in the AMS mode is different from setting of a document, the image processing section 12 rotates the image of the document by 90 degrees on a horizontal plane. However, the document feeder 20 cannot detect the size of the document before the leading edge of the document reaches the reading section 2200, and accordingly, the copying magnification and the transport speed Vm of the read rollers 2201 and 2203 cannot be determined before that. Therefore, each document is transported through the reading section 2200 without being subjected to image reading so that the size of the document can be detected by the sensors SE6, SE7 and SE2. Then, the document is fed to the reading section 2200 again via the circular inverting section 2300. If the document is a simplex document, the non-imaged side faces the slit glass 198 this time, and the document is transported through the reading section 2200 at a high speed without being subjected to image reading. Then, the document is fed to the reading section 2200 via the circular inverting section 2300 again. At this third time, image reading is carried out with the transport speed of the read rollers 2201 and 2203 set to a speed Vm suitable for the copying magnification. Thereafter, the document is discharged onto the tray 2502 through the discharge rollers 2501.

If the document is a duplex document, when the document is fed to the reading section 2200 for the second time, image reading of its second side is carried out with the transport speed of the read rollers 2201 and 2203 set to a speed Vm suitable for the copying magnification. Then, when the document is fed to the reading section 2200 for the third time via the circular inverting section 2300, image reading of its first side is carried out. Thereafter, the document is discharged onto the tray 2502 through the discharge rollers 2501. In this case, the order of image reading is reversed. However, in order to read the images in the regular order (the first side and then the second side), the document must be transported through the circular inverting section 2300 one more time and further must be transported through the discharge inverting section 2400, thereby lowering the efficiency of image reading largely. Even when image reading is carried out in the reverse order (the second side and then the first side), the image data memory can change the order of data to the regular order, and no trouble occurs. Further, if the document is transported through the reading section 2200 not for image reading at a maximum speed, lowering of the efficiency of image reading can be minimized.

Removal of Stuck Documents

There may be cases that a document jam occurs in the transport way of the document feeder 20 and that the document feeder 20 stops suddenly because of trouble in the copying machine 10, thereby causing a document to be left in the transport way of the feeder 20. The document feeder 20 must have such a structure that the document stuck in the feeder 20 can be taken out easily without being damaged in such a case. Also, the transport way of the document feeder 20 must be openable so that the position where the document is stuck can be seen from outside and that the operator can insert his/her hand to grab the document.

The transport way of the document feeder 20 comprises the following sections: a first section from the feed roller 2103 to the first read rollers 2201; a second section from the first read rollers 2201 to the second read rollers 2203 (reading section 2200); a third section from the second read rollers 2203 to the circular inversion rollers 2302; a fourth section from the circular inversion rollers 2302 to the first read rollers 2201 (circular path 2310); a fifth section from the second read rollers 2203 to the discharge inversion rollers 2402; a sixth section from the discharge inversion rollers 2402 to the discharge rollers 2501; a seventh section from the second read rollers 2203 to the discharge rollers 2501; and an eighth section from the manual tray 2601 to the first read rollers 2201.

Figure 4:
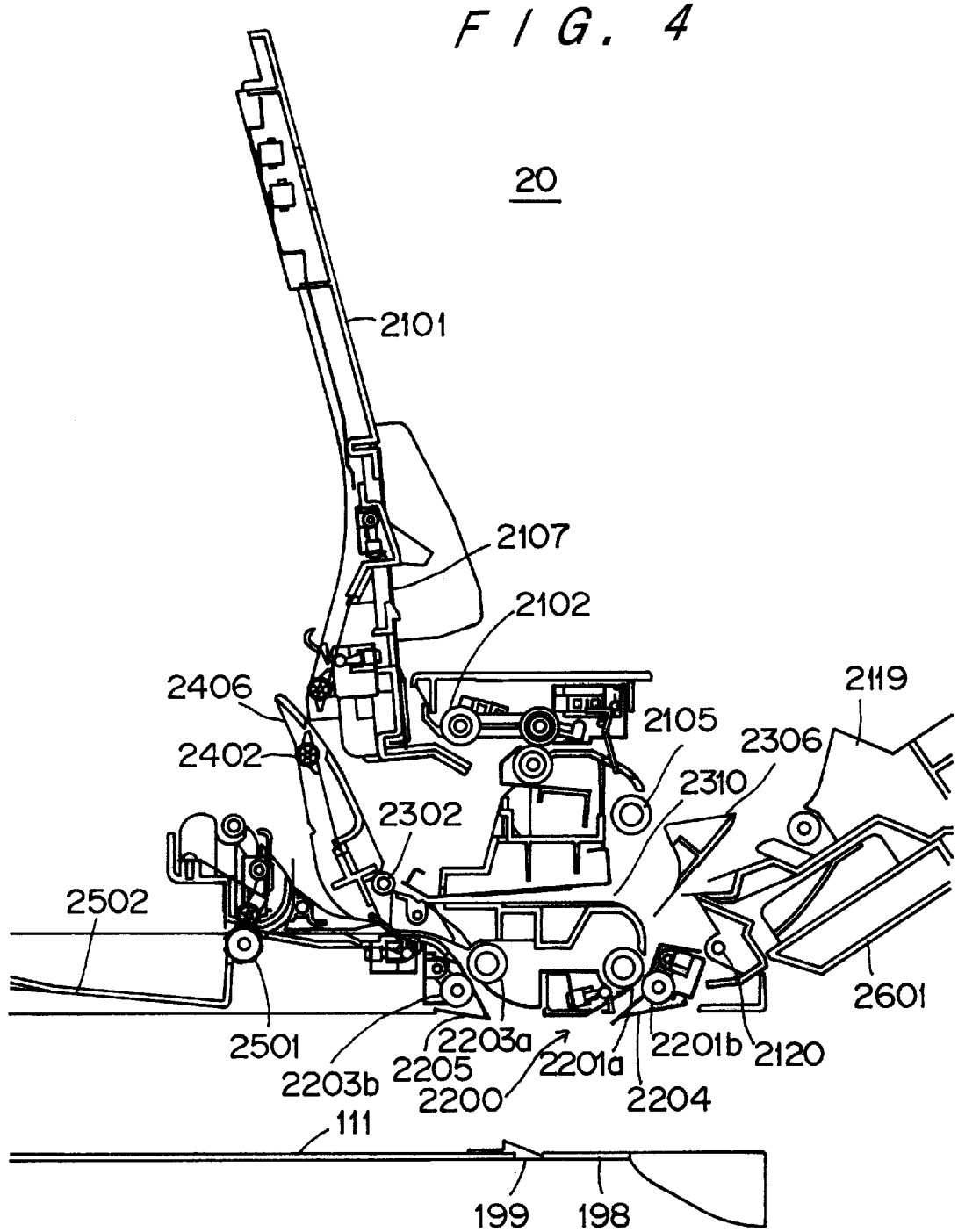
FIG. 4 is an illustration which shows the open state of the document feeder.

As shown in FIG. 4, the first section of the transport way can be opened by pivoting a feeding section cover 2119 on a shaft 2120, and thereby, the transport rollers 2105 are separated from each other. Further, since the guide plate 2306 can be pivoted on the shaft 2120 together with the cover 2119, the circular path 2310 can be partly opened.

The reading section 2200 can be opened by lifting the document feeder 20 from the platen glass 111. At this time, the guide plates 2204 and 2205 pivot downward, and the follower rollers 2201b and 2203b which are fitted to the guide plates 2204 and 2205 separate from the driven rollers 2201a and 2203a.

The third section can be opened by pulling the document tray 2101 upward. At the same time, the circular inversion rollers 2302 separate from each other. The fifth section and the sixth section can be opened by pulling the guide plate 2406 upward after pulling the document tray 2101 upward.

Since all the sections of the transport way are openable as described above, even if a document is stuck in any section of the transport way, the position of the document can be recognized, and the operator can grab and take out the document easily without damaging the document.

Suppression of Vibration of the Transport Motor

If the transport motor M2 (stepping motor) vibrates during image reading, the vibration is transmitted to the read rollers 2201 and 2203, and the accuracy of image reading deteriorates. Generally, in order to prevent step-out of a stepping motor due to fluctuation of load, the driving current applied to the motor is so set as to comply with the maximum torque with a proper margin. However, when the load is small, (especially when the motor is rotated at a low speed,) the torque is exceeds the requirement largely, and vibration and noise occur.

Figure 13:
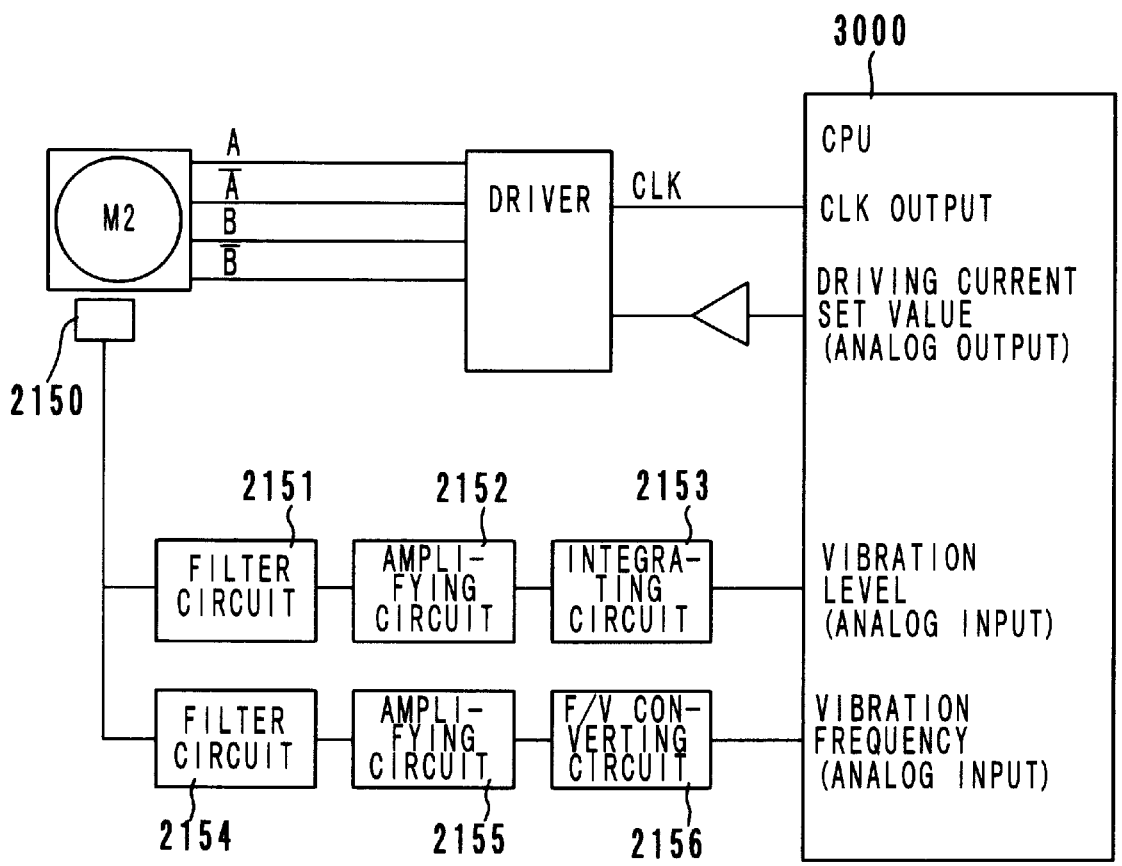
FIG. 13 is a block diagram which shows a control circuit of the transport motor.

In this embodiment, as shown in FIG. 13, a vibration detector 2150 is attached to the motor M2 to detect vibration of the motor M2. When the torque exceeds the requirement, the driving current is lowered to adjust the torque, thereby suppressing vibration and noise. This also avoids unnecessary supply of a current, resulting in a saving of electric power.

As the vibration detector 2150, a piezoelectric element, a pressure sensor, a distortion gauge, an accelerometer, etc, can be used. The vibration detector 2150 is fitted at a position to directly detect the vibration of the motor M2, for example, on a supporting frame of the motor M2. In order to obtain a signal which indicates the strength of vibration, an output of the vibration detector 2150 is converted into a voltage or a pulse by filter circuits 2151 and 2154, amplifying circuits 2152 and 2155, an integrating circuit 2153 and an F/V converting circuit 2156, and the voltage or the pulse is inputted to a CPU 3000 as a vibration level and a vibration frequency. Further, because the vibration varies in accordance with the speed of the motor M2, the vibration frequency is detected from the number of driving pulses of the motor M2. The filter circuit 2154 eliminates unnecessary noise and selects only the necessary frequency signal (hundreds of hertz to tens of kilohertz). The F/V converting circuit 2156 converts the selected frequency into a voltage. The integrating circuit 2153 converts the amplitude of the vibration into a voltage.

The vibration level varies in accordance with the frequency band. As shown in Table 1, if the vibration level is more than a specified level, which depends on the frequency, the driving current of the motor M2 is lowered by 0.1 A at a time to such an extent not to cause step-out of the motor M2. The vibration levels $Vf_0$, $Vf_1$, $Vf_2$, $Vf_3$ have a mutual relationship of $Vf_0 < Vf_1 < Vf_2 < Vf_3$.

TABLE 1

| Vibration | Frequency | | |
|---|---|---|---|
| Level | 50–100 Hz | 100–200 Hz | over 200 Hz |
| $Vf_0$ | No Problem | No Problem | No Problem |
| $Vf_1$ | −0.1 A | No Problem | No Problem |
| $Vf_2$ | −0.1 A | −0.1 A | No Problem |
| $Vf_3$ | −0.1 A | −0.1 A | −0.1 A |

Control of Excitation of the Transport Motor

A stepping motor is used as the transport motor M2. While a stepping motor runs at a constant speed, excitation of each phase switches periodically, and resonance occurs, thereby causing vibration and noise. In some cases, resonance occurs in the motor itself, and in other cases, resonance occurs in the motor and the driving force transmission system. In this embodiment, by varying the pulse width (excitation time) without changing the number of pulses (the number of times of excitation switches) for a certain period, vibration and noise caused by resonance is suppressed, whereas the transport speed is kept constant.

Figure 9:
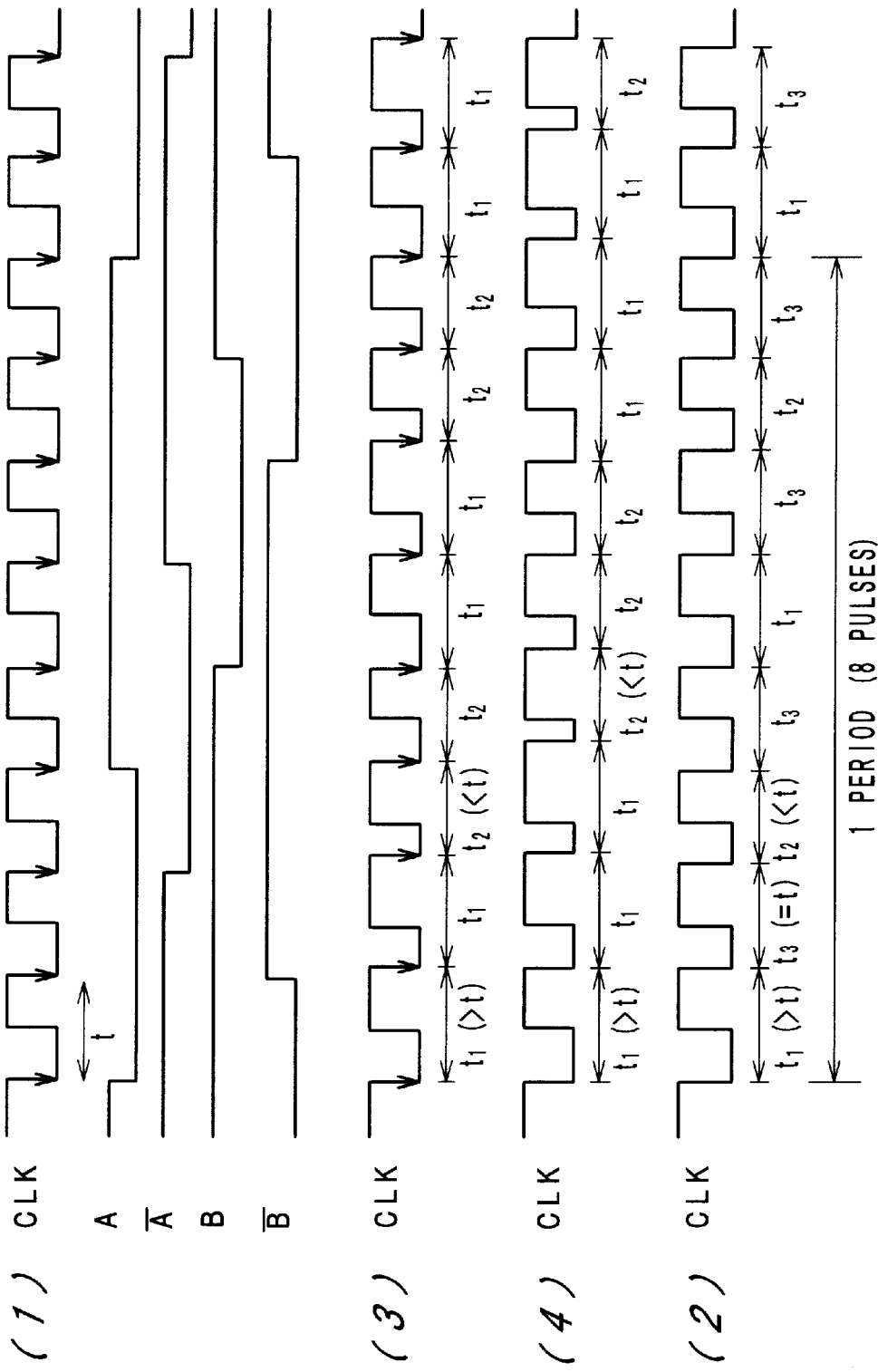
FIG. 9 is a chart which shows excitation patterns of a transport motor.

More specifically, when excitation of each phase switches at a constant pitch t as shown by FIG. 9(1), resonation occurs in the motor itself (during a low-speed run) or in the motor, the circuit, the load, the inertia, etc. (during a middle-speed run). With respect to the document feeder 20, the motor speed at which vibration and noise are caused by resonance is known. Therefore, when the motor is rotated at the speed, the motor is driven in an excitation pattern wherein the pulse width t is varied and the number of pulses for a certain period is fixed (for example, excitation pattern (2), (3) or (4) in FIG. 9). With this control, vibration and noise caused by resonance can be suppressed.

As an example, the following control is possible: because resonance does not occur during a high-speed run, the motor M2 is driven at that time in the excitation pattern (1) wherein the pulse width t is constant; because small resonance occurs during a middle-speed run, the motor M2 is driven at that time in the excitation pattern (3) or (4) wherein the variations of the pulse width t are simple; and because large resonance occurs during a low-speed run, the motor M2 is driven at that time in the excitation pattern (2) wherein the variation of the pulse width t is complicated.

Figure 10:
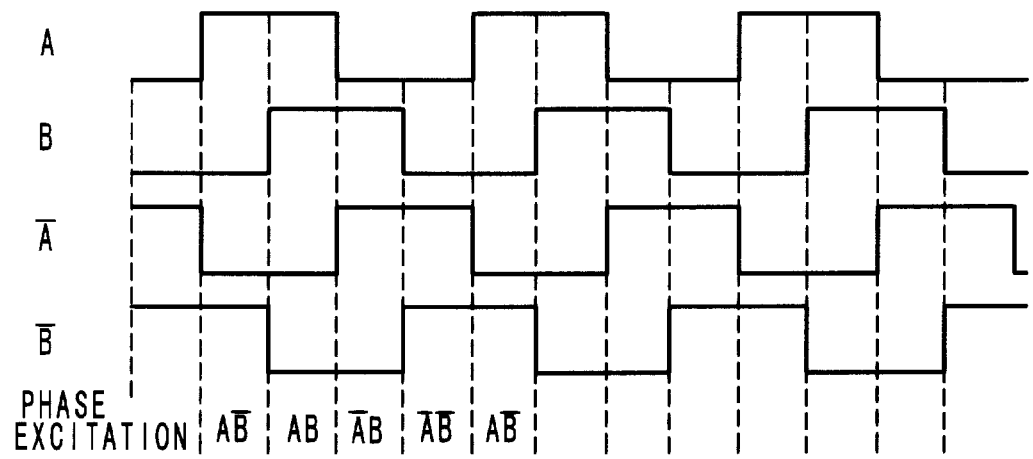
FIG. 10 is a time chart which shows two-phase excitation.
Figure 11:
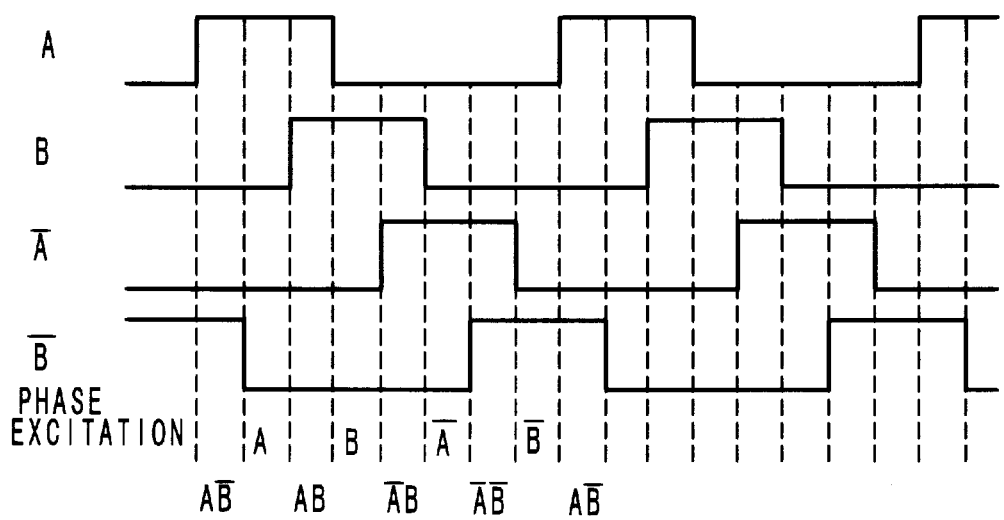
FIG. 11 is a time chart which shows one/two-phase excitation.

FIG. 10 is a time chart showing two-phase excitation, and FIG. 11 is a time chart showing one/two-phase excitation.

Although the above description is about a case adopting the one/two-phase excitation, similar control is possible in cases of adopting W-one/two-phase excitation and microstep excitation.

Further, vibration and noise caused by resonance can be suppressed with other control. For example, the excitation mode is changed (from two-phase excitation to one/two-phase excitation or W-one/two-phase excitation) around the speed at which resonance occurs. With this control, the motor can be driven at a pulse rate which does not cause resonance without changing the transport speed. Also, when the motor must be driven at such a speed to cause resonance in order to attain a desired copying magnification, the following control is possible: the motor is driven at a speed which does not cause resonance (for example, the speed to attain the copying magnification of 1 or the speed to attain double the desired magnification), and thereafter, the speed is corrected to attain the desired magnification by an electrical magnification process, that is, after image reading, image data are processed to have the desired magnification.

Control Circuit

Figure 12:
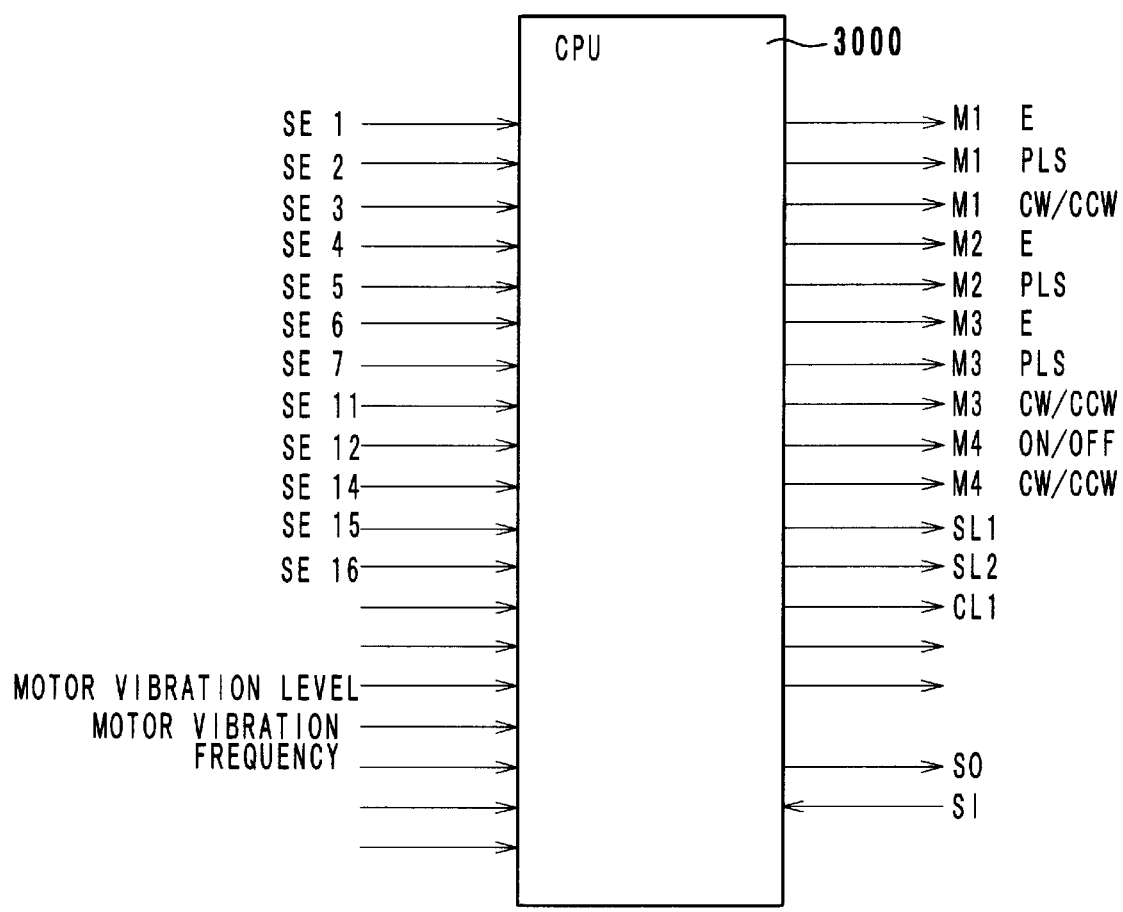
FIG. 12 is a block diagram which shows a control circuitry of the document feeder.

FIG. 12 is a schematic view of a control circuitry of the document feeder 20. The center of the control circuitry is a CPU 3000. Signals are inputted into the CPU 3000 from the following sensors, and control signals are outputted to the following motors, solenoids, etc:

an empty sensor SE1 for detecting a document set on the tray 2101, which detects the presence of a document when it is off;

a registration sensor SE2 for detecting a document right before the first read rollers 2201, which detects the presence of a document when it is on, the sensor SE2 further being used for detection of the length of a document;

a discharge sensor SE3 for detecting a document in the discharge inversion path, which detects the presence of a document when it is on;

a circular inversion sensor SE4 for detecting a document in the circular inversion path, which detects the presence of a document when it is on;

a discharge inversion sensor SE5 for detecting a document in the discharge path, which detects the presence of a document when it is on;

a width reference sensor SE6 for detecting the width of a document, which detects the presence of a document when it is on;

a width sensor SE7 for detecting the width of a document, which detects the presence of a document when it is on;

a length sensor SE11 for detecting the length of a document set on the tray 2101, which detects the presence of a document when it is on;

a length sensor SE12 for detecting the length of a document set on the tray 2101, which detects the presence of a document when it is on;

a read sensor SE14 for detecting a document in the reading section 2200, which detects the presence of a document when it is on;

an upper limit sensor SE15 for detecting whether a document on the tray 2101 is lifted to a feeding level, which detects the completion of lifting a document when it is on;

a lower limit sensor SE16 (not shown in FIG. 2) for detecting whether the lift-up plate 2107 is in the lowest position (home position), which detects the plate 2107 in the home position when it is on;

a feed motor M1 for driving the rollers 2102, 2103, 2105 and 2302, which runs in the clockwise direction for feeding and reading and runs in the counterclockwise direction for circular inversion;

a transport motor M2 for driving the rollers 2201 and 2203, which runs in the counterclockwise direction;

a discharge motor M3 for driving the rollers 2402 and 2501, which runs in the clockwise direction for discharge inversion and runs in the counterclockwise direction for discharge;

a lift-up motor M4 (not shown in FIG. 2) for moving up and down the lift-up plate 2107, which runs in the clockwise direction for downward movement and runs in the counterclockwise direction for upward movement;

a circular inversion solenoid SL1 (not shown in FIG. 2) for driving the diverter 2301, which turns the diverter 2301 clockwise from the position shown by the solid line in FIG. 2 when it is turned on;

a discharge inversion solenoid SL2 (not shown in FIG. 2) for driving the diverter 2401, which turns the diverter 2401 clockwise from the position shown by the solid line in FIG. 2 when it is turned on;

a feed clutch CL1 for connecting and disconnecting a driving force of the feed roller 2103, which transmits the driving force when it is on;

a signal SO which is sent from the CPU 3000 to the copying machine 10; and a signal SI which is sent from the copying machine 10 to the CPU 3000.

Control Parameters

Next, parameters which are used for control of the document feeder 20 are described.

A transport mode is determined based on an operation mode selected by the operator, and the data on the transport mode are transmitted from the copying machine 10 to the CPU 3000. The transport mode is determined to be one of the following types:

"01": simplex document, high-speed, APS;
"02": simplex document, high-speed, AMS;
"03": simplex document, high-speed, manual;
"04": simplex document, mixed load, APS;
"05": simplex document, mixed load, AMS;
"06": duplex document, high-speed, APS;
"07": duplex document, high-speed, AMS;
"08": duplex document, high-speed, manual;
"09": duplex document, mixed load, APS; and
"10": duplex document, mixed load, AMS.

A timer TMRFA counts the time it takes for a document to travel from the sensor SE6 to the intermediate transport rollers 2105.

A timer TMRFB counts the time required for formation of a bend when the leading edge of a document is registered.

A timer TMRD determines the time to judge the on/off state of the sensor SE7 for detection of the width of a document.

A feed counter counts documents which have been fed.

A counter CNTA counts driving pulses of the transport motor M2 from the time of on-edge of the sensor SE14.

A pulse number PLSA is the number of driving pulses of the transport motor M2 until the leading edge of a document reaches the reading position 190.

A pulse number PLSB is the number of driving pulses of the transport motor M2 until image reading of a document is completed.

A counter CNTC counts driving pulses of the feed motor M1 from the time of off-edge of the sensor SE6.

A pulse number PLSC is the number of driving pulses of the feed motor M1 until feeding of the next document becomes possible.

A counter CNTD counts driving pulses of the transport motor M2 from the time of off-edge of the sensor SE2.

A pulse number PLSD is the number of driving pulses of the transport motor M2 from the time of off-edge of the sensor SE2 to the time when the trailing edge of a document passes the second read rollers 2203.

A counter CNTE counts driving pulses of the feed motor M1 during circular inversion of a document.

A pulse number PLSE is the number of driving pulses of the feed motor M1 until the trailing edge of a document passes the circular inversion rollers 2302 for circular inversion.

A counter CNTG counts driving pulses of the feed motor M1 from the time of on-edge of the sensor SE4.

A pulse number PLSG is the number of driving pulses of the motor M1 from the time of on-edge of the sensor SE4 to the start of reverse transport of a document.

A counter MPLSCNT counts driving pulses of the transport motor M2 from the time of turning on the motor M2.

A counter value SIZCNT is the value of the counter MPLSCNT when the sensor SE2 is turned off.

A counter CNTH counts driving pulses of the discharge motor M3 from the time of arrival of the trailing edge of a document at the reading position 190 to the time of a slowdown of the motor M3.

A pulse number PLSH is the number of driving pulses of the discharge motor M3 until the time of a slow-down of the motor M3.

A pulse number PLSI is the number of driving pulses until the trailing edge of a document passes the discharge rollers 2501.

A counter CNTI counts driving pulses of the discharge motor M3 from the time of on-edge of the sensor SE5.

A pulse number PLSJ is the number of driving pulses from the time of on-edge of the sensor SE5 to the start of reverse transport of a document.

A counter CNTJ counts driving pulses of the discharge motor M3 from the time of off-edge of the sensor SE5.

A pulse number PLSK is the number of driving pulses from the time of off-edge of the sensor SE5 to a slow-down of the discharge motor M3.

A pulse number PLSL is the number of driving pulses of the discharge motor M3 from the time of off-edge of the sensor SE5 to the time when the trailing edge of a document passes the discharge rollers 2501.

The following parameters are used for drive control of the transport motor M2:

a length A which is the length of a document detected by the sensors SE11 and SE12;

a length B which is the length of a document detected by the sensor SE2;

a voltage Vf into which the vibration of the motor M2 is converted;

a driving current Ih of the motor M2 for a high-speed run;

a driving current Im of the motor M2 for a middle-speed run;

a driving current Il of the motor M2 for a low-speed run;

minimum driving currents $Ih_{min}$, $Im_{min}$ and $Il_{min}$ which are the lower limits of the driving currents in the respective cases;

a vibration frequency $f_M$ of the motor M2; and thresholds $Vf_1$, $Vf_2$ and $Vf_3$ of the vibration level of the motor M2.

Further, flags are described.

A reading start flag commands start of operation of the document feeder 20. This flag is turned on in response to an operation start signal transmitted from the copying machine 10 to the CPU 3000.

An in-operation flag indicates that the document feeder 20 is in operation.

A feeding wait flag commands inhibition of feeding of a document.

A Vm fixing flag commands inhibition of changes of the transport speed during a series of motions.

A reading flag indicates that an image of a document is being read.

A scan inhibiting flag commands inhibition of image reading even while a document is passing the reading section 2200.

A second-time flag indicates that a document is passing the reading section 2200 for the second time.

A third-time flag indicates that a document is passing the reading section 2200 for the third time.

A discharge flag indicates that a document is being discharged onto the discharge tray 2502.

A switchback flag indicates that a document is making a switchback.

Control Procedure

A control procedure of the document feeder 20 is described referring to the accompanying flowcharts.

Figure 14:
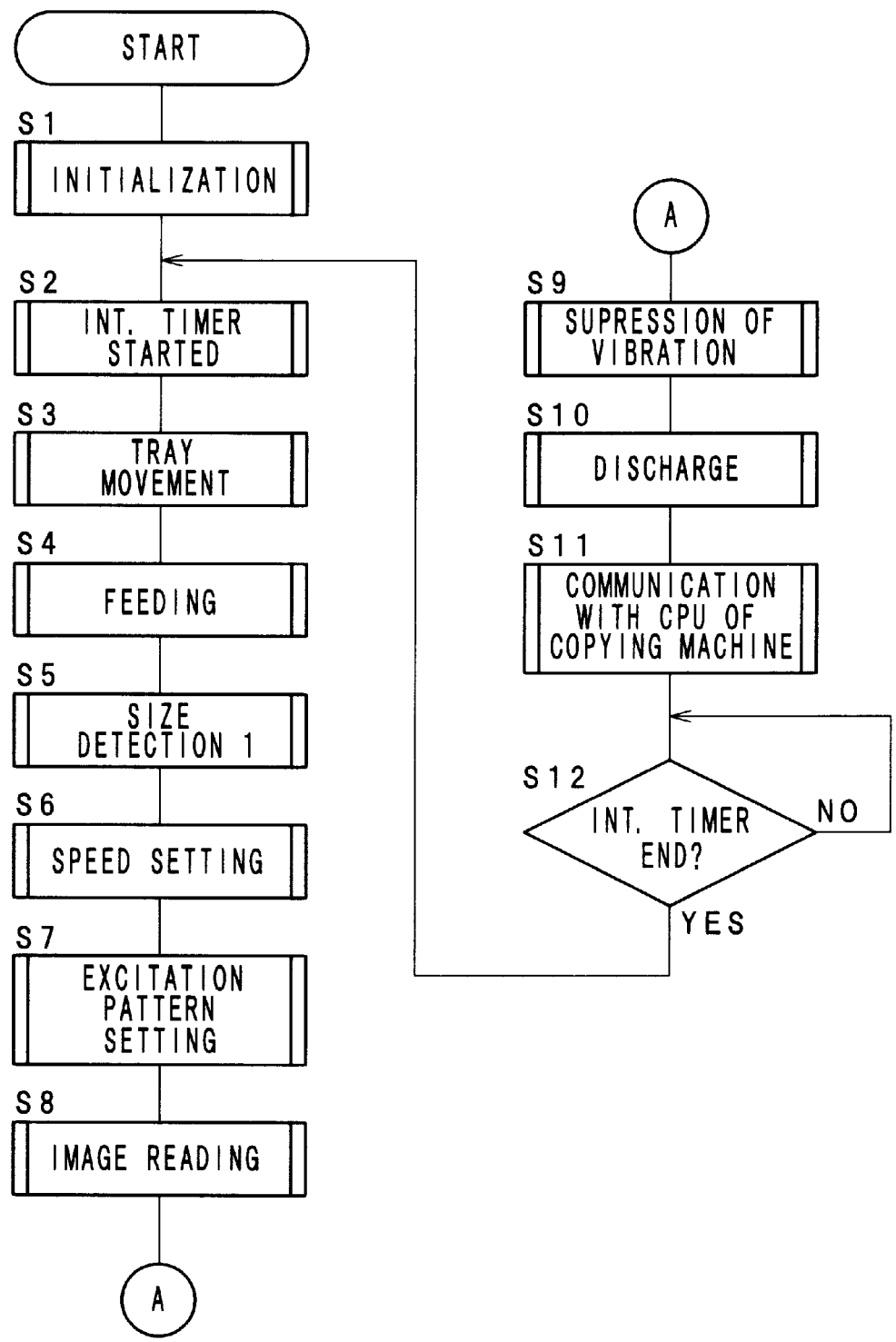
FIG. 14 is a flowchart which shows a main routine of a control procedure.

FIG. 14 shows the main routine of the CPU 3000.

When the copying machine 10 is turned on and the program starts, first at step S1, the devices and the parameters are initialized, and at step S2, an internal timer is started. The internal timer is to determine the time required for one routine, and this timer is set to a specified value at step S1. Timers used in subroutines count based on the time of one routine.

Next, subroutines are called at steps S3 through S11 to carry out necessary processing. The subroutines at steps S3 through S11 will be described below. When the end of the internal timer is judged at step S12, the program returns to step S2.

Figure 15A:
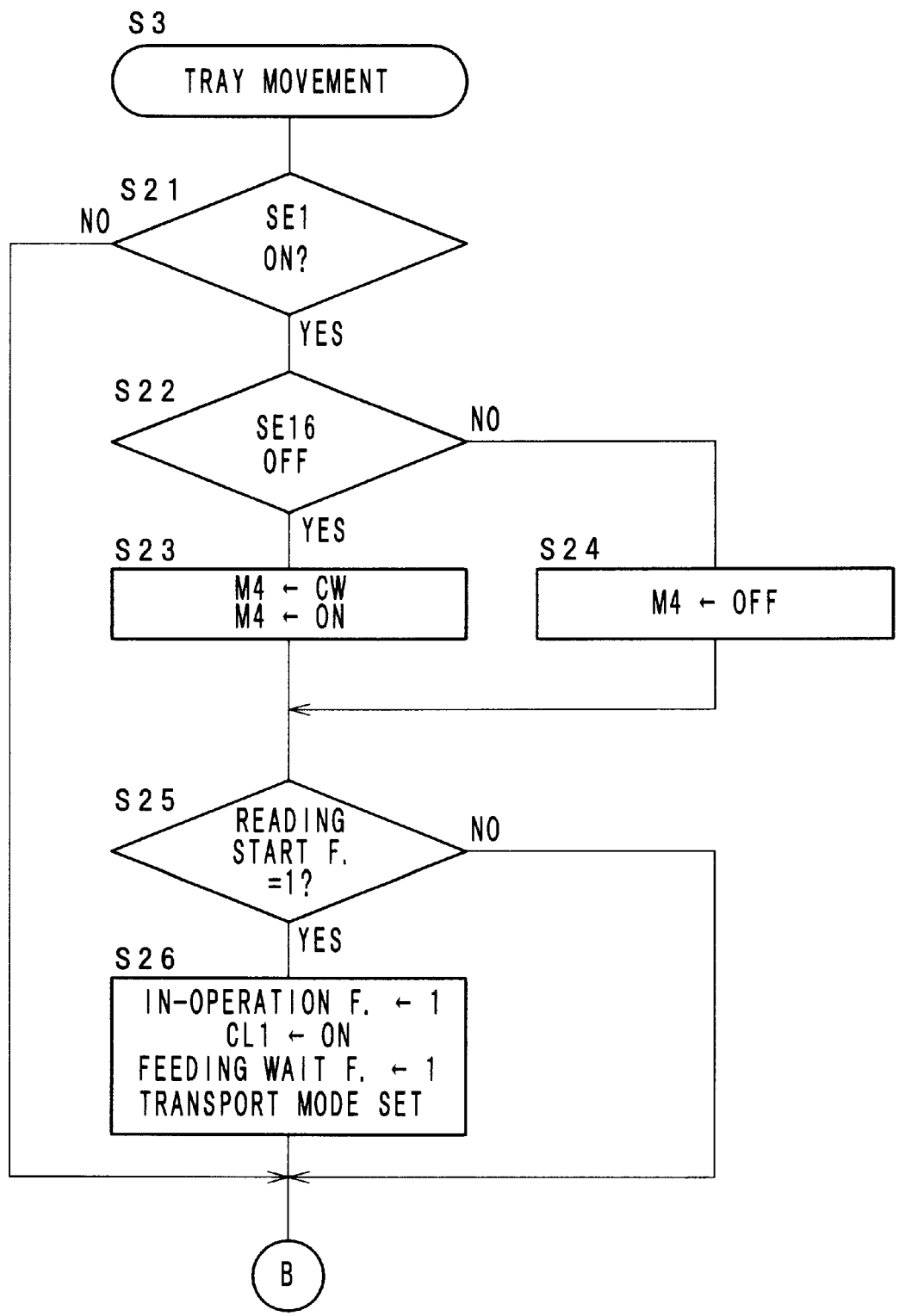
FIGS. 15a and 15b are flowcharts which show a subroutine for movement of a document tray.
Figure 15B:
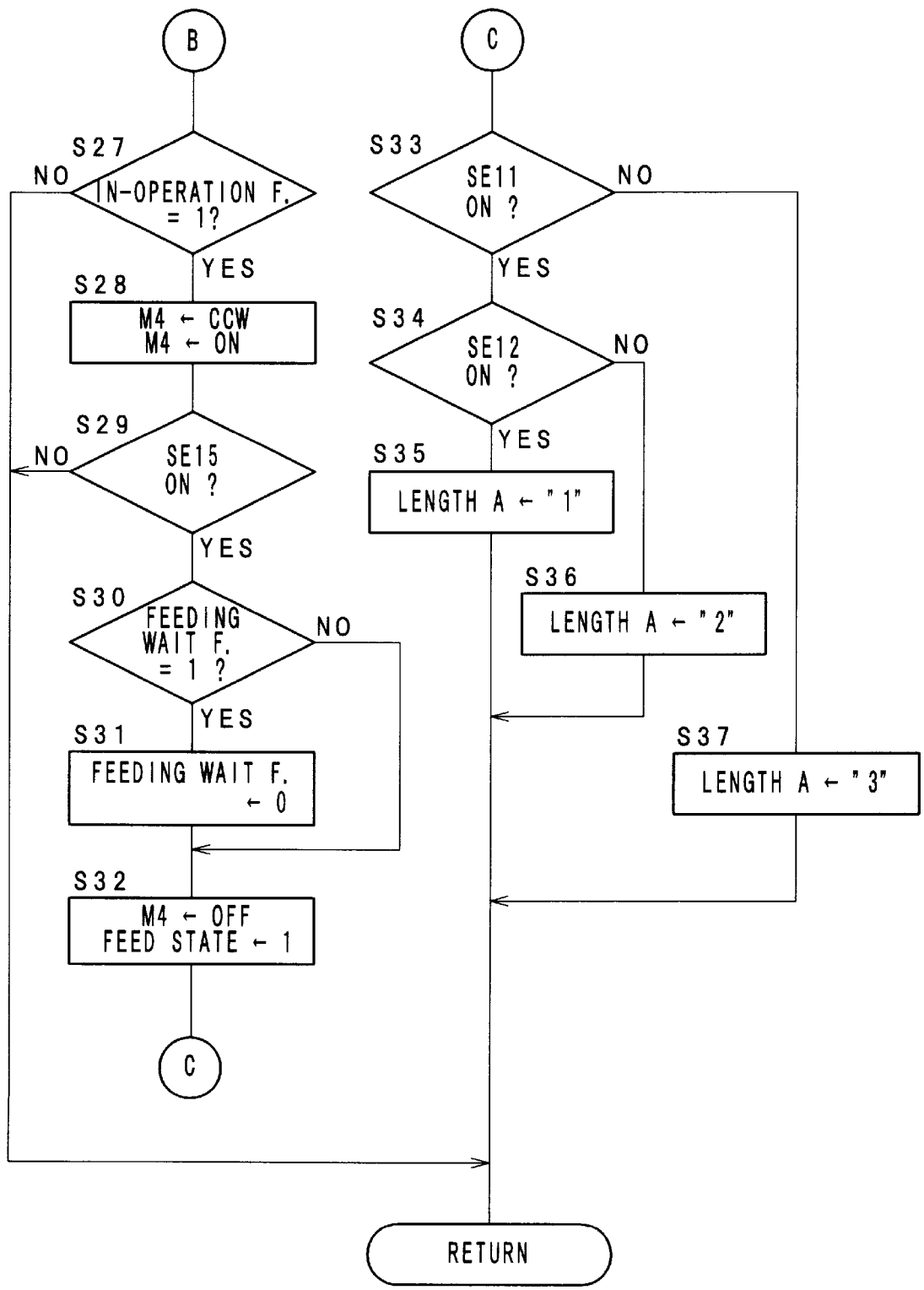

FIGS. 15a and 15b show a subroutine for tray movement which is carried out at step S3.

First at step S21, the empty sensor SE1 is checked. If the sensor SE1 is on, which means that no documents are set on the tray 2101, the lower limit sensor SE16 is checked at step S22. If the sensor SE16 is off, which means that the lift-up plate 2107 is not in the home position, the lift-up motor M4 is set for clockwise rotation and turned on at step S23. Thereby, the lift-up plate 2107 is moved down. If the sensor SE16 is on, which means that the lift-up plate 2107 is in the home position, the motor M4 is turned off at step S24.

Next, when the reading start flag is confirmed to be "1" at step S25, at step S26, the in-operation flag is set to "1", the clutch CL1 is turned on, the feeding wait flag is set to "1", and the transport mode is set to either one of the above-described types "01" through "10" according to the kind of documents and the copy mode.

Next, when the in-operation flag is confirmed to be "1" at step S27, the lift-up motor M4 is set for counterclockwise rotation and turned on at step S28. Then, the upper limit sensor SE15 is checked at step S29. If the sensor SE15 is on, which means that the upper surface of the stack of documents is in contact with the pick-up roller 2102, the feeding wait flag is checked at step S30. If the feeding wait flag is "1", the flag is reset to "0" at step S31. Then, at step S32, the lift-up motor M4 is turned off, and a feed state counter is set to "1".

Next, at steps S33 and S34, the length of the documents on the tray 2101 is recognized from the on/off state of the sensors SE11 and SE12. If the sensors SE11 and SE12 are both on, the length A of the documents is stored as "1" at step S35. If the sensors SE11 and SE12 are on and off respectively, the length A is stored as "2" at step S36. If the sensor SE11 is off, the length A is stored as "3" at step S37.

Figure 16B:
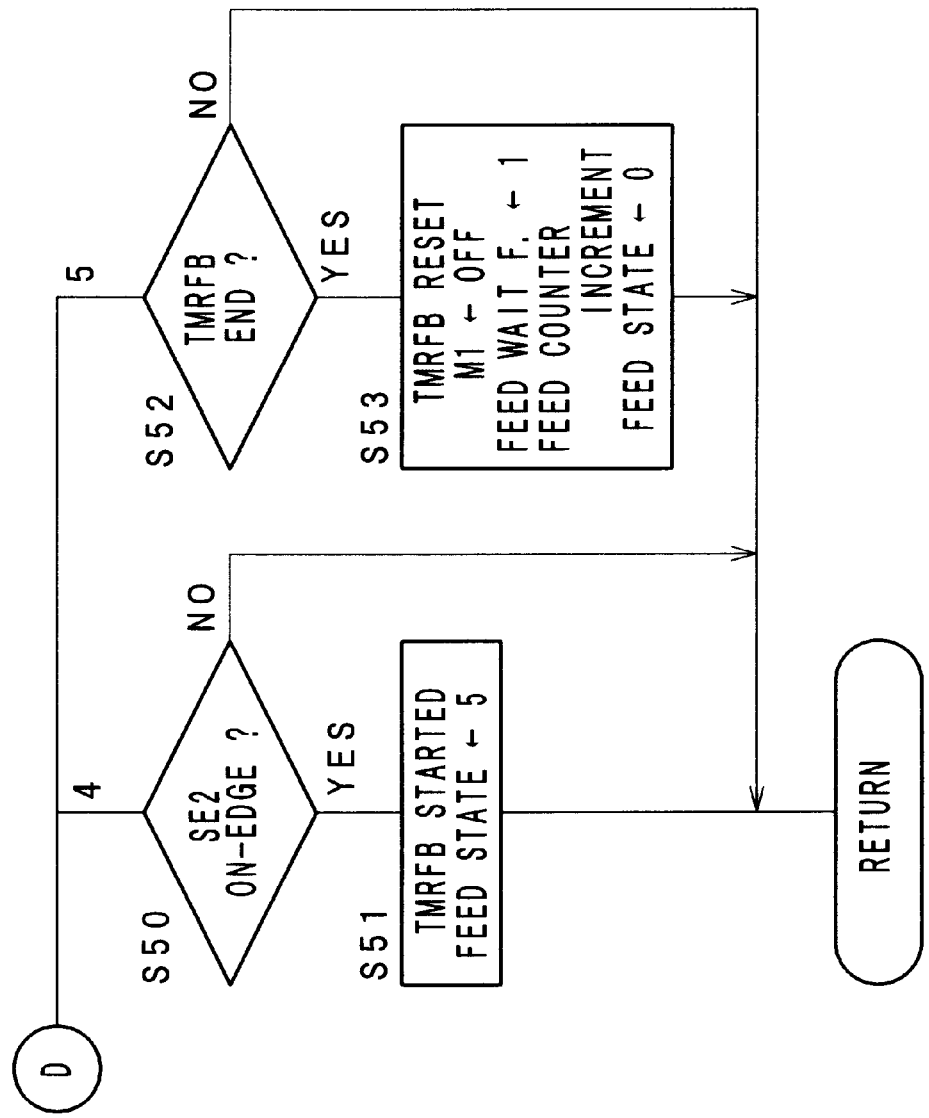

FIGS. 16a and 16b show a subroutine for feeding carried out at step S4.

First, the feeding wait flag is confirmed to be "0" at step S41, and the value of the feed state counter is checked at step S42. Then, the program proceeds according to the counter value.

When the feed state counter is "0", off-state of the empty sensor SE1 (the presence of a document on the tray 2101) is confirmed at step S43. Then, at step S44, the feed state counter is set to "1", and the clutch CL1 is turned on.

When the feed state counter is "1", at step S45, the speed Vn is set to REF (feeding speed), the feed motor M1 is turned on for clockwise rotation, and the feed state counter is set to "2". Thereby, the uppermost document is fed.

When the feed state counter is "2", on-edge of the width reference sensor SE6 is confirmed at step S46, and at step S47, the timer TMRFA is started, a size detection state counter is set to "1", and the feed state counter is set to "3".

When the feed state counter is "3", the end of the timer TMRFA is confirmed at step S48, and at step S49, the clutch CL1 is turned off, the timer TMRFA is reset, and the feed state counter is set to "4".

When the feed state counter is "4", on-edge of the registration sensor SE2 is confirmed at step S50, and at step S51, the timer TMRFB is started, and the feed state counter is set to "5".

When the feed state counter is "5", the end of the timer TMRFA is confirmed at step S52. Then, at step S53, the timer TMRFB is reset, the feed motor M1 is turned off, the feed wait flag is set to "1", and the feed counter gains an increment, and the feed state counter is reset to "0". Thereby, the leading edge of the document is registered by the nip portion of the first read rollers 2201 and is bent.

Figure 17B:
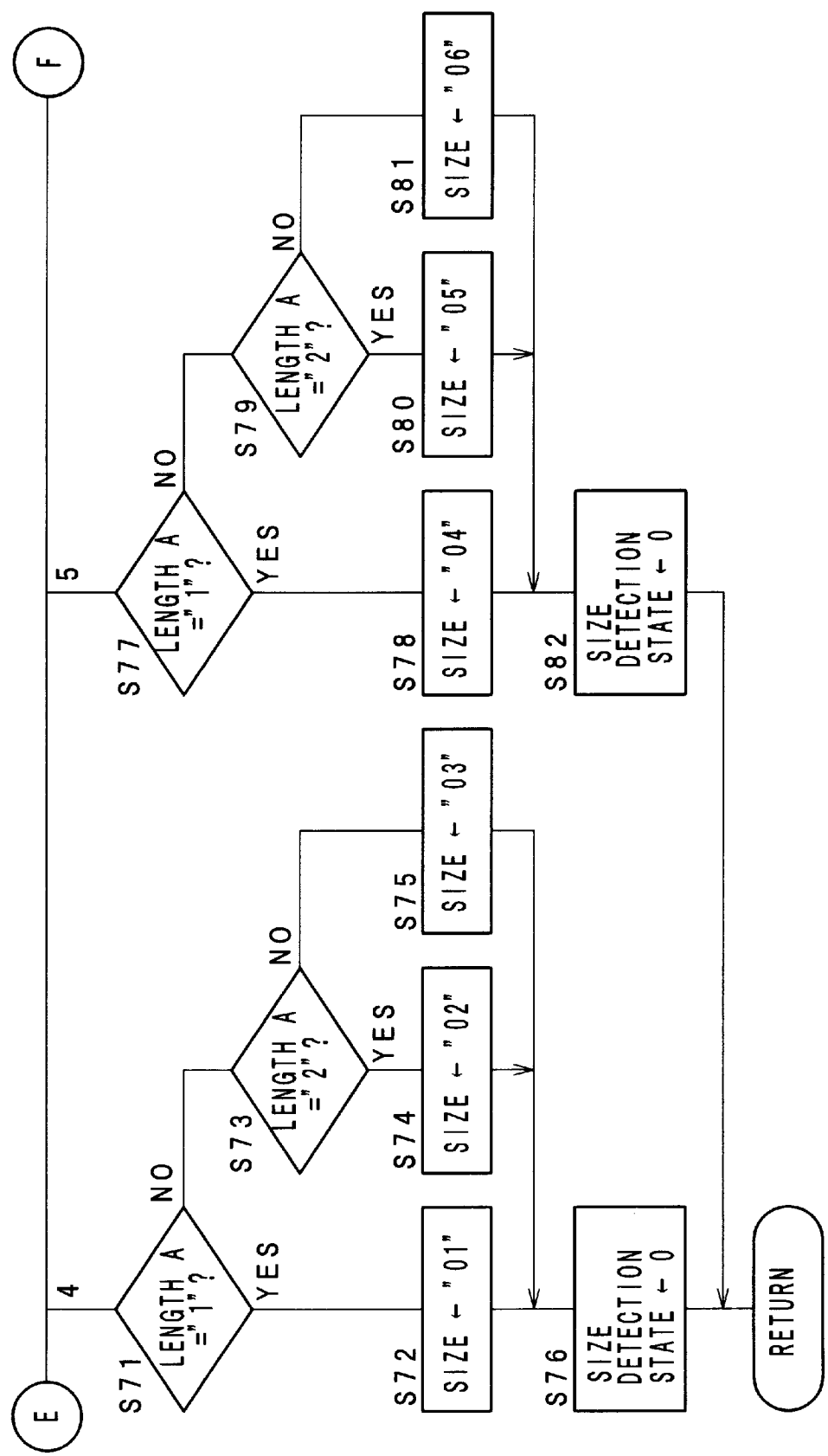
Figure 18A:
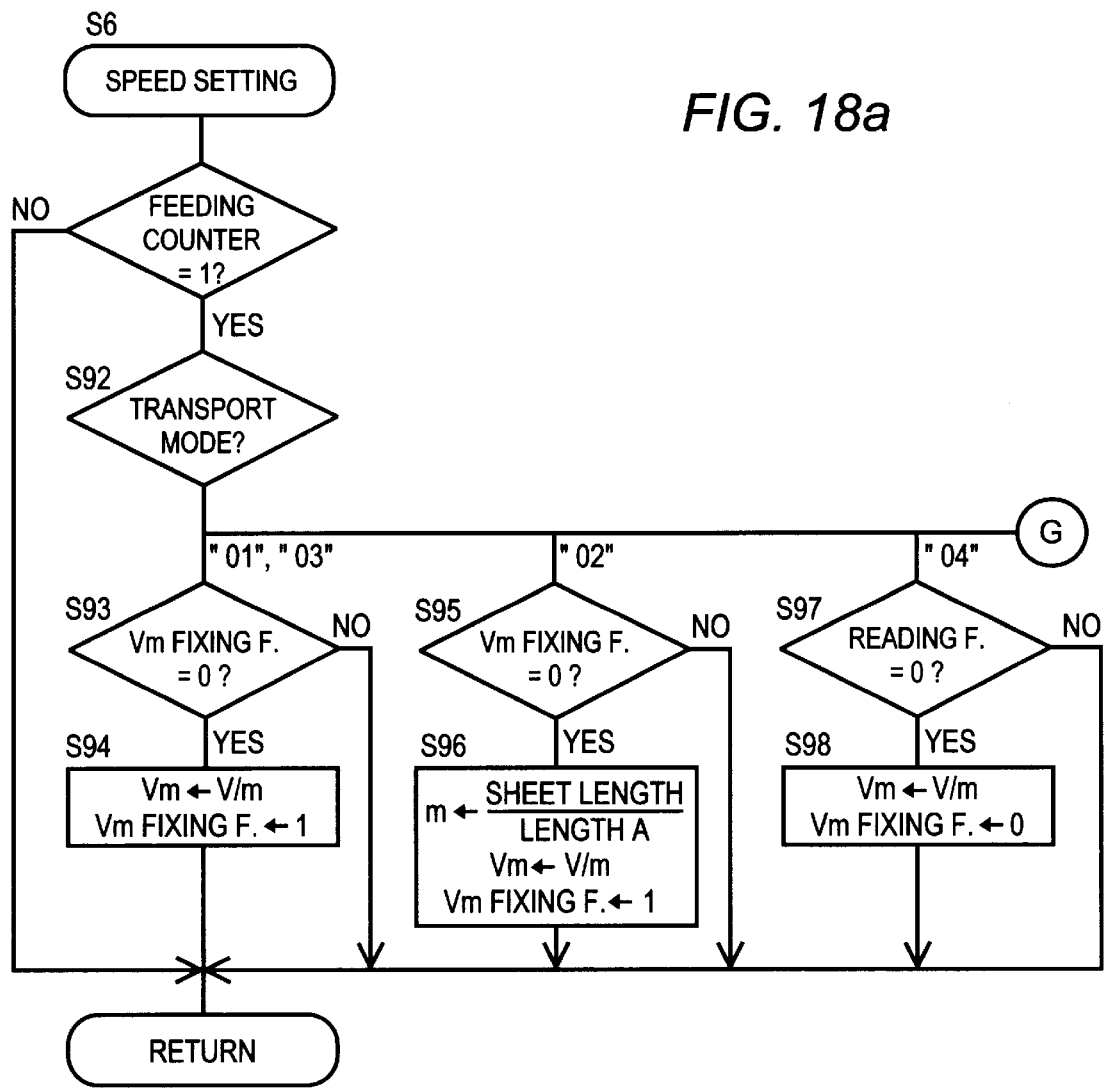
FIGS. 18a through 18e are flowcharts which show a subroutine for speed setting.
Figure 18B:
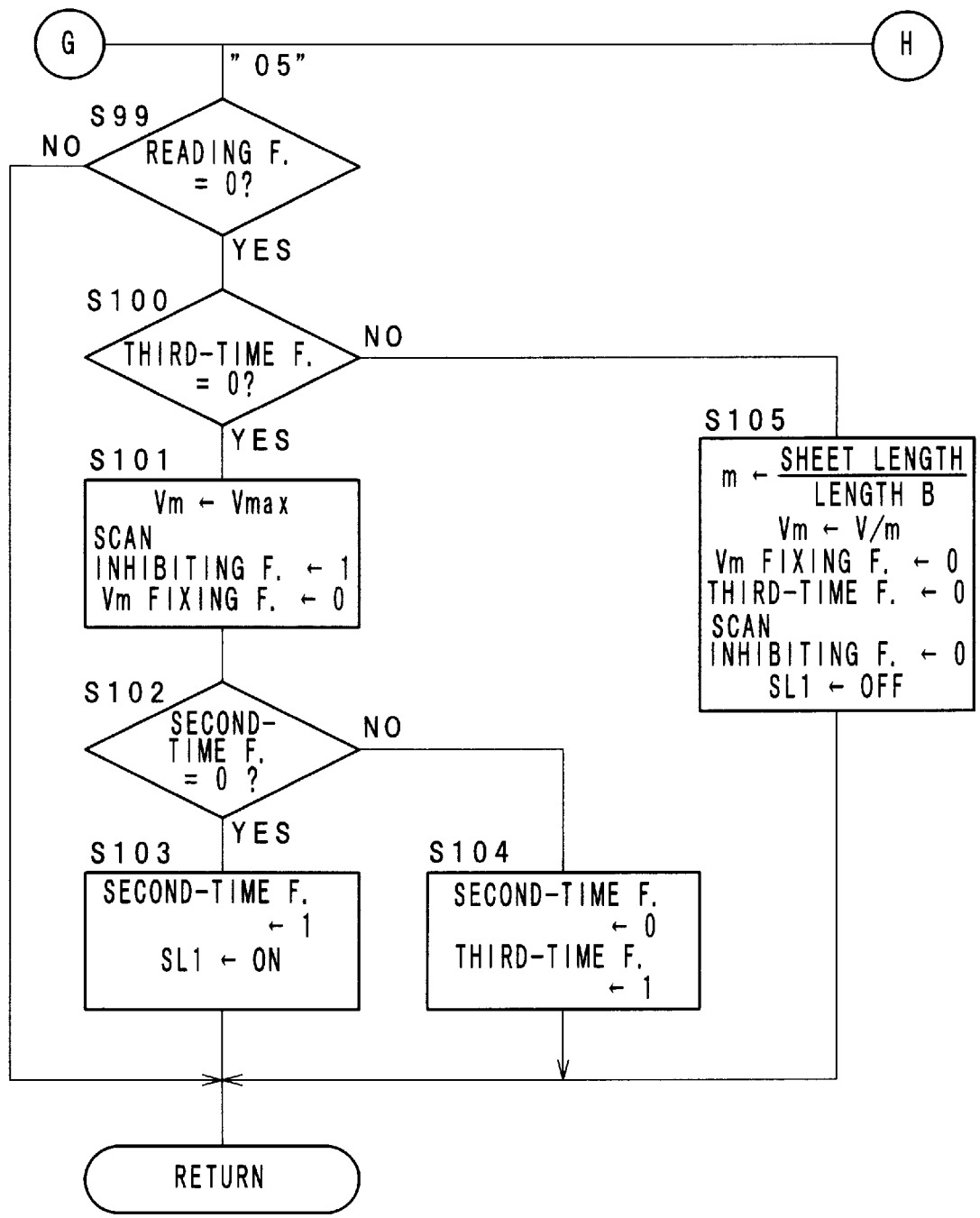
Figure 18C:
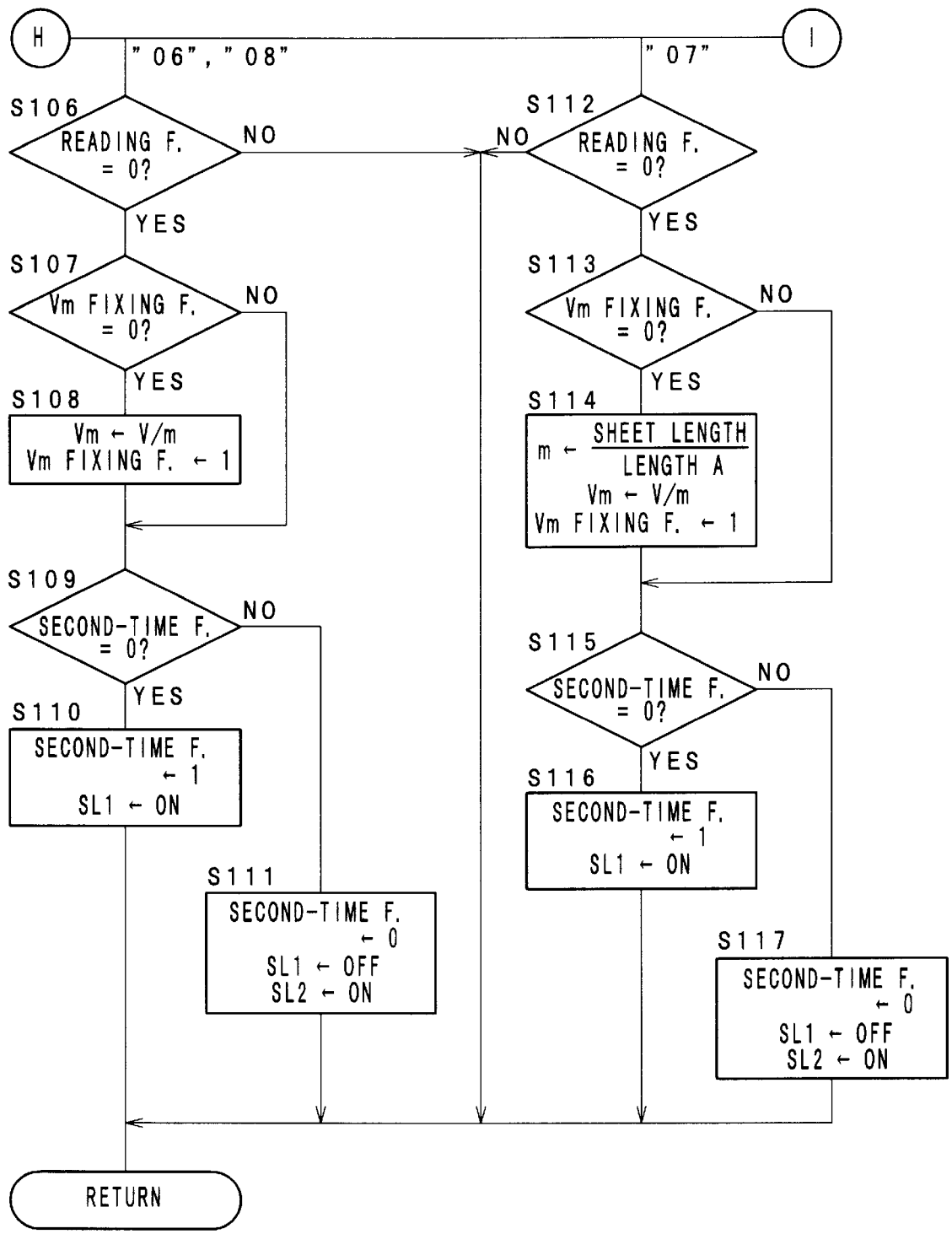
Figure 18D:
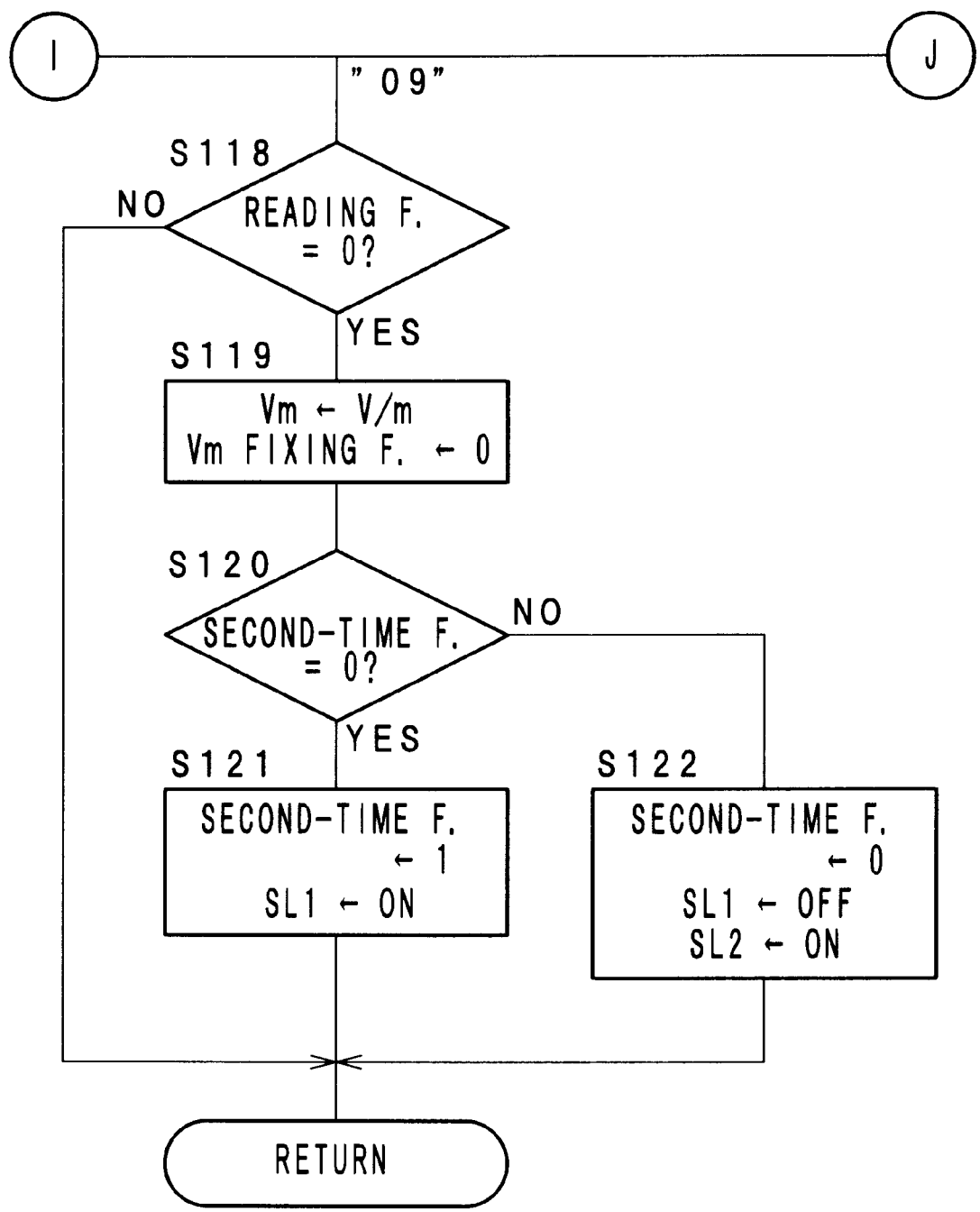
Figure 18E:
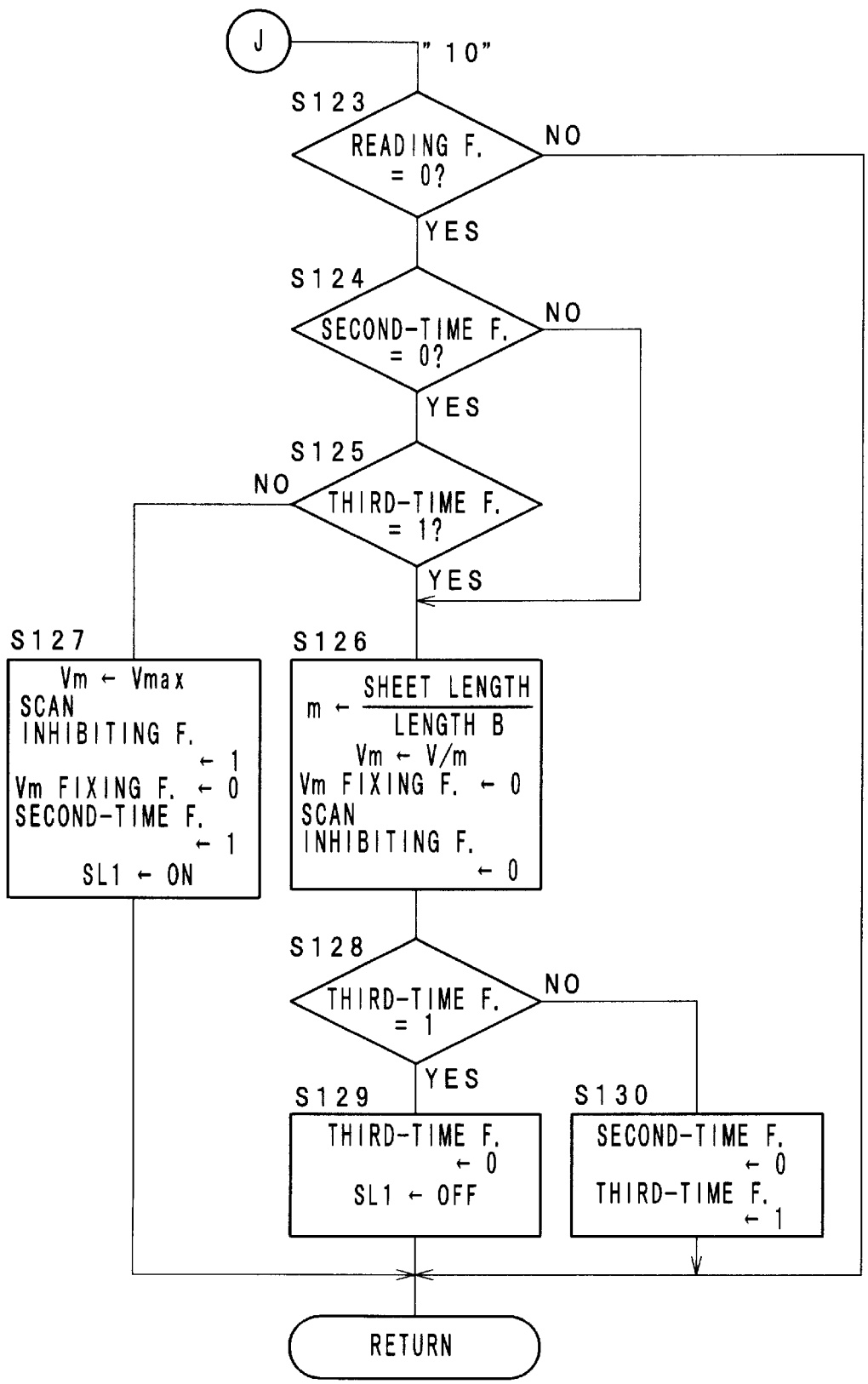

FIGS. 17a, 17b and 17c show a subroutine for size detection 1 carried out at step S5.

In this subroutine, the value of the size detection state counter is checked at step S61, and the program proceeds according to the counter value.

When the size detection state counter is "1" (see step S47), at step S62, the timer TMRD is started, and the size detection state counter is set to "2".

When the size detection state counter is "2", the end of the timer TMRD is confirmed at step S63, and the state of the width sensor SE7 is judged at step S64. If the sensor SE7 is on, at step S65, the timer TMRD is reset, the width is stored as "1", and the size detection state counter is set to "4". If the sensor SE7 is off, at step S66, the timer TNRD is reset and started again, and the size detection state counter is set to "3".

When the size detection state counter is "3", the end of the timer TMRD is confirmed at step S67, and the state of the sensor SE7 is judged at step S68. If the sensor SE7 is on, at step S69, the timer TMRD is reset, the width is stored as "2", and the size detection state counter is set to "5". If the sensor SE7 is off, at step S70, the timer TMRD is reset, and the size detection state counter is set to "6".

When the size detection state counter is "4", the stored data on the length A (see steps S35 through S37) is read at steps S71 and S73. If the length A is "1", the document size is stored as "01" at step S72. If the length A is "2", the document size is stored as "02" at step S74. If the length A is "3", the document size is stored as "03" at step S75. Then, the size detection state counter is reset to "0" at step S76.

When the size detection state counter is "5", the stored data on the length A (see steps S35 through S37) is read at steps S77 and S79. If the length A is "1", the document size is stored as "04" at step S78. If the length A is "2", the document size is stored as "05" at step S80. If the length A is "3", the document size is stored as "06" at step S81. Then, the size detection state counter is reset to "0" at step S82.

When the size detection state counter is "6", the stored data on the length A (see steps S35 through S37) is read at step S83 and S85. If the length A is "1", the document size is stored as "07" at step S84. If the length A is "2", the document size is stored as "08" at step S86. If the length A is "3", the document size is stored as "09" at step S87. Then, the size detection state counter is reset to "0" at step S88. Although the width has been described as to be detected one of six sizes in the description referring to FIGS. 6 through 8, here, the width is described as to be detected as one of three sizes (the sensor SE7 has two levers).

FIGS. 18a through 18e show a subroutine for speed setting carried out at step S6.

First, when the feed state counter is confirmed to be "1", the transport mode is checked at step S92, and the program proceeds according to the mode.

When the transport mode is "01" or "03", the Vm fixing flag is confirmed to be "0" at step S93, and at step S94, the speed Vm is set to V/m (V: transport speed when the copying magnification is "1", m: copying magnification), and the Vm fixing flag is set to "1".

When the transport mode is "02", the Vm fixing flag is confirmed to be "0" at step S95, and at step S96, the copying magnification m is set to "copy sheet length/length A", the speed Vm is set to V/m, and the Vm fixing flag is set to "1".

When the transport mode is "04", the reading flag is confirmed to be "0" at step S97, and at step S98, the speed Vm is set to V/m, and the Vm fixing flag is reset to "0".

When the transport mode is "05", the reading flag is confirmed to be "0" at step S99, and the third-time flag is checked at step S100. If the third-time flag is "0", at step S101, the speed Vm is set to the maximum speed Vmax, the scan inhibiting flag is set to "1", and the Vm fixing flag is reset to "0". Further, the second-time flag is checked at step S102. If the second-time flag is "0", at step S103, the second-time flag is set to "1", and the solenoid SL1 is turned on. If the second-time flag is "1", at step S104, the second-time flag is reset to "0", and the third-time flag is set to "1".

On the other hand, if the third-time flag is judged to be "1" at step S100, at step S105, the copying magnification m is set to "copy sheet length/length B", the speed Vm is set to V/m, and the Vm fixing flag is reset to "0". Further, the third-time flag is reset to "0", the scan inhibiting flag is reset to "0", and the solenoid SL1 is turned off.

When the transport mode is "06" or "08", the reading flag is confirmed to be "0" at step S106, and the Vm fixing flag is checked at step S107. If the Vm fixing flag is "0", at step S108, the speed Vm is set to V/m, and the Vm fixing flag is set to "1". Next, the second-time flag is checked at step S109. If the second-time flag is "0", at step S110, the second-time flag is set to "1", and the solenoid SL1 is turned on. If the second-time flag is "1", at step S111, the second-time flag is reset to "0", the solenoid SL1 is turned off, and the solenoid SL2 is turned on.

When the transport mode is "07", the reading flag is confirmed to be "0" at step S112, and the Vm fixing flag is checked at step S113. If the flag is "0", at step S114, the copying magnification m is set to "copy sheet length/length A", the speed Vm is set to V/m, and the Vm fixing flag is set to "1". Next, the second-time flag is checked at step S115. If the flag is "0", at step S116, the second-time flag is set to "1", and the solenoid SL1 is turned on. If the second-time flag is "1", at step S117, the second-time flag is reset to "0", the solenoid SL1 is turned off, and the solenoid SL2 is turned on.

When the transport mode is "09", the reading flag is confirmed to be "0" at step S118, and at step S119, the speed Vm is set to V/m, and the Vm fixing flag is reset to "0". Next, the second-time flag is checked at step S120. If the flag is "0", at step S121, the second-time flag is set to "1", and the solenoid SL1 is turned on. If the second-time flag is "1", at step S122, the second-time flag is reset to "0", the solenoid SL1 is turned off, and the solenoid SL2 is turned on.

When the transport mode is "10", the reading flag is confirmed to be "0" at step S123, and the second-time flag is checked at step S124. If the second-time flag is "0", the third-time flag is checked at step S125. If the third-time flag is "1" or if the second-time flag is judged to be "1" at step S124, at step S126, the copying magnification m is set to "copy sheet length/length B", the speed Vm is set to V/m, the Vm fixing flag is reset to "0", and the scan inhibiting flag is reset to "0". Next, the third-time flag is checked at step S128. If the flag is "1", at step S129, the third-time flag is reset to "0", and the solenoid SL1 is turned off. If the third-time flag is "0", at step S130, the second-time flag is reset to "0", and the third-time flag is set to "1". On the other hand, if the third-time flag is judged to be "0" at step S125, at step S127, the speed Vm is set to the maximum speed Vmax, the scan inhibiting flag is set to "1", and the Vm fixing flag is reset to "0". Further, the second-time flag is set to "1", and the solenoid SL1 is turned on.

Figure 19A:
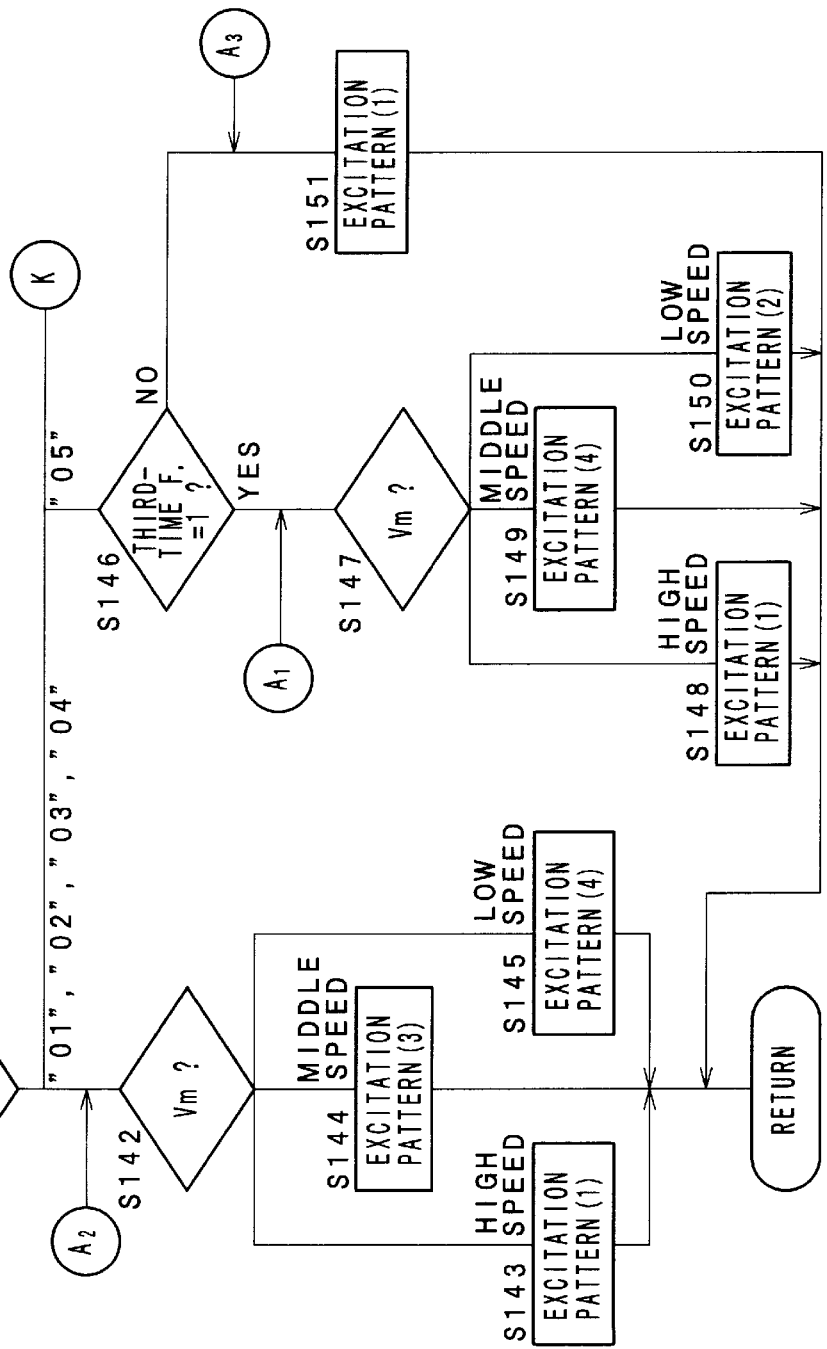
FIGS. 19a and 19b are flowcharts which show a subroutine for excitation pattern setting.
Figure 19B:
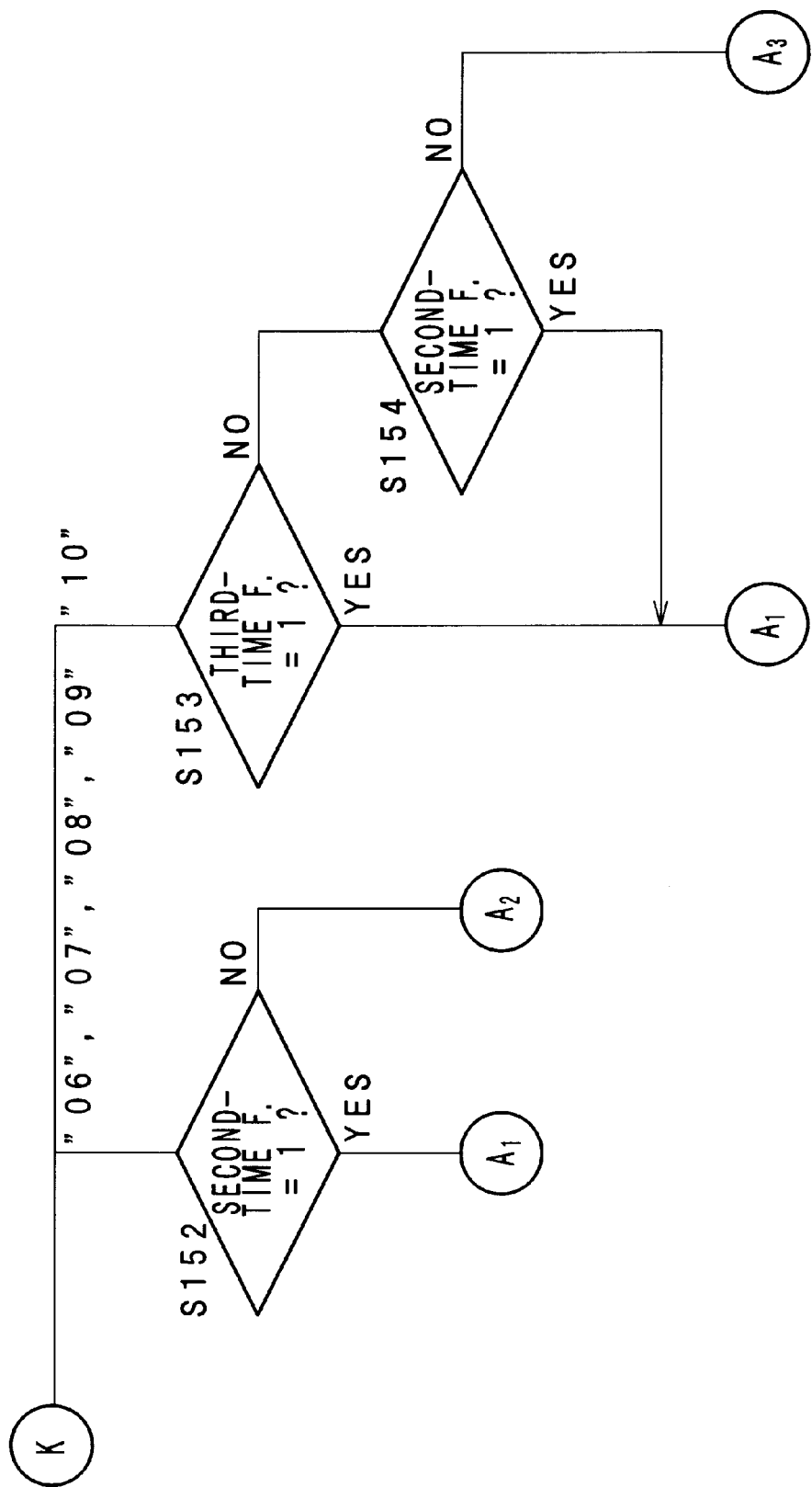

FIGS. 19a and 19b show a subroutine for excitation pattern setting carried out at step S7. In the following description, the excitation patterns (1) through (4) mean the ones shown in FIG. 9.

In this subroutine, first, the transport mode is checked at step S141, and the program proceeds according to the mode.

When the transport mode is "01", "02", "03" or "04", the speed Vm is checked at step S142. If the speed Vm is high, the excitation pattern is set to (1) at step S143. If the speed Vm is middle, the excitation pattern is set to (3) at step S144. If the speed Vm is low, the excitation pattern is set to (2) at step S145.

When the transport mode is "05", the third-time flag is checked at step S146, and if the flag is "1", the speed Vm is checked at step S147. If the speed Vm is high, the excitation pattern is set to (1) at step S148. If the speed Vm is middle, the excitation pattern is set to (4) at step S149. If the speed Vm is low, the excitation pattern is set to (2) at step S150. On the other hand, if the third-time flag is judged to be "0" at step S146, the magnetization pattern is set to (1) at step S151.

When the transport mode is "06", "07", "08" or "09", the second-time flag is checked at step S152, If the flag is "1", the program proceeds to steps S147 through S150. If the flag is "0", the program proceeds to steps S142 through S145.

When the transport mode is "10", the third-time flag is checked at step S153. If the flag is "1", the program proceeds to step S147 through S150. If the third-time flag is "0", the second-time flag is checked at step S154. If the second-time flag is "1", the program proceeds to steps S147 through S150. If the second-time flag is "0", the program proceeds to step S151.

Figure 20A:
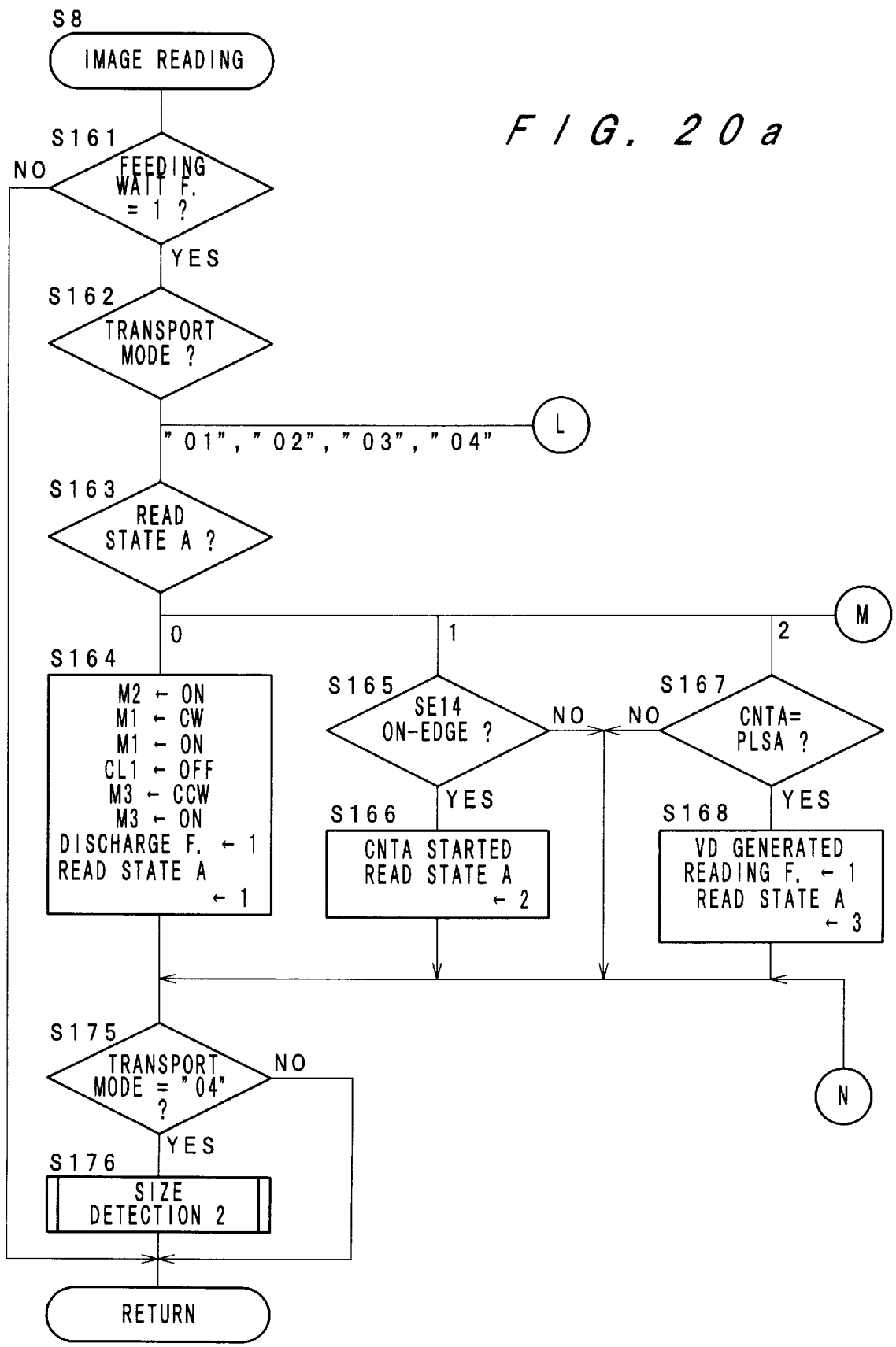
FIGS. 20a, 20b and 20c are flowcharts which show a subroutine for image reading.
Figure 20B:
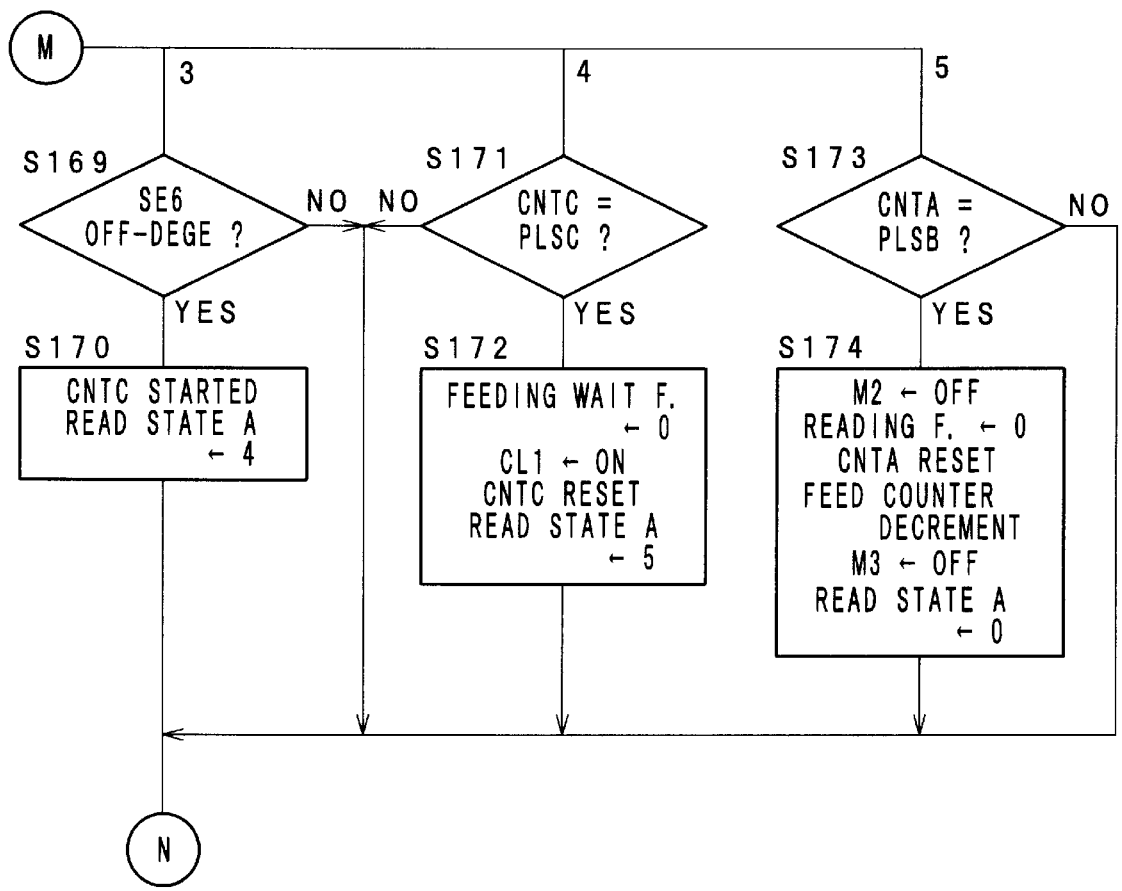
Figure 20C:
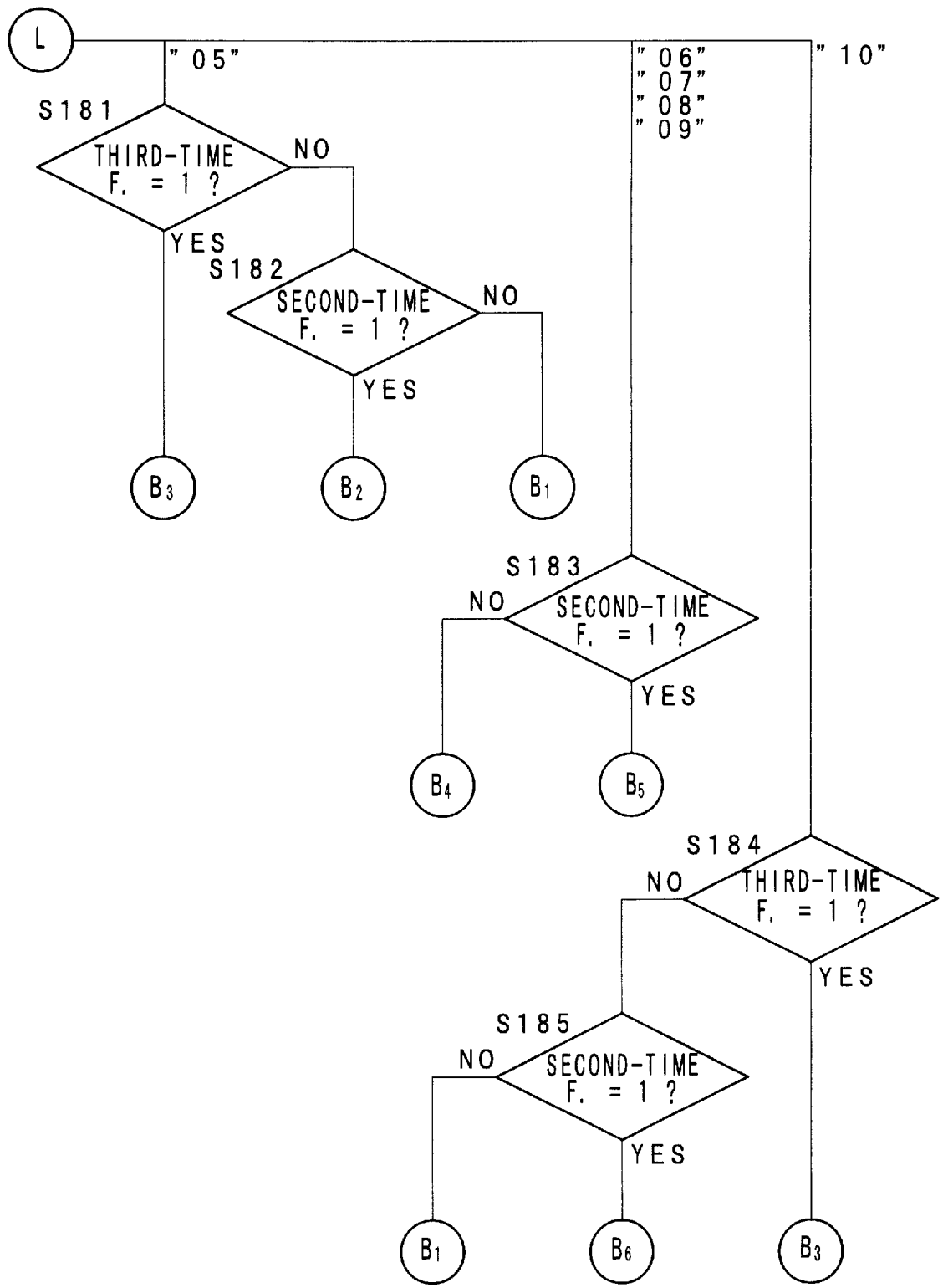

FIGS. 20a, 20b and 20c show a subroutine for image reading carried out at step S8.

In this subroutine, first, the feeding wait flag is confirmed to be "1" at step S161, and the transport mode is checked at step S162. Then, the program proceeds according to the transport mode.

When the transport mode is "01", "02", "03" or "04", a read state counter A is checked at step S163, and the program proceeds according to the counter value.

When the read state counter A is "0", at step S164, the transport motor M2 is turned on, the feed motor M1 is turned on for clockwise rotation, and the clutch CL1 is turned off. Further, the discharge motor M3 is turned on for counterclockwise rotation, the discharge flag is set to "1", and the read state counter A is set to "1".

When the read state counter A is "1", on-edge of the read sensor SE14 (arrival of the leading edge of a document at the read sensor SE14) is confirmed at step S165. Then, at step S166, the counter CNTA of the transport motor M2 is started, and the read state counter A is set to "2".

When the read state counter A is "2", the value of the counter CNTA is checked at step S167. When the counter value becomes equal to the value PLSA, which means that the leading edge of the document reaches the reading position 190, at step S168, a reading start timing signal VD is generated, the reading flag is set to "1", and the read state counter A is set to "3".

When the read state counter A is "3", at step S169, off-edge of the width reference sensor SE6 is confirmed, that is, it is confirmed that the trailing edge of the document has passed the sensor SE6. Then, at step S170, the counter CNTC of the feed motor M1 is started, and the read state counter A is set to "4".

When the read state counter A is "4", the value of the counter CNTC is checked at step S171. When the counter value becomes equal to the value PLSC, which means that it is time to allow feeding of the next document, at step S172, the feeding wait flag is reset to "0", the clutch CL1 is turned on, the counter CNTC is reset, and the read state counter A is set to "5". Thereby, feeding of the next document is started.

When the read state counter A is "5", the value of the counter CNTA is checked at step S173. When the counter value becomes equal to the value PLSB, which means that the trailing edge of the document has passed the reading position 190, at step S174, the transport motor M2 is turned off, the reading flag is reset to "0", and the counter CNTA is reset. Further, the feed counter makes a decrement, the discharge motor M3 is turned off, and the read state counter A is reset to "0".

Thereafter, if the transport mode is judged to be "04" at step S175, size detection 2 is carried out at step S176. In other words, if the mixed load mode is selected, the length of each document is detected by the sensor SE2.

When the transport mode is "05", the third-time flag and the second-time flag are checked at steps S181 and S182 respectively. If the third-time flag is "1", the program proceeds to steps S231 through S244 which will be described later. Otherwise, if the second-time flag is "1", the program proceeds to steps S211 through S221 which will be described later. If the second-time flag is "0", which means that the document is to pass through the reading section 2200 for the first time, the program proceeds to steps S191 through S200 which will be described later.

When the transport mode is "06", "07", "08" or "09", the second-time flag is checked at step S183. If the second-flag is "1", the program proceeds to steps S271 through S284 which will be described later. If the second-time flags is "0", which means that the document is to pass through the reading section 2200 for the first time, the program proceeds to steps S251 through S267 which will be described later.

When the transport mode is "10", the third-time flag and the second-time flag are checked at steps S184 and S185 respectively. If the third-time flag is "1", the program proceeds to steps S231 through S244. Otherwise, if the second-time flag is "1", the program proceeds to steps S291 through S307 which will be described later. If the second-time flag is "0", which means that the document is to pass through the reading section 2200 for the first time, the program proceeds to steps S191 through S200.

Figure 21:
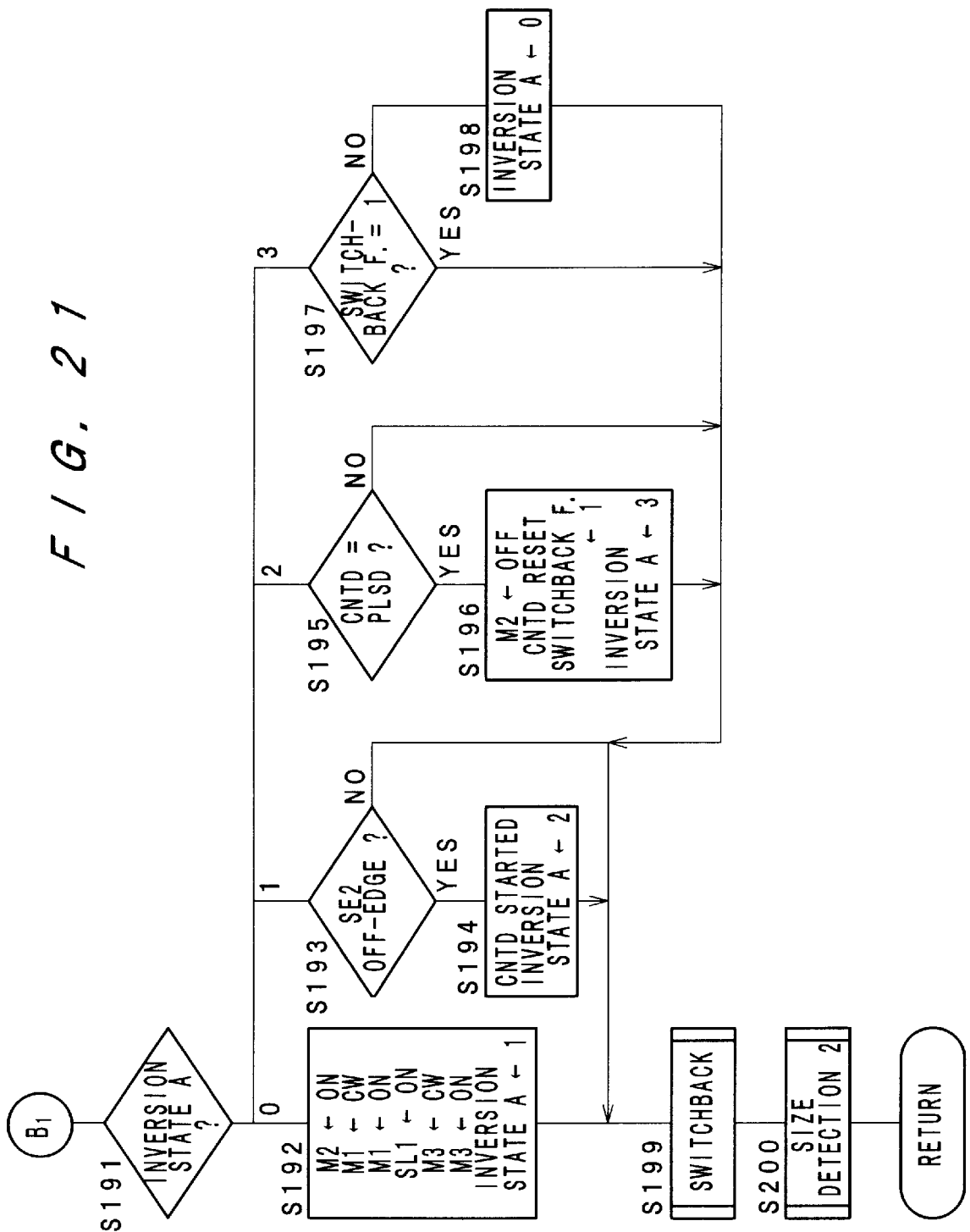
FIG. 21 is a flowchart which shows a subroutine for a first case of handling after image reading.

FIG. 21 shows a subroutine which is carried out when a document passes the reading section 2200 for the first time in the transport mode of "05" or "10". First, an inversion state counter A is checked at step S191, and the program proceeds according to the counter value.

When the inversion state counter A is "0", at step S192, the transport motor M2 is turned on, the feed motor M1 is turned on for clockwise rotation, and the solenoid SL1 is turned on. Further, the discharge motor M3 is turned on for clockwise rotation, and the inversion state counter A is set to "1". Thereby, transport of the document from the first read rollers 2201 is started.

When the inversion state counter A is "1", at step S193, off-edge of the registration sensor SE2 is confirmed at step S193, that is, it is confirmed that the trailing edge of the document has passed the sensor SE2. Then, at step S194, the counter CNTD of the transport motor M2 is started, and the inversion state counter A is set to "2".

When the inversion state counter A is "2", the value of the counter CNTD is checked at step S195. When the counter value becomes equal to the value PLSD, which means that the trailing edge of the document has passed the second read rollers 2203, at step S196, the transport motor M2 is turned off, and the counter CNTD is reset. Further, the switchback flag is set to "1", and the inversion state counter A is set to "3". Thereafter, the document makes a switchback at step S199, and the size of the document is detected at step S200.

When the inversion state counter A is "3", reset of the switchback flag is confirmed at step S197. Then, the inversion state counter A is reset to "0" at step S198.

Figure 22:
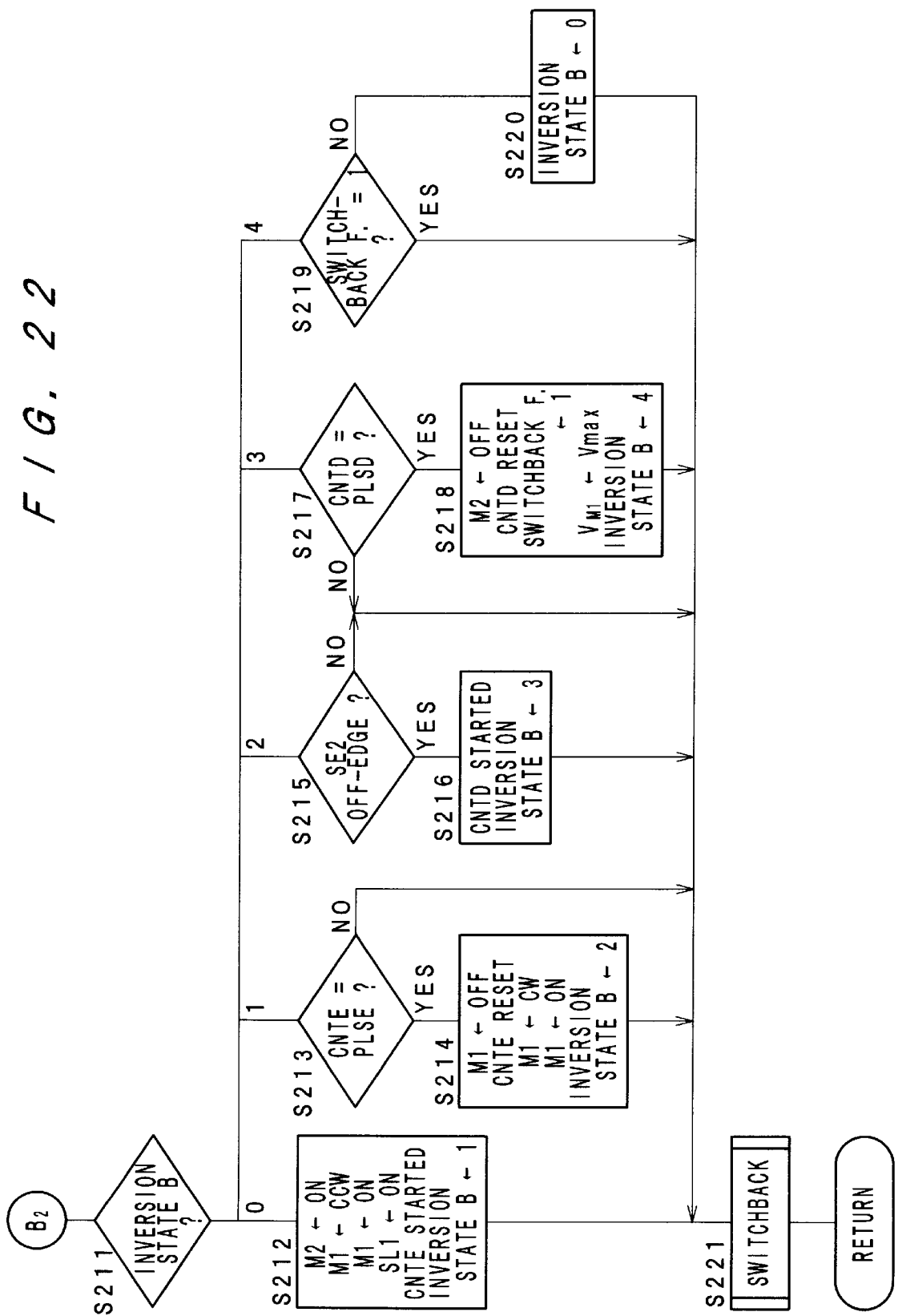
FIG. 22 is a flowchart which shows a subroutine for a second case of handling after image reading.

FIG. 22 shows a subroutine which is carried out when a document passes through the reading section 2200 for the second time in the transport of "05". First, an inversion state counter B is checked at step S211, and the program proceeds according to the counter value.

When the inversion state counter B is "0", at step S212, the transport motor M2 is turned on, the feed motor M1 is turned on for counterclockwise rotation, and the solenoid SL1 is turned on. Further, the counter CNTE of the feed motor M1 is started, and the inversion state counter B is set to "1". Thereby, transport of a document which is in the circular path 2310 is started with the leading edge fed from the first read rollers 2201.

The inversion state counter B is "1", the value of the counter CNTE is checked at step S213. When the counter value becomes equal to the value PLSE, which means that the trailing edge of the document has passed the inversion rollers 2302, at step S214, the feed motor M1 is turned off, and the counter CNTE is reset. Further, the feed motor M1 is turned on for clockwise rotation, and the inversion state counter B is set to "2".

When the inversion state counter B is "2", at step S215, off-edge of the registration sensor SE2 is confirmed, that is, it is confirmed that the trailing edge of the document has passed the registration sensor SE2. Then, at step S216, the counter CNTD of the transport motor M2 is started, and the inversion state counter B is set to "3".

When the inversion state counter B is "3", the value of the counter CNTD is checked at step S217. When the counter value becomes equal to the value PLSD, which means that the trailing edge of the document has passed the second read rollers 2203, at step S218, the transport motor M2 is turned off, and the counter CNTD is reset. Further, the switchback flag is set to "1", the speed $V_{M1}$ of the feed motor M1 is set to the maximum speed Vmax, and the inversion state counter B is set to "4". Thereafter, the document makes a switchback at step S221.

When the inversion state counter B is "4", reset of the switchback flag is confirmed at step S219, and the inversion state counter B is reset to "0" at step S220.

Figure 23A:
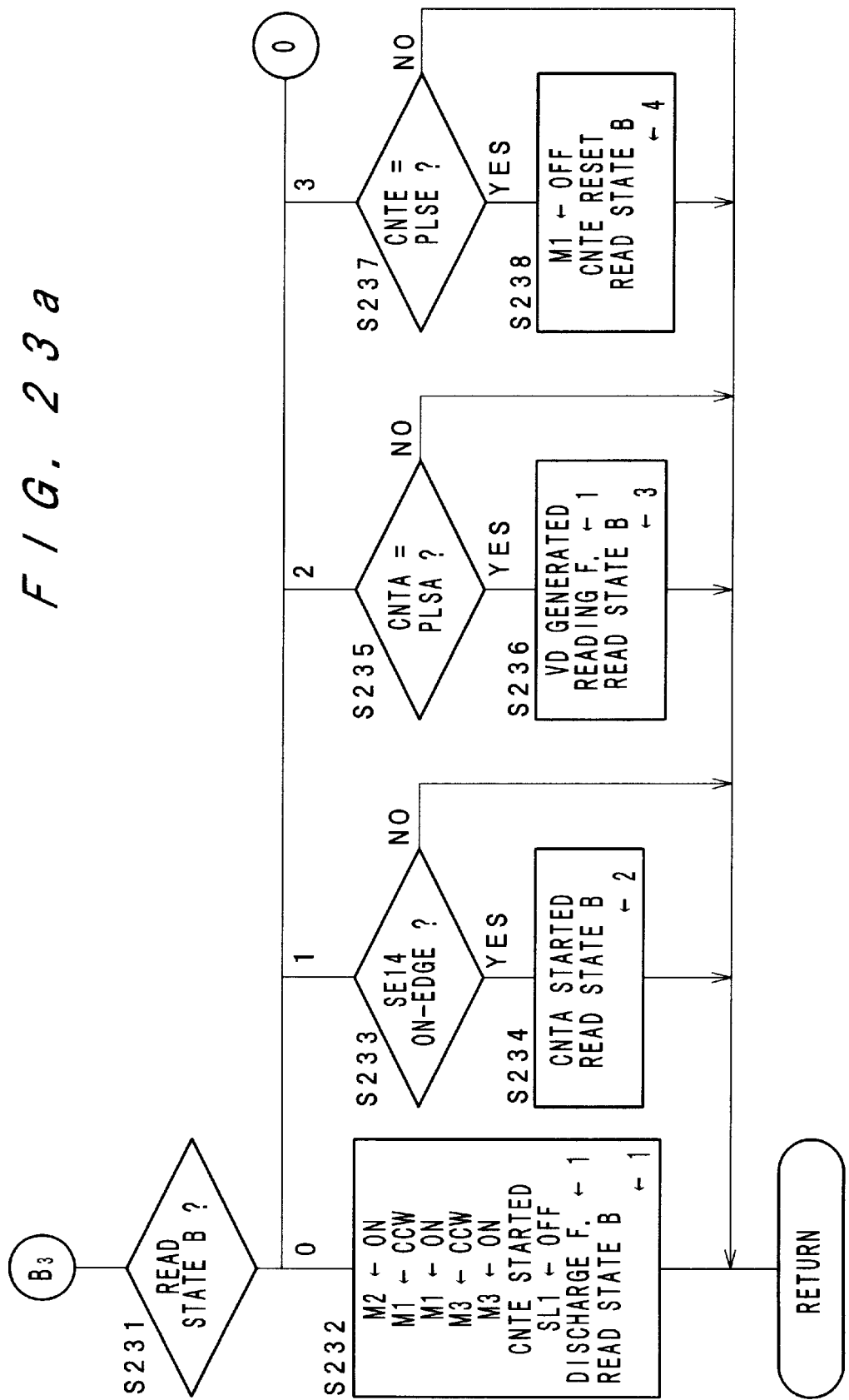
FIGS. 23a and 23b are flowcharts which show a subroutine for a third case of handling after image reading.
Figure 23B:
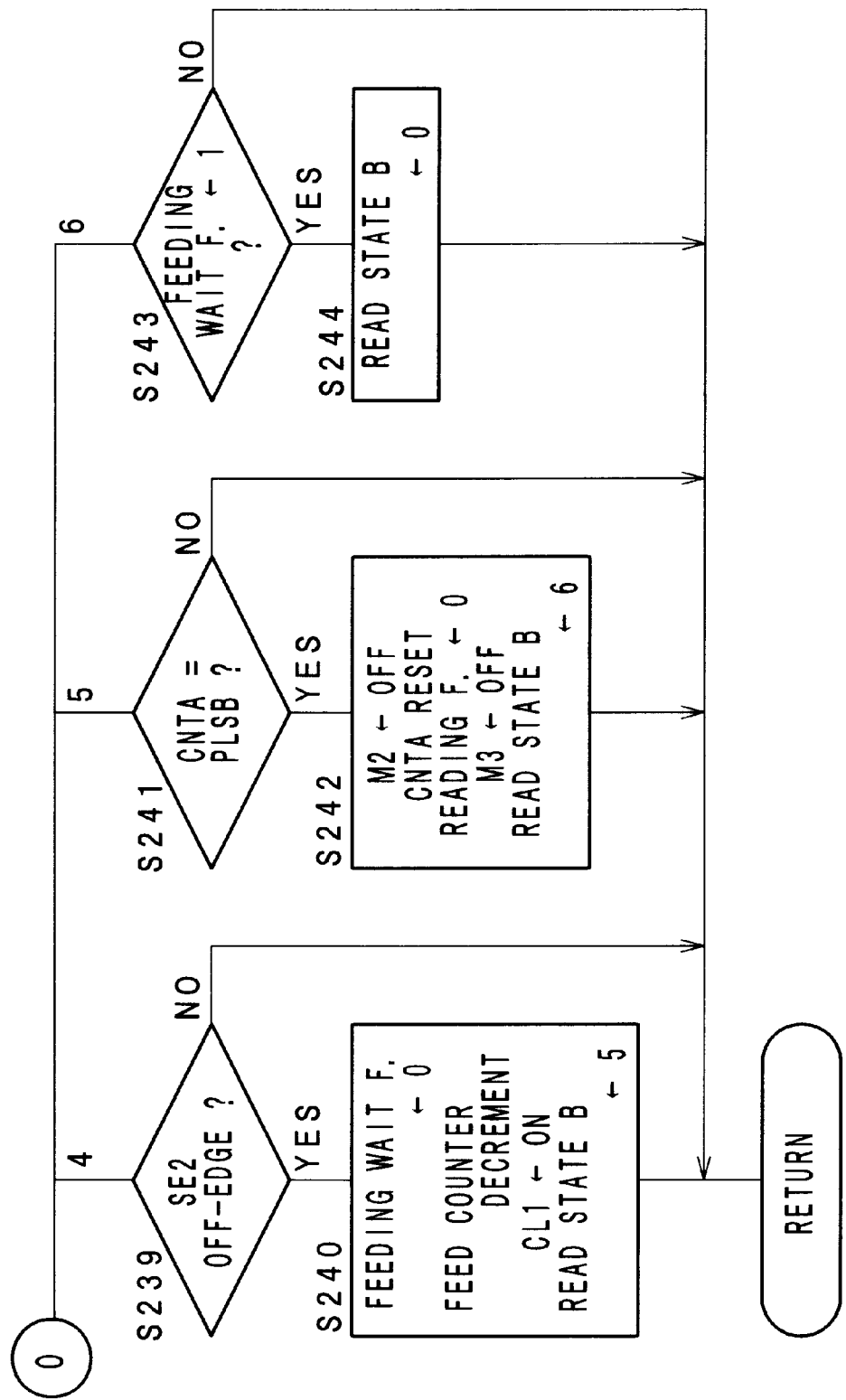

FIGS. 23a and 23b show a subroutine which is carried out when a document passes the reading section 2200 for the third time in the transport mode of "05" or "10". First, a read state counter B is checked at step S231, and the program proceeds according to the counter value.

When the read state counter B is "0", at step S232, the transport motor M2 is turned on, the feed motor M1 is turned on for counterclockwise rotation, and the solenoid SL1 is turned off. Further, the discharge motor M3 is turned on for counterclockwise rotation, and the counter CNTE of the feed motor M1 is started. Furthermore, the discharge flag is set to "1", and the read state counter B is set to "1". Thereby, transport of a document which is in the circular inversion path 2310 is started with the leading edge fed from the first read rollers 2201.

When the read state counter B is "1", at step S233, on-edge of the read sensor SE14 is confirmed, that is, it is confirmed that the leading edge of the document has reached the sensor SE14. Then, at step S234, the counter CNTA of the transport motor M2 is started, and the read state counter B is set to "2".

When the read state counter B is "2", the value of the counter CNTA is checked at step S235. When the counter value becomes equal to the value PLSA, which means that the leading edge of the document has reached the reading position 190, at step S236, the reading start timing signal VD is generated, the reading flag is set to "1", and the read state counter B is set to "3".

When the read state counter B is "3", the value of the counter CNTE is checked at step S237. When the counter value becomes equal to the value PLSE, which means that the trailing edge of the document has passed the circular inversion rollers 2302, at step S238, the feed motor M1 is turned off, the counter CNTE is reset, and the read state counter B is set to "4".

When the read state counter B is "4", at step S239, off-edge of the registration sensor SE2 is confirmed, that is, it is confirmed that the trailing edge of the document has passed the sensor SE2. Then, at step S240, the feeding wait flag is reset to "0", the feed counter makes a decrement, the clutch CL1 is turned on, and the read state counter B is set to "5". Thereby, feeding of the next document is allowed.

When the read state counter B is "5", the value of the counter CNTA is checked at step S241. When the counter value becomes equal to the value PLSB, which means that the trailing edge of the document has passed the reading position 190, at step S242, the transport motor M2 is turned off, the reading flag is reset to "0", and the counter CNTA is reset. Further, the discharge motor M3 is turned off, and the read state counter B is set to "6".

When the read state counter B is "6", at step S243, the feeding wait flag is confirmed to be "1". Then, at step S244, the read state counter B is reset to "0".

Figure 24B:
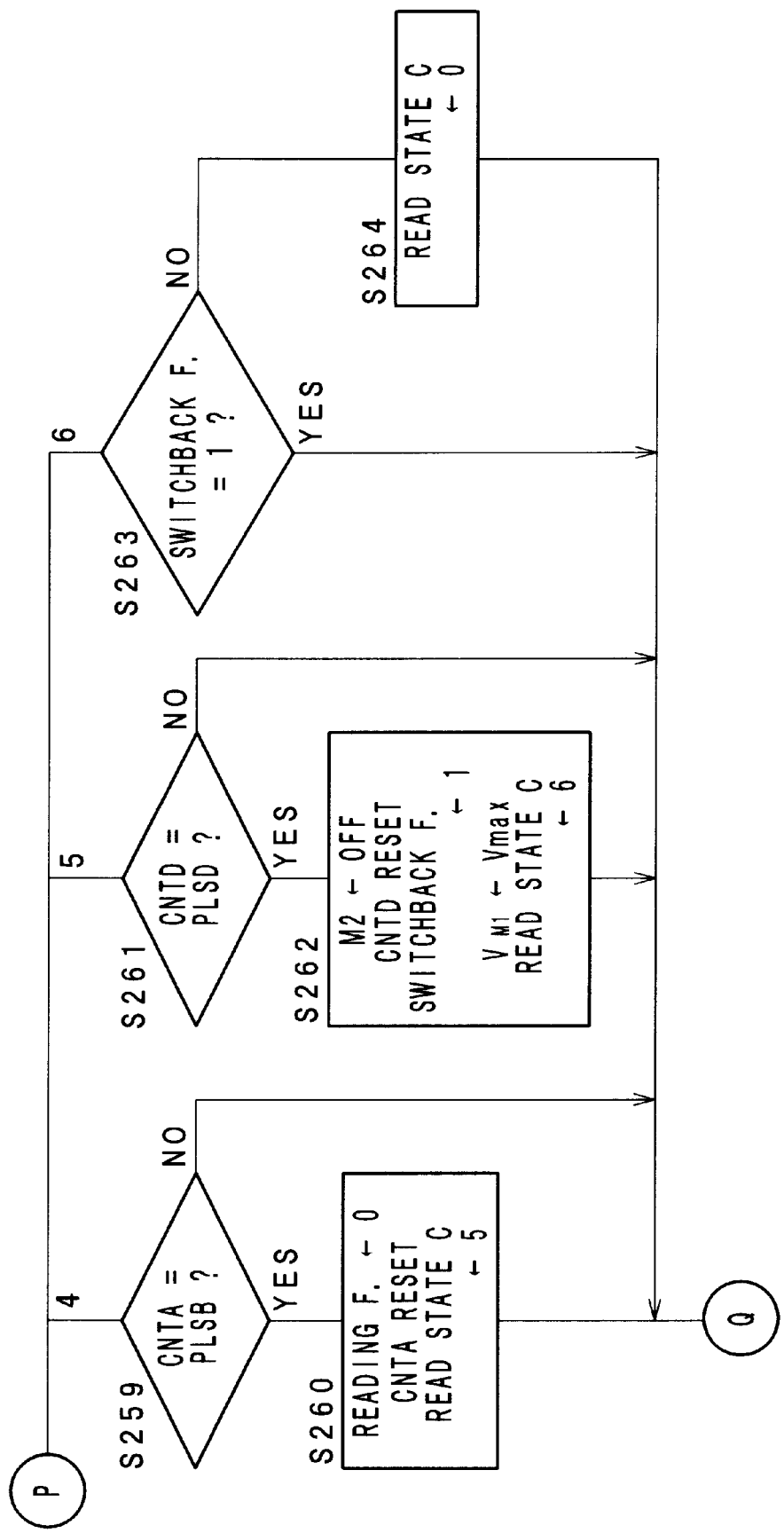

FIGS. 24a and 24b show a subroutine which is carried out when a document passes the reading section 2200 for the first time in the transport mode of "06", "07", "08" or "09". First, a read state counter C is checked at step S251, and the program proceeds according to the counter value.

When the read state counter C is "0", at step S252, the transport motor M2 is turned on, the feed motor M1 is turned on for clockwise rotation, and the solenoid SL1 is turned on. Further, the discharge motor M3 is turned on for counterclockwise rotation, and the read state counter C is set to "1". Thereby, transport of a document from the first read rollers 2201 is started.

When the read state counter C is "1", at step S253, on-edge of the read sensor SE14 is confirmed, that is, it is confirmed that the leading edge of the document has reached the sensor SE14. Then, at step S254, the counter CNTA of the transport motor M2 is started, and the read state counter C is set to "2".

When the read state counter C is "2", the value of the counter CNTA is checked at step S255. When the counter value becomes equal to the value PLSA, which means that the leading edge of the document has reached the reading position 190, at step S256, the reading start timing signal VD is generated, the reading flag is set to "1", and the read state counter C is set to "3".

When the read state counter C is "3", at step S257, off-edge of the registration sensor SE2 is confirmed, that is, it is confirmed that the trailing edge of the document has passed the sensor SE2. Then, at step S258, the counter of the transport motor M2 is started, and the read state counter C is set to "4".

When the read state counter C is "4", the value of the counter CNTA is checked at step S259. When the counter value becomes equal to the value PLSB, which means that the trailing edge of the document has passed the reading position 190, at step S260, the reading flag is reset to "0", the counter CNTA is reset, and the read state counter C is set to "5".

When the read state counter is "5", the value of the counter CNTD is checked at step S261. When the counter value becomes equal to the value PLSD, which means that the trailing edge of the document has passed the second read rollers 2203, at step S262, the transport motor M2 is turned off, and the counter CNTD is reset. Further, the switchback flag is set to "1", the speed $V_{M1}$ of the feed motor M1 is set to the maximum speed Vmax, and the read state counter C is set to "6". Thereafter, the document makes a switchback at step S265. Then, if the transport mode is judged to be "09" at step S266, the document size is detected at step S267.

When the read state counter C is "6", reset of the switchback flag is confirmed at step S263. Then, the read state counter C is reset to "0" at step S264.

FIGS. 25a and 25b show a subroutine which is carried out when a document passes the reading section 2200 for the second time in the transport mode of "06", "07", "08" or "09". First, a read state counter D is checked at step S271, and the program proceeds according to the counter value.

When the read state counter D is "0", at step S272, the transport motor M2 is turned on, the feed motor M1 is turned on for counterclockwise rotation, the solenoid SL1 is turned off, and the solenoid SL2 is turned on. Further, the discharge motor M3 is turned on for clockwise rotation, and the counter CNTE of the feed motor M1 is started. Furthermore, the discharge flag is set to "1", and the read state counter D is set to "1". Thereby, transport of a document which is in the circular path 2310 is started with the leading edge fed from the first read rollers 2201.

When the read state counter D is "1", at step S273, on-edge of the read sensor SE14 is confirmed, that is, it is confirmed that the leading edge of the document has reached the sensor SE14. Then, at step S274, the counter CNTA of the transport motor M2 is started, and the read state counter D is set to "2".

When the read state counter D is "2", the value of the counter CNTA is checked at step S275. When the counter value becomes equal to the value PLSA, which means that the leading edge of the document has reached the reading position 190, at step S276, the reading start timing signal VD is generated, and the reading flag is set to "1", and the read state counter D is set to "3".

When the read state counter D is "3", the value of the counter CNTE is checked at step S277. When the counter value becomes equal to the value PLSE, which means that the trailing edge of the document has passed the circular inversion rollers 2302, at step S278, the feed motor M1 is turned off, the counter CNTE is reset, and the read state counter D is set to "4".

When the read state counter D is "4", at step S279, off-edge of the registration sensor SE2 is confirmed, that is, it is confirmed that the trailing edge of the document has passed the sensor SE2, at step S280, the feeding wait flag is reset to "0", the feed counter makes a decrement, the clutch CL1 is turned on, and the read state counter D is set to "5". Thereby, feeding of the next document is allowed.

When the read state counter D is "5", the value of the counter CNTA is checked at step S281. When the counter value becomes equal to the value PLSB, which means that the trailing edge of the document has passed the reading position 190, at step S282, the transport motor M2 and the discharge motor M3 are turned off, and the clutch CL1 is turned on. Further, the reading flag is reset to "0", the counter CNTA is reset, and the read state counter D is set to "6".

When the read state counter D is "6", the feeding wait flag is confirmed to be "1" at step S283. Then, the read state counter D is reset to "0" at step S284.

Figure 26A:
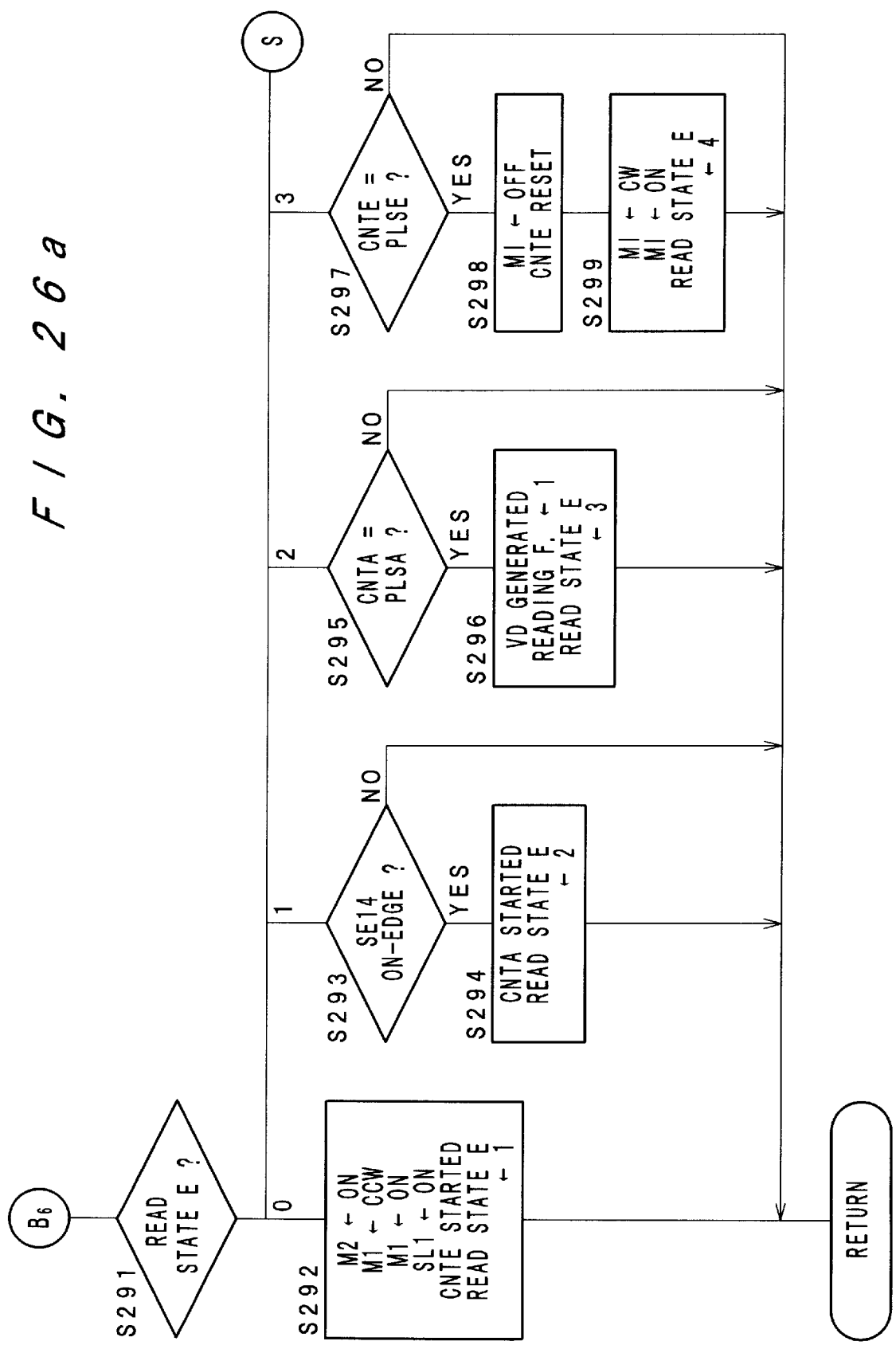
FIGS. 26a and 26b are flowcharts which show a subroutine for a sixth case of handling after image reading.
Figure 26B:
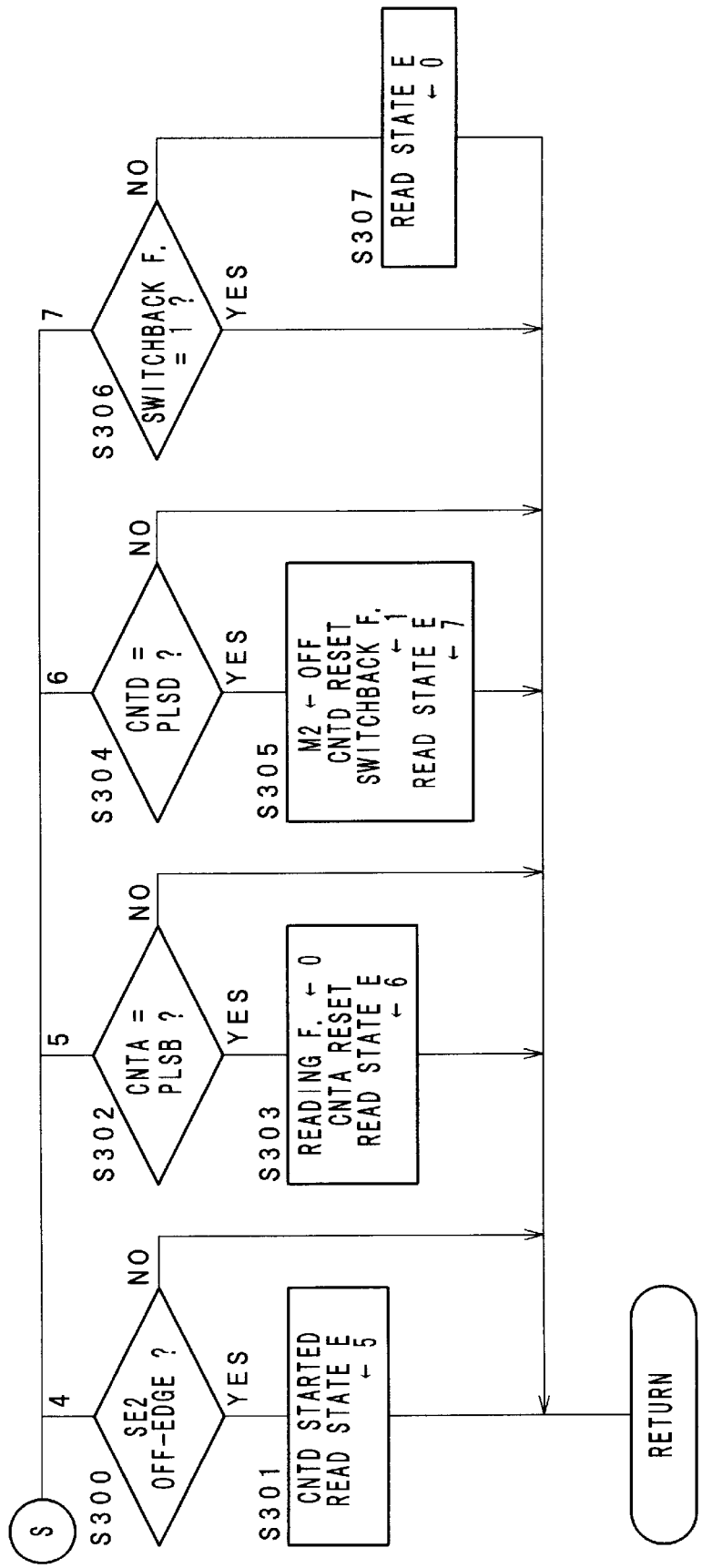

FIGS. 26a and 26b show a subroutine which is carried out when a document passes the reading section 2200 for the second time in the transport mode of "10". First, a read state counter E is checked at step S291, and the program proceeds according to the counter value.

When the read state counter E is "0", at step S292, the transport motor M2 is turned on, the feed motor M1 is turned on for counterclockwise rotation, and the solenoid SL1 is turned on. Further, the counter CNTE of the feed motor M1 is started, and the read state counter E is set to "1". Thereby, transport of a document which is in the circular path 2310 is started with the leading edge fed from the first read rollers 2201.

When the read state counter E is "1", at step S293, on-edge of the read sensor SE14 is confirmed, that is, it is confirmed that the leading edge of the document has reached the sensor SE14. Then, at step S294, the counter CNTA of the transport motor M2 is started, and the read state counter E is set to "2".

When the read state counter E is "2", the value of the counter CNTA is checked at step S295. When the counter value becomes equal to the value PLSA, which means that the leading edge of the document has reached the reading position 190, at step S296, the reading start timing signal VD is generated, the reading flag is set to "1", and the read state counter E is set to "3".

When the read state counter E is "3", the value of the counter CNTE is checked at step S297. When the counter value becomes equal to the value PLSE, which means that the trailing edge of the document has passed the circular inversion rollers 2302, at step S298, the feed motor M1 is turned off, and the counter CNTE is reset. Then, at step S299, the feed motor M1 is turned on for clockwise rotation, and the read state counter E is set to "4".

When the read state counter E is "4", at step S300, off-edge of the registration sensor SE2 is confirmed, that is, it is confirmed that the trailing edge of the document has passed the sensor SE2. Then, at step S301, the counter CNTD of the transport motor M2 is started, and the read state counter E is set to "5".

When the read state counter E is "5", the value of the counter CNTA is checked at step S302. When the counter value becomes equal to the value PLSB, which means that the trailing edge of the document has passed the reading position 190, at step S303, the reading flag is reset to "0", the counter CNTA is reset, and the read state counter E is set to "6".

When the read state counter E is "6", the value of the counter CNTD is checked at step S304. When the counter value becomes equal to the value PLSD, which means that the trailing edge of the document has passed the second read rollers 2203, at step S305, the transport motor M2 is turned off, and the counter CNTD is reset. Further, the switchback flag is set to "1", and the read state counter E is set to "7".

When the read state counter E is "7", at step S306, reset of the switchback flag is confirmed. Then, at step S307, the read state counter E is reset to "0".

Figure 27:
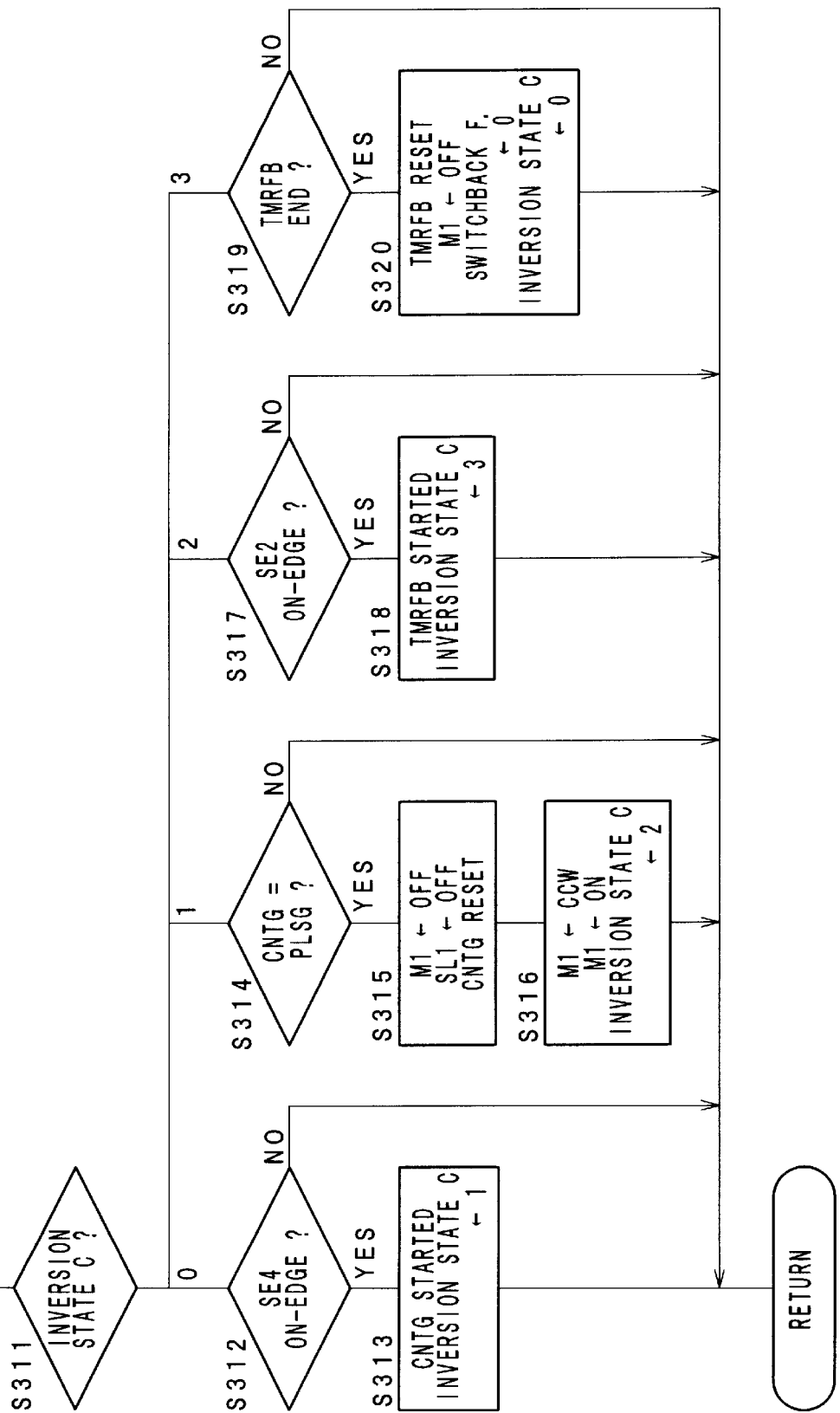
FIG. 27 is a flowchart which shows a subroutine for switchback of a document.

FIG. 27 shows a subroutine for switchback which is carried out at steps S199, S221 and S265. In this subroutine, a document is guided to the circular inverting section 2300 to be inverted and is registered by the nip portion of the first read rollers 2201.

First, an inversion state counter C is checked at step S312, and the program proceeds according to the counter value.

When the inversion state counter C is "0", at step S312, on-edge of the circular inversion sensor SE4 is confirmed, that is, it is confirmed that the leading edge of a document has reached the sensor SE4. Then, at step S313, the counter CNTG of the feed motor M1 is started, and the inversion state counter C is set to "1".

When the inversion state counter C is "1", the value of the counter CNTG is checked at step S314. When the counter value becomes equal to the value PLSG, which means that the trailing edge of the document has passed the resin film 2304, at step S315, the feed motor M1 is turned off, the solenoid SL1 is turned off, and the counter CNTG is reset. Then, at step S316, the feed motor M1 is turned on for counter clockwise rotation, and the inversion state counter C is set to "2".

When the inversion state counter C is "2", at step S317, on-edge of the registration sensor SE2 is confirmed, that is, it is confirmed that the leading edge of the document has reached the sensor SE2. Then, at step S318, the timer TMRFB is started, and the inversion state counter C is set to "3".

When the inversion state counter C is "3", the end of the timer TMRFB is confirmed at step S319. Then, at step S320, the timer TMRFB is reset, the feed motor M1 is turned off, the switchback flag is reset to "0", and the inversion state counter C is reset to "0".

Figure 28A:
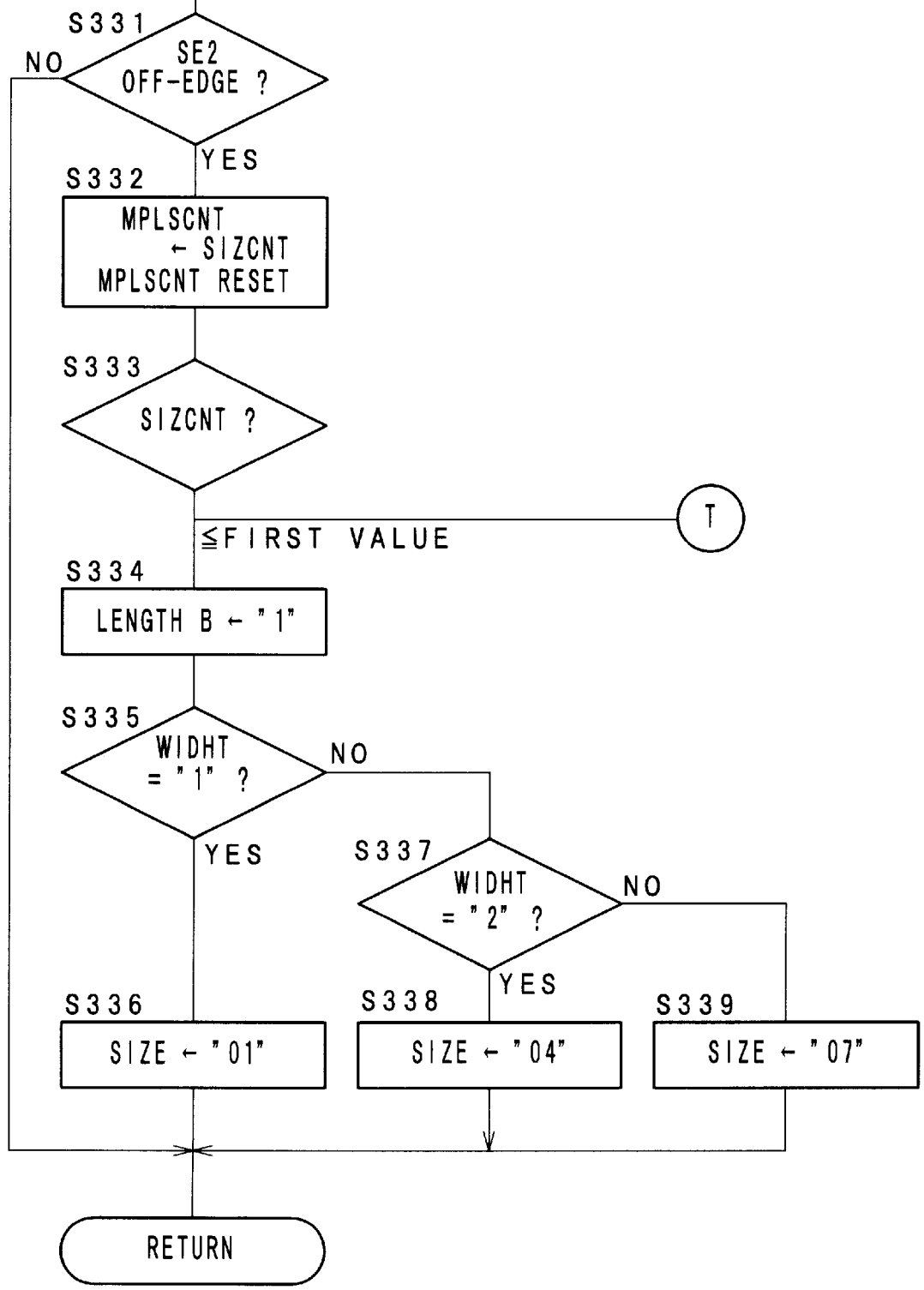
FIGS. 28a and 28b are flowcharts which show a subroutine for document size detection 2.
Figure 28B:
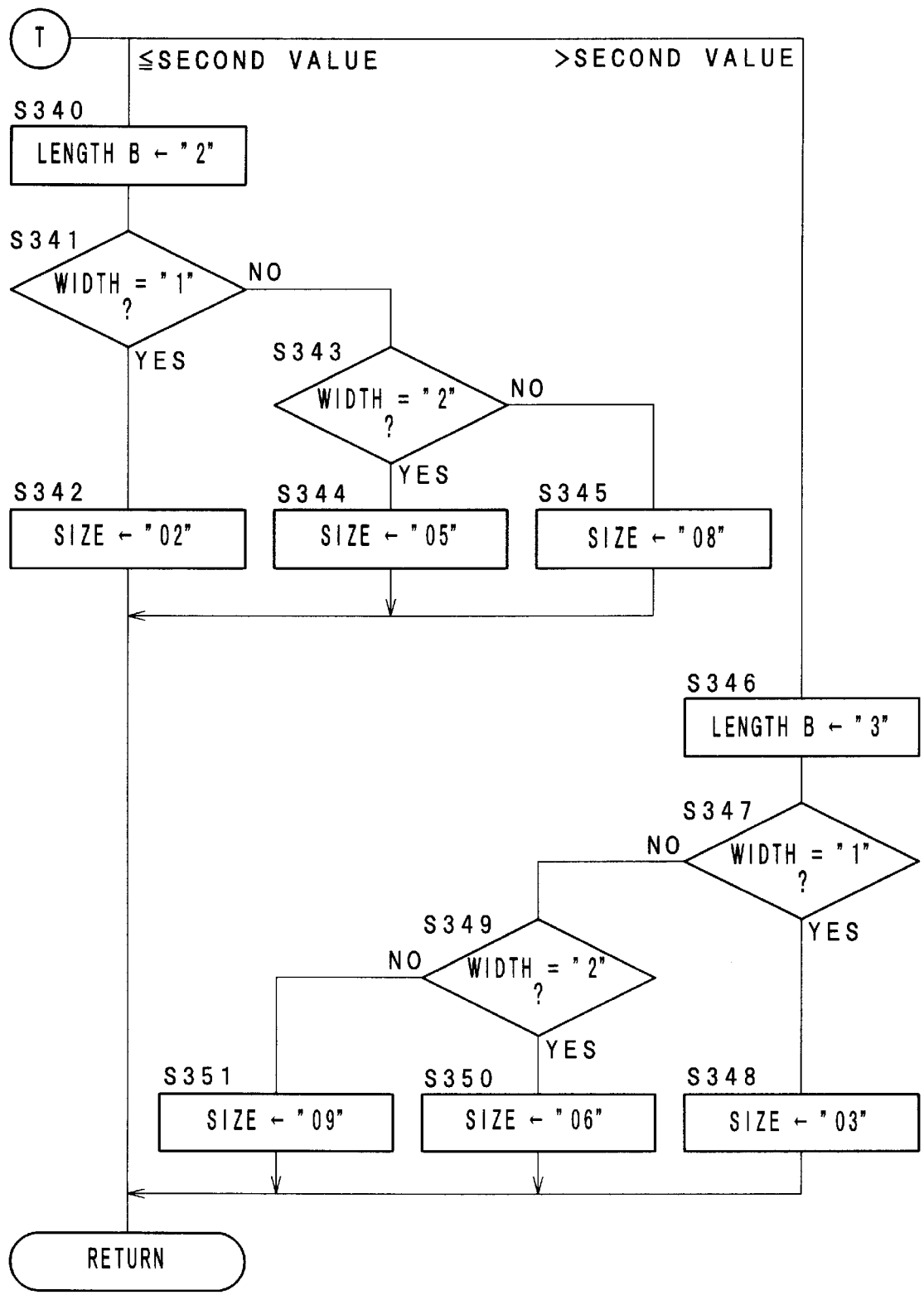

FIGS. 28a and 28b show a subroutine for size detection 2 which is carried out at steps S176, S200 and S267. In this subroutine, the size of a document is detected by the sensor SE2.

First, off-edge of the sensor SE2 is confirmed at step S331. Then, at step S332, a value SIZCNT is stored as the value of the counter MPLSCNT, and the counter MPLSCNT is reset. The counter MPLSCNT starts counting when the transport motor M2 is turned on, and the counter value SIZCNT at the time of off-edge of the sensor SE2 corresponds to the length of the document.

Next, at step S333, the value SIZCNT is compared with a first value and a second value which correspond to reference sizes.

When the value SIZCNT is not more than the first value, the length B is stored as "1" at step S334. Then, at steps S335 and 337, the width is checked whether to be "1" or not and whether to be "2" or not (see steps S65 and S69). If the width is "1", the document size is stored as "01" at step S336. If the width is "2", the document size is stored as "04" at step S338. If the width is neither "1" nor "2", the document size is stored as "07" at step S339.

When the value SIZCNT is more than the first value and is not more than the second value, the length B is stored as "2" at step S340. Then, at steps S341 and S343, the width is checked whether to be "1" or not and whether to be "2" or not (see steps S65 and S69). If the width is "1", the document size is stored as "02" at step S342. If the width is "2", the document size is stored as "05" at step S344. If the width is neither "1" nor "2", the document size is stored as "08" at step S345.

When the value SIZCNT is more than the second value, the length B is stored as "3" at step S346. Then, at steps S347 and S349, the width is checked whether to be "1" or not and whether to be "2" or not (see steps S65 and S69). If the width is "1", the document size is stored as "03" at step S348. If the width is "2", the document size is stored as "06" at step S350. If the width is neither "1" nor "2", the document size is stored as "09" at step S351.

Figure 29A:
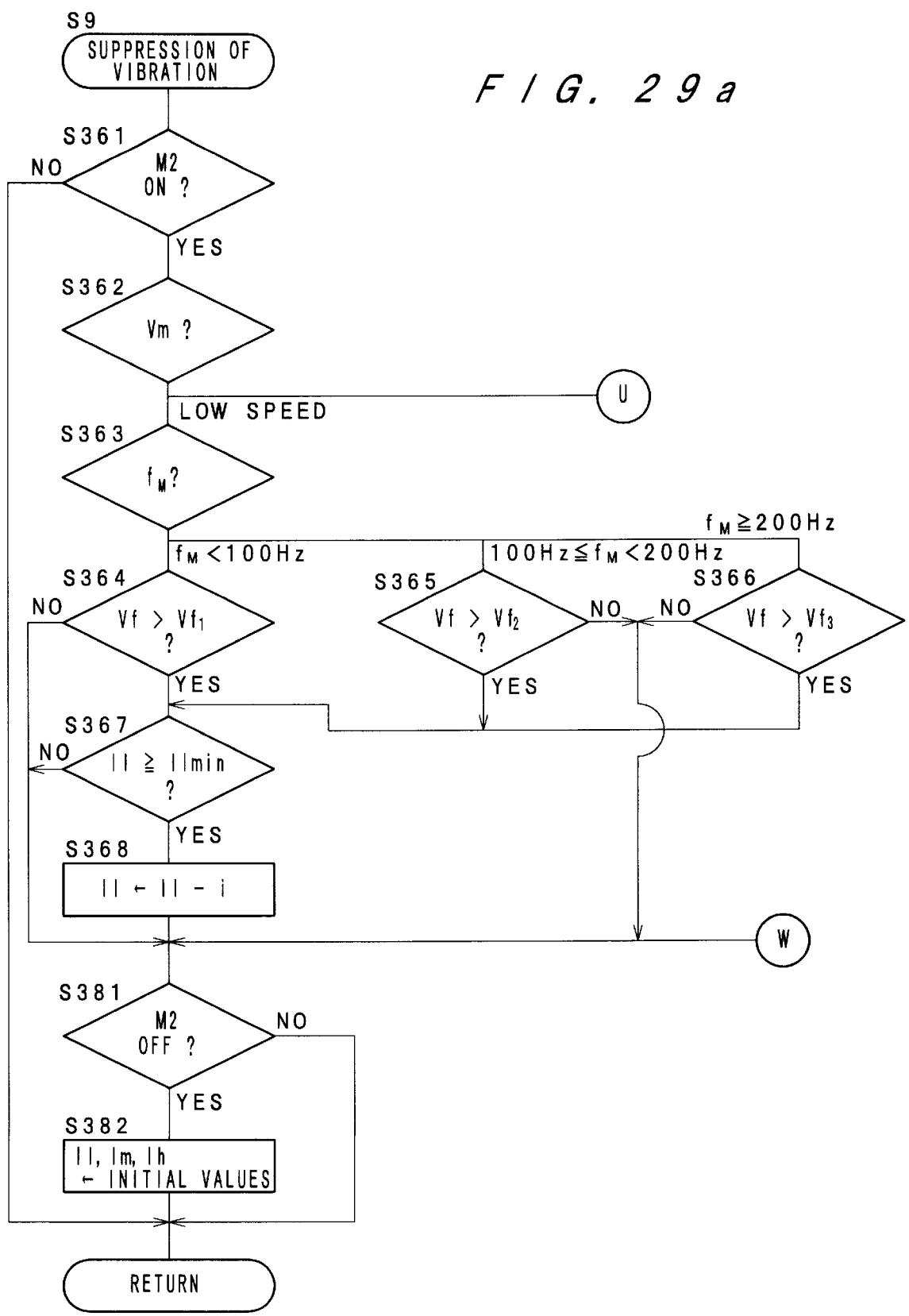
FIGS. 29a, 29b and 29c are flowcharts which show a subroutine for suppression of vibration.
Figure 29B:
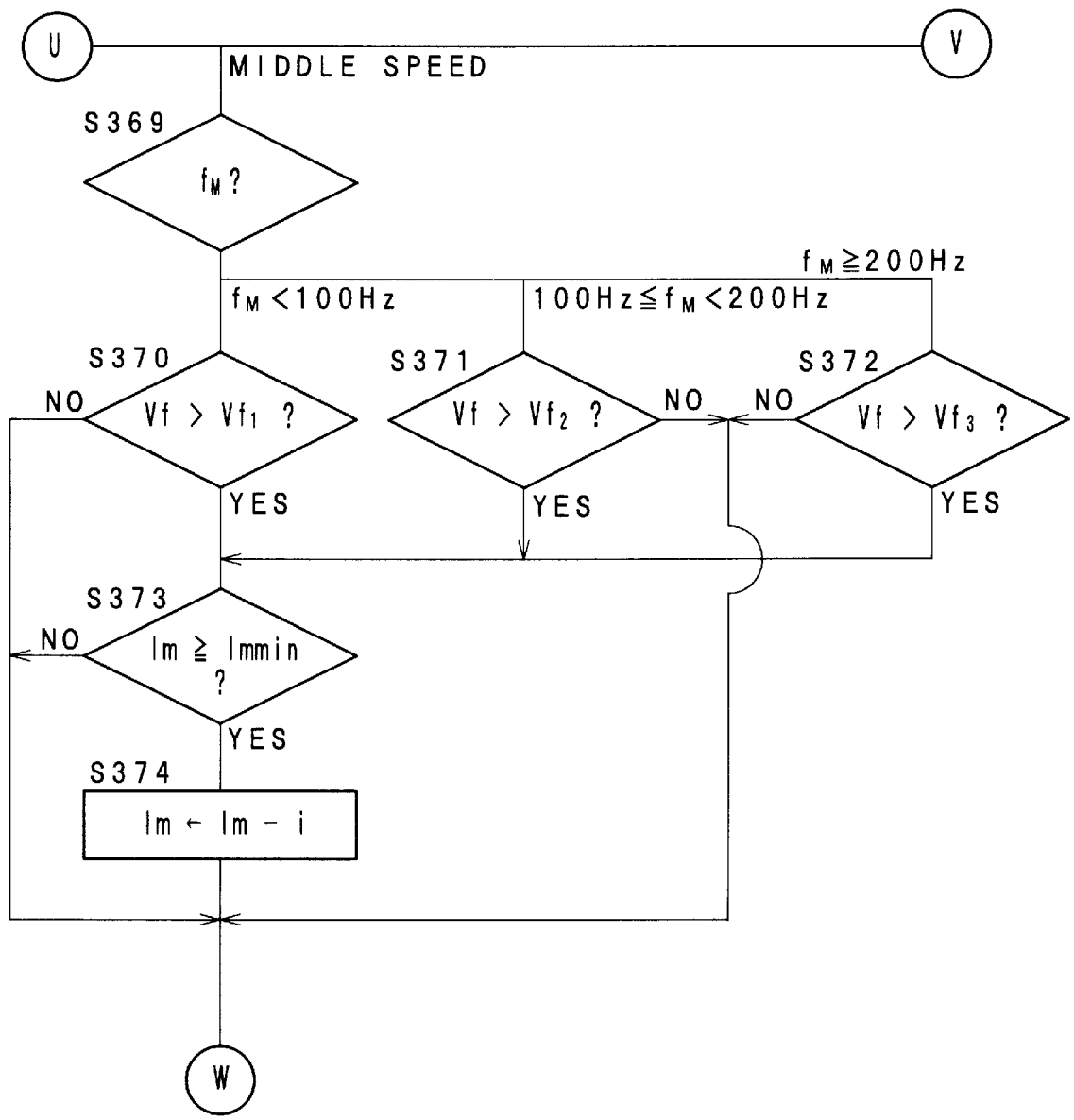
Figure 29C:
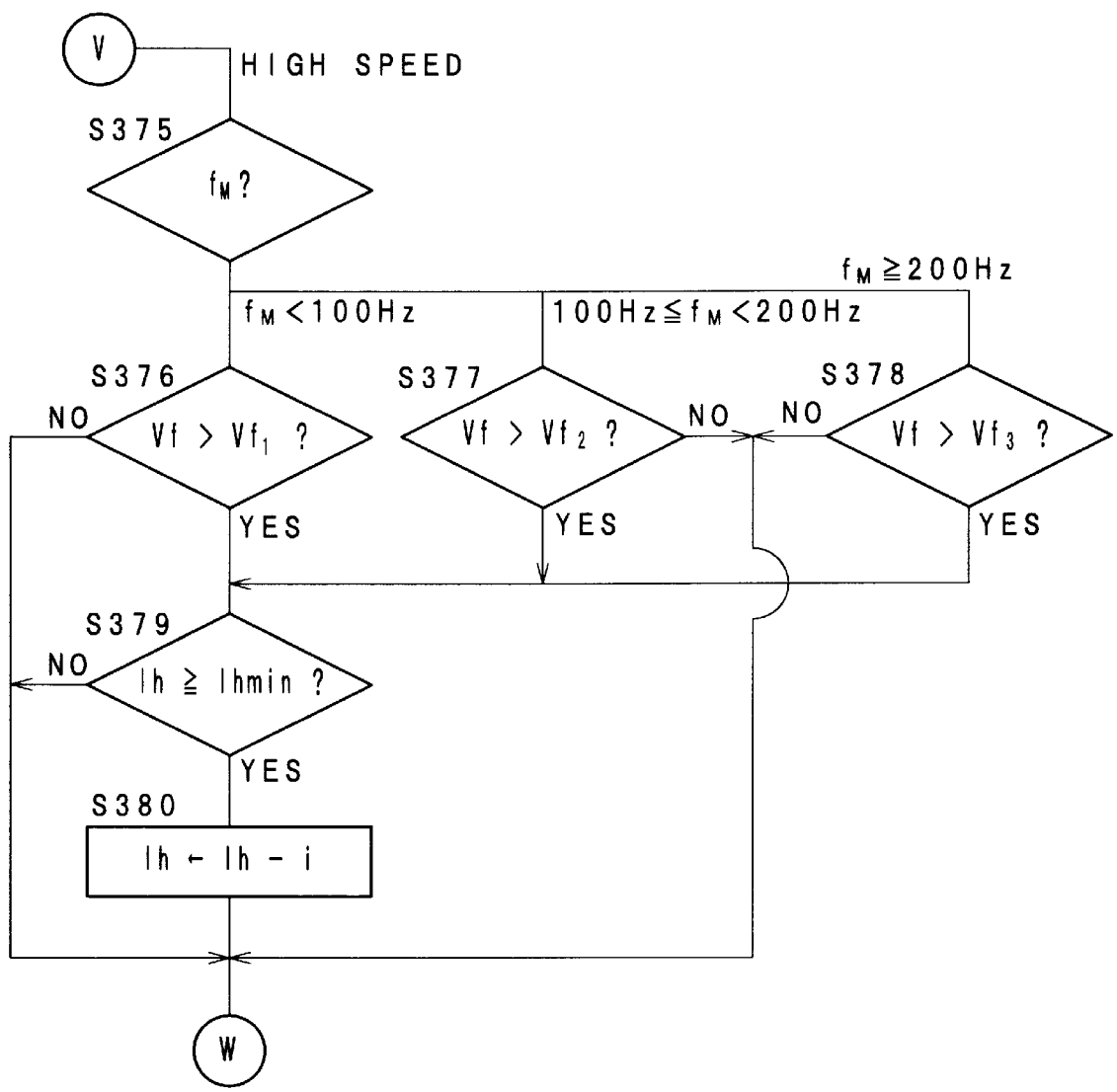

FIGS. 29a, 29b and 29c show a subroutine for suppression of vibration which is carried out at step S9.

First, the transport motor M2 is confirmed to be on at step S361, and the speed Vm is checked at step S362. The speed is checked whether to be low, middle or high. If the speed Vm is low, the program proceeds to steps S363 through S368. If the speed Vm is middle, the program proceeds to steps S369 through S374. If the speed Vm is high, the program proceeds to steps S375 through S380.

When the speed Vm is low, the vibration frequency $f_M$ of the transport motor M2 is checked at step S363. The vibration frequency $f_M$ is recognized to be in either one of three ranges, less than 100 Hz, not less than 100 Hz and less than 200 Hz, and not less than 200 Hz. Then, at step S364, S365 or S366, the vibration level Vf is compared with a threshold $Vf_1$, $Vf_2$ or $Vf_3$ in the corresponding range of the vibration frequency $f_M$. If the vibration level Vf is more than the threshold, the driving current I1 of the motor M2 is compared with the minimum current $I1_{min}$ at step S367. If $I1 \geq I1_{min}$, the driving current I1 is lowered by a specified value i at step S368.

When the speed Vm is middle or high, similar processing is carried out. If the vibration level Vf is more than the threshold, the driving current Im or Ih is compared with the minimum current $Im_{min}$ or $Ih_{min}$. Then, if $Im \geq Im_{min}$ ("YES" at step S373) or if $Ih \geq Ih_{min}$ ("YES" at step S379), the driving current Im or Ih is lowered by a specified value i (step S374 or S380).

Then, when the motor M2 is confirmed to be turned off at step S381, the driving current values I1, Im and Ih are set to initial values at step S382.

Figure 30A:
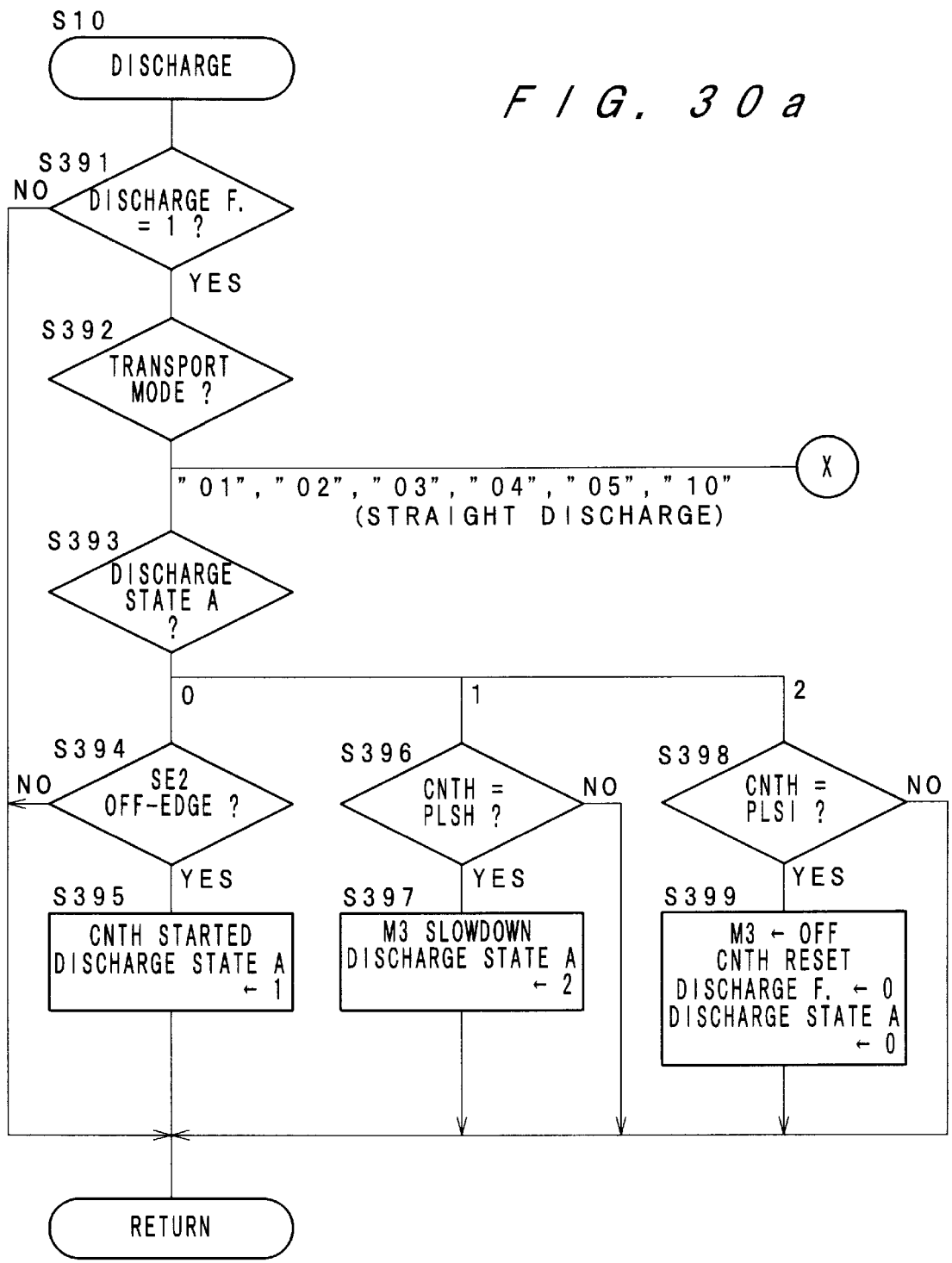
FIGS. 30a and 30b are flowcharts which show a subroutine for discharge of a document.
Figure 30B:
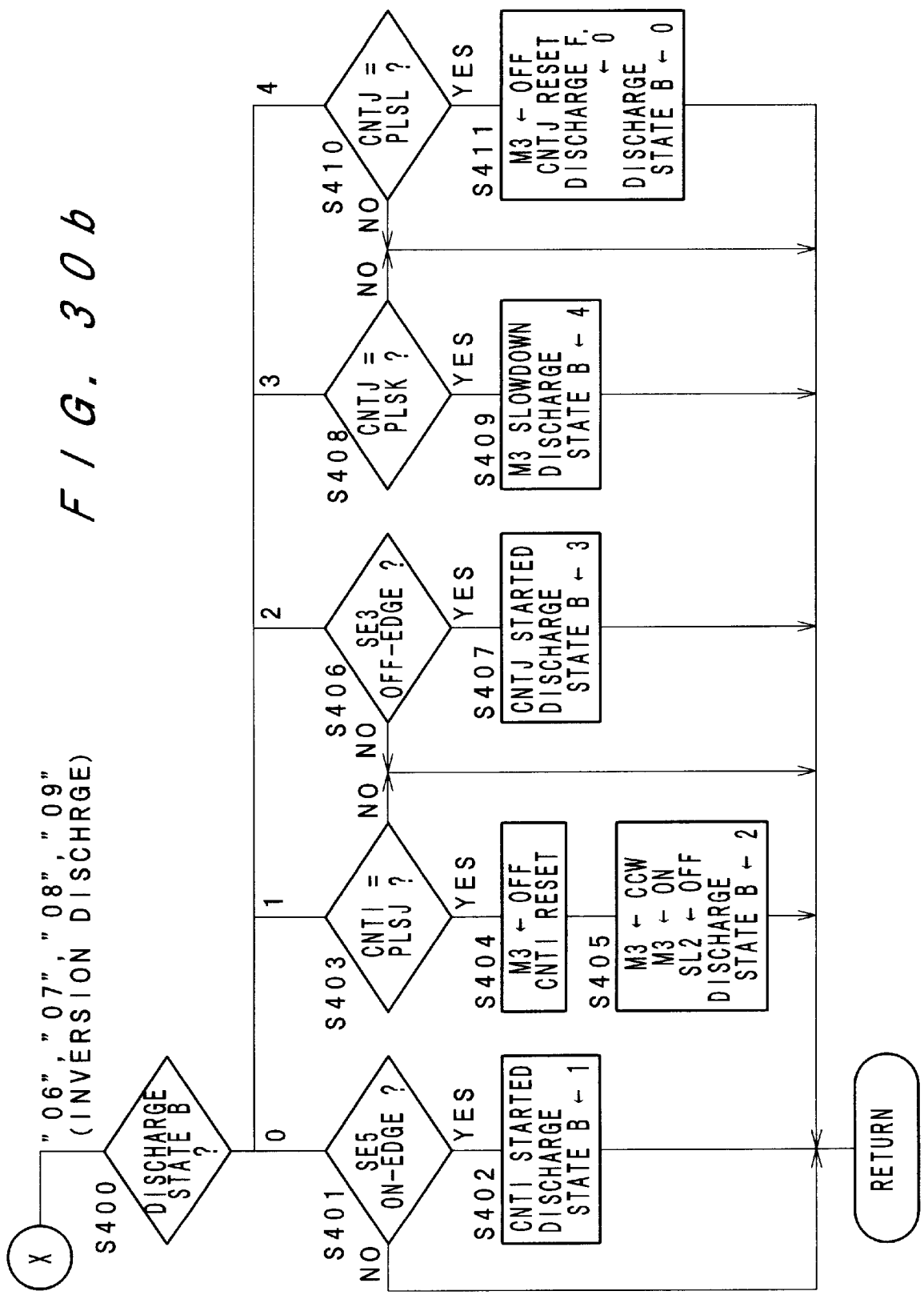

FIGS. 30a and 30b show a subroutine for discharge which is carried out at step S10. In this subroutine, a document is discharged from the reading section 2200 to the discharge tray 2502 straight or via the discharge inverting section 2400.

First, at step S391, it is confirmed that the discharge flag is set to "1". Then, the transport mode is checked at step S392, and the program proceeds according to the transport mode.

When the transport mode is "01" through "05" or "10" (straight discharge), a discharge state counter A is checked at step S393, and the program proceeds according to the counter value.

When the discharge state counter A is "0", at step S394, off-edge of the registration sensor SE2 is confirmed, that is, the trailing edge of a document has passed the sensor SE2. Then, at step S395, the counter CNTH of the discharge motor M3 is started, and the discharge state counter A is set to "1".

When the discharge state counter A is "1", the value of the counter CNTH is checked at step S396. When the counter value becomes equal to the value PLSH, at step S397, the speed of the discharge motor M3 is lowered, and the discharge state counter A is set to "2".

When the discharge state counter A is "2", the value of the counter CNTH is checked at step S398. When the counter vale becomes equal to the value PLSI, which means that the trailing edge of the document has passed the discharge rollers 2501, at step S399, the discharge motor M3 is turned off, the counter CNTH is reset, the discharge flag is reset to "0", and the discharge state counter A is reset to "0".

On the other hand, when the transport mode is "06" through "09" (inversion discharge), a discharge state counter B is checked at step S400, and the program proceeds according to the counter value.

When the discharge state counter B is "0", at step S401, on-edge of the discharge sensor SE5 is confirmed, that is, it is confirmed that the leading edge of a document has reached the sensor SE5. Then, at step S402, the counter CNTI of the discharge motor M3 is started, and the discharge state counter B is set to "1".

When the discharge state counter B is "1", the value of the counter CNTI is checked at step S403. When the counter value becomes equal to the value PLSJ, which means that the trailing edge of the document has passed the resin film 2403, at step S404, the discharge motor M3 is turned off, and the counter CNTI is reset. Then, at step S405, the discharge motor M3 is turned on for counterclockwise rotation, the solenoid SL2 is turned off, and the discharge state counter B is set to "2". Thereby, the document is inverted and transported toward the discharge rollers 2501.

When the discharge state counter B is "2", at step S406, off-edge of the discharge inversion sensor SE3 is confirmed, that is, it is confirmed that the trailing edge of the document has passed the sensor SE3. Then, at step S407, the counter CNTJ of the discharge motor M3 is started, and the discharge state counter B is set to "3".

When the discharge state counter B is "3", the value of the counter CNTJ is checked at step S408. When the counter value becomes equal to the value PLSK, at step S409, the speed of the discharge motor M3 is lowered, and the discharge state counter B is set to "4".

When the discharge state counter B is "4", the value of the counter CNTJ is checked at step S410. When the counter value becomes equal to the value PLSL, which means that the trailing edge of the document has passed the discharge rollers 2501, at step S411, the discharge motor M3 is turned off, the counter CNTJ is reset, the discharge flag is reset to "0", and the discharge state counter B is reset to "0".

Figure 31:
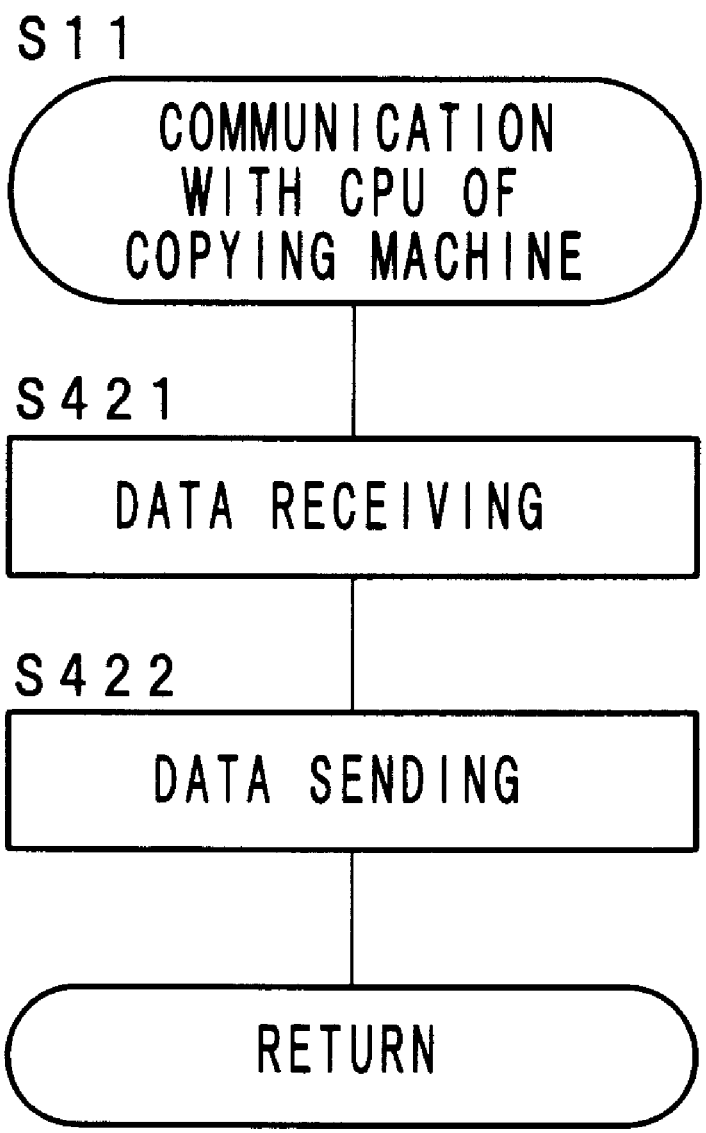
FIG. 31 is a flowchart which shows a subroutine for communication with the CPU of the copying machine.

FIG. 31 shows a subroutine for communication with a CPU of the copying machine 10 which is carried out at step S11. In this subroutine, the CPU 3000 receives data from the CPU of the copying machine 10 at step S421, and the CPU 3000 sends data to the CPU of the copying machine 10 at step S422.

Second Embodiment

Figure 32:
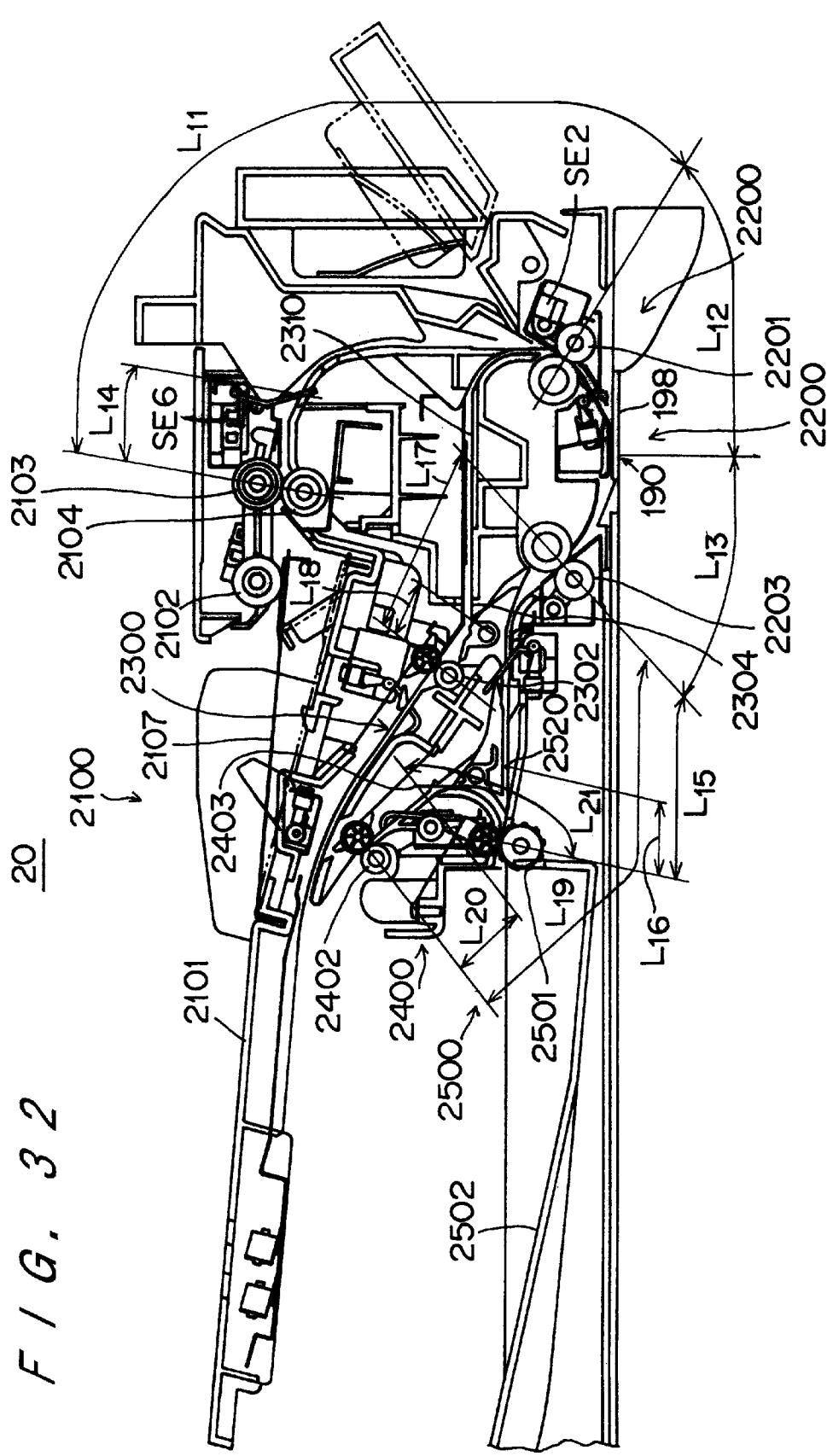
FIG. 32 is a sectional view of a document feeder which is a second embodiment of the present invention, showing the internal structure.

The second embodiment, which is shown by FIG. 32, has the same structure as the first embodiment shown by FIG. 2, except that the intermediate transport rollers 2105 are eliminated. In the second embodiment, the feed roller 2103 is not driven during image reading, and thereby, noise which occurs when the trailing edge of a document has passed the rollers 2103 and 2104 does not influence the performance of image reading.

The transport members are located to have the following positional relationships (11), (12) and (13).

$$L_{11} < L_{P1} \tag{11}$$

$$(L_{11} + L_{12}) < L_{P1} \tag{12}$$

$$(L_{11} + L_{12} + L_{13}) > L_{P2} \tag{13}$$

$L_{11}$: distance between the feed/separation rollers 2103 and 2104 and the first read rollers 2201

$L_{12}$: distance between the first read rollers 2201 and the reading position 190

$L_{13}$: distance between the reading position 190 and the second read rollers 2203

$L_{P1}$: length of a document of a specified size $L_{P2}$: length of a document of one size larger than the specified size If the transport members are located to meet the above conditions (11), (12) and (13), when feeding a document with a length not more than $L_{P1}$, the trailing edge of the document passes the feed/separation rollers 2103 and 2104 before the leading edge reaches the reading position 190. Therefore, a change in tension of the document which occurs when the trailing edge passes the rollers 2103 and 2104 does not influence the image reading. Also, when feeding a document with a length not less than $L_{P2}$, the trailing edge of the document passes the rollers 2103 and 2104 while the leading portion is held by both the first read rollers 2201 and the second read rollers 2203. Therefore, even if the tension of the document changes when the trailing edge passes the rollers 2103 and 2104, the document is held by the read rollers 2201 and 2203 in the reading position 190, and influence of the tension change (noise) onto the image reading is not large.

Further, as in the first embodiment, in order to shorten the image reading time and improve the image reading efficiency, the following condition (14) is met, and the distance $L_{12}$ is minimized.

$$(L_{11} + L_{12} - L_{14})/V_{04} \leq L_{11}/V_{01} \tag{14}$$

$L_{14}$: distance between the feed/separation rollers 2103 and 2104 and the width reference sensor SE6

$V_{01}$: transport speed of the pick-up roller 2102 and the feed roller 2103

$V_{04}$: transport speed of the read rollers 2201 and 2203

Next, feed/transport of a document in the above structure is described.

The feed roller 2103 is connected to the feed motor M1 directly. Some documents of a stack are picked up by the pick-up roller 2102, and the uppermost one is separated from the others by the feed/separation rollers 2103 and 2104. Thus, a first document (uppermost document) is fed to the first read rollers 2201 and registered at the nip portion. The feed motor M1 is turned off at this time. Thereafter, the transport motor M2 is turned on, and thereby, the document is transported through the reading section 2200 to be subjected to image reading. When the trailing edge of the document passes the width reference sensor SE6, the feed motor M1 is turned on to start feeding of a second document. Further, when the trailing edge of the first document passes the reading position 190, the transport motor M2 is turned off, and then, the leading edge of the second document comes to the nip portion of the stopped first read rollers 2201 and registered thereat. Thereafter, the above-described motions are repeated.

Next, the driving system of the circular inverting section 2300, the discharge inverting section 2400 and the discharging section 2500 are described.

Figure 33:
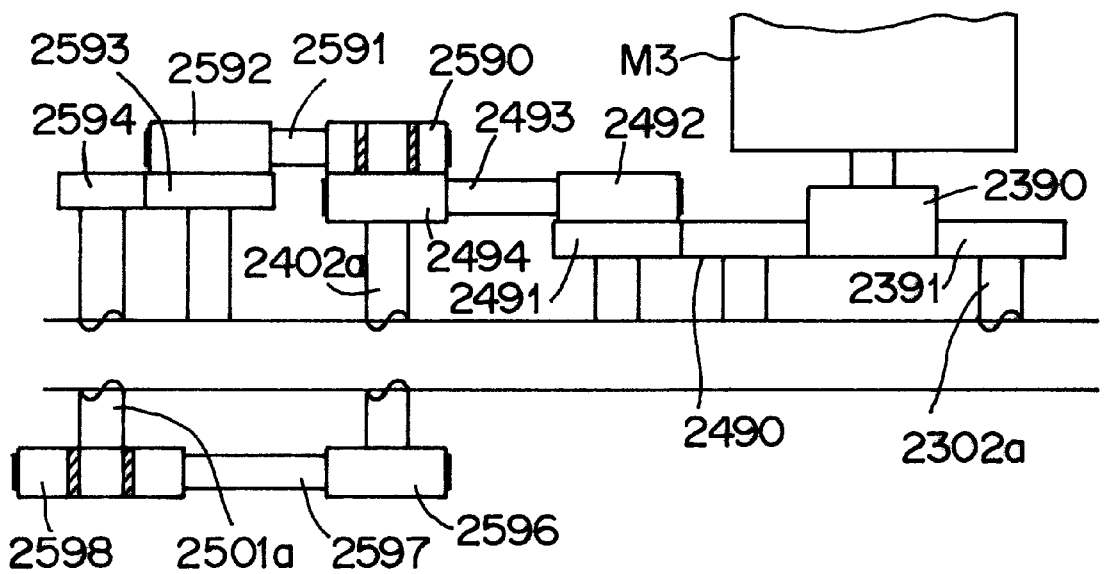
FIG. 33 is a plan view of a transport driving system of the document feeder of the second embodiment.

As shown in FIGS. 33, 34 and 35, in the second embodiment, the discharge motor M3 drives the circular inversion rollers 2302, the discharge inversion rollers 2402 and the discharge rollers 2501.

More specifically, a gear 2390 which is fixed to the output shaft of the discharge motor M3 engages with a gear 2391 which is fixed to a driving shaft 2302a of the circular inversion rollers 2302 and with an idle gear 2490. The idle gear 2490 engages with another idle gear 2491. A pulley 2492 is integrated with the idle gear 2491, and the pulley 2492 is connected to a pulley 2494 via a belt 2493. The pulley 2494 is fixed to a driving shaft 2402a of the discharge inversion rollers 2402. A pulley 2590 which is independent of the pulley 2494 is fitted to the driving shaft 2402a via a one-way clutch, and when the driving shaft 2402a is rotated clockwise, the one-way clutch is connected, whereby the pulley 2590 rotates in the same direction. Further, the pulley 2590 is connected to an idle pulley 2592 via a belt 2591, and an idle gear 2593 which is integrated with the idle pulley 2592 engages with a gear 2594 which is fixed to a driving shaft 2501a of the discharge rollers 2501.

As shown in FIG. 35, a pulley 2596 is fixed to the driving shaft 2402a of the discharge inversion rollers 2402, and the pulley 2596 is connected to a pulley 2598 which is fitted to the driving shaft 2501a of the discharge rollers 2501 via a belt 2597. The pulley 2598 is fitted to the driving shaft 2501a via a one-way clutch, and when the pulley 2598 is rotated counterclockwise, the one-way clutch is connected, whereby the driving shaft 2501a rotates in the same direction.

In the driving system, when the discharge motor M3 rotates clockwise (see FIG. 34), the driving shaft 2302a rotates counterclockwise, the driving shaft 2402a rotates clockwise, and the driving shaft 2501a rotates counterclockwise. On the other hand, when the discharge motor M3 rotates counterclockwise (see FIG. 35), the driving shaft 2302a rotates clockwise, the driving shaft 2402a rotates counterclockwise, and the driving shaft 2501a rotates counterclockwise.

The ratio of the transport speed of the circular inversion rollers 2302, that of the discharge inversion rollers 2402 and that of the discharge rollers 2501 is 1:1:1 when the discharge rollers 2501 are driven via the belt 2593 and is 1:1:1/u (u>1) when the discharge rollers 2501 are driven via the belt 2597. The transport speed of the circular inversion rollers 2302 and that of the discharge inversion rollers 2402 are equal to that of the read rollers 2201 and 2203 at all times.

Further, if the distances among the transport members are denoted as follows, the following conditions (15), (16) and (16') must be met.

$L_{15}$: distance between the second read rollers 2203 and the discharge rollers 2501

$L_{16}$: distance between a slowdown position 2520 in the simplex document mode and the discharge rollers 2501

$L_{17}$: distance between the second read rollers 2203 and the circular inversion rollers 2302

$L_{18}$: distance between the second read rollers 2203 and the resin film 2304

$L_{19}$: distance between the second read rollers 2203 and the discharge inversion rollers 2402

$L_{20}$: distance between the second read rollers 2203 and the resin film 2403

$L_{21}$: distance between the resin film 2403 and the discharge rollers 2501

In the simplex document mode, when the trailing edge of the first document comes to the slowdown position 2520 after image reading, the discharge motor M3 is switched from clockwise rotation to counterclockwise rotation to discharge the document onto the discharge tray 2502 at a speed $V_{04}/u$. At this time, the second document which has been behind from the first document by the distance $L_{12}$ is transported at a speed $V_{04}$, and therefore, the gap between the first and second documents is shortened. In this case, in order to avoid a trouble that the leading edge of the second document reaches the discharge rollers 2501 before the trailing edge of the first document passes the rollers 2501, the following condition (15) must be met.

$$L_{13}+(L_{15}+L_{16})+L_{15}u<L_{12}+L_{13}+L_{15}\therefore L_{16}(u-1)<L_{12} \quad (15)$$

In the duplex document mode, the first document is transported left upward by the discharge inversion rollers 2402 after image reading of the second side. Then, when the trailing edge of the document passes the resin film 2403, the discharge motor M3 is switched from counterclockwise rotation to clockwise rotation to reverse the document toward the discharge rollers 2501. At this time, the second document is transported toward the circular inversion rollers 2302. If the leading edge of the second document reaches the circular inversion rollers 2302 before the trailing edge of the first document passes the resin film 2403, the second document will be stuck therein because the circular inversion rollers 2302 is rotating clockwise at this time. In order to avoid this trouble, the following condition (16) must be met.

$$L_{13}+L_{19}-L_{20}<L_{12}+L_{13}+L_{17}\therefore L_{19}-L_{20}-L_{17}<L_{12} \quad (16)$$

Also, if the trailing edge of the second document does not pass the resin film 2304 before the trailing edge of the first document passes the discharge rollers 2501, the discharge motor M3 cannot perform slowdown for discharge of the first document because the motor M3 is still rotating clockwise. In order to avoid this trouble, the following condition (16') must be met.

$$L_{13}+L_{19}-L_{20}+L_{21}+L_P>L_{12}+L_{13}+L_{17}-L_{18}+L_P\therefore L_{19}-L_{20}+L_{21}-L_{17}+L_{18}>L_{12} \quad (16')$$

If the above condition (16) is fulfilled, by controlling the discharge motor M3 to keep rotating counterclockwise until the trailing edge of a document of which image reading has been completed and is transported by the discharge inversion rollers 2402 passes the resin film 2403 and to start rotating clockwise when the trailing edge of the document passes the resin film 2403, circular switchback (reverse transport) of a document for image reading of its second side, discharge switchback (reverse transport) of a document of which both sides have been subjected to image reading and slowdown for discharge can be automatically carried out almost at the same time. Thus, the efficiency of image reading can be improved.

Third Embodiment

Figure 36:
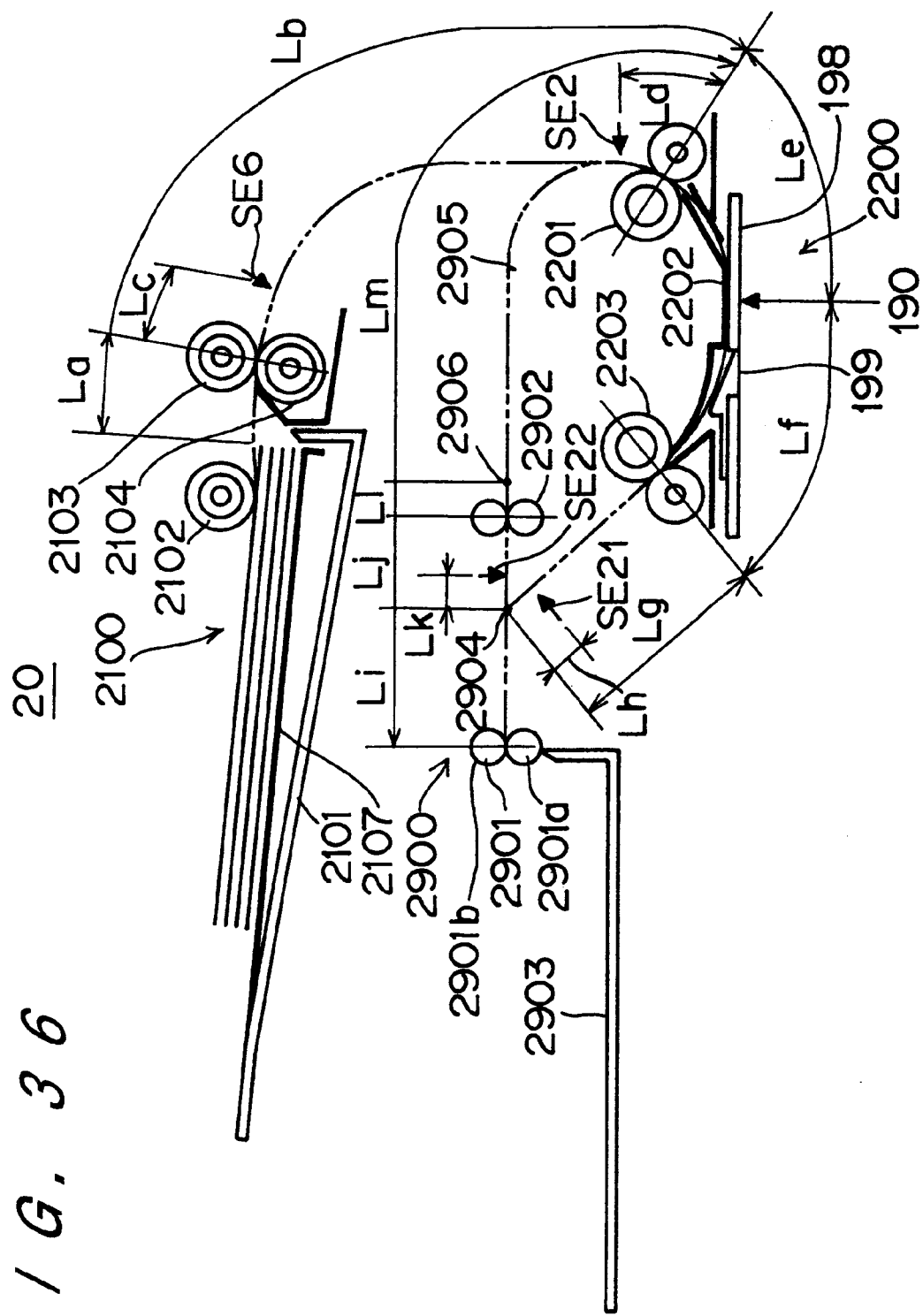
FIG. 36 is a schematic view of a document feeder which is a third embodiment of the present invention.

FIG. 36 shows the fundamental structure and arrangement of members of the third embodiment. The members which have similar functions as those in the first and second embodiments are provided with the same reference symbols as the counterparts in the first and second embodiments.

A feeding section 2100 comprises a document tray 2101, a pick-up roller 2102, a feed roller 2103, a separation rollers 2104, etc.

A reading section 2200 comprises a pair of first read rollers 2201 and a pair of second read rollers 2203, a pressing guide plate 2202, etc.

An inverting/discharging section 2900 comprises a pair of inversion/discharge rollers 2901, a pair of holding rollers 2902, a discharge tray 2903, a circular inversion path 2905, etc., and an inverting position 2904 and a holding position 2906 are set. In this section 2900, switchback for image reading of the second side of a duplex document, switchback for arrangement of documents in order of page after image reading of the second side and discharge are carried out. The inversion/discharge rollers 2901 comprises a driven roller 2901a and a follower roller 2901b, and the driven roller 2901a can rotate both forward and in reverse. The holding rollers 2902 are to transport a document from the circular path 2905 toward the reading section 2200 in cooperation with the rollers 2901 and are to stop a document at the nip portion. The transport force (frictional force to a document) of the rollers 2902 is sufficiently larger than that of the rollers 2901.

Next, feeding/transport of a document is generally described.

In the simplex document mode, documents are stacked on the tray 2101 with their imaged sides facing up. The uppermost document is fed from the tray 2101 and is transported to pass the reading section 2200 with its imaged side facing down. Then, the document is discharged onto the tray 2903 via the inversion/discharge rollers 2901 with its imaged side facing down.

In the duplex document mode, feeding from the tray 2101 and image reading of the first side of a first document are carried out in the same manner as in the simplex document mode. After image reading of the first side, when the trailing edge of the document comes to the inverting position 2904, the inversion/discharge rollers 2901 are rotated in reverse, whereby the document is transported into the circular path 2905 (switchback). Then, the document passes the reading section 2200 for image reading of the second side and makes a switchback again to be transported into the circular path 2905.

If a second document is not on the tray 2101, the document is immediately transported to pass the reading section 2200 without being subjected to image reading, and then, the first document is discharged onto the tray 2903 via the inversion/discharge rollers 2901 with the first side facing down. On the other hand, if a second document is on the tray 2101, the holding rollers 2902 are stopped to hold the first document in the circular path 2905. Meanwhile, the second document is fed to the reading section 2200 for image reading of the first side. Thereafter, the first document is transported to pass the reading section 2200 without being subjected to image reading. Then, the second document makes a switchback to go into the circular path 2905, and discharge of the first document and image reading of the second side of the second document are carried out. This series of motions is repeated until the stack of documents on the tray 2101 are all fed.

Next, the lengths of paths and the transport speed are described.

The distances between the transport members and the transport speeds of the members are denoted as follows.

La: distance between the leading edge of a document set on the tray 2101 and the feed/separation rollers 2103 and 2104

Lb: distance between the feed/separation rollers 2103 and 2104 and the first read rollers 2201

Lc: distance between the feed/separation rollers 2103 and 2104 and the width reference sensor SE6

Ld: distance between the registration sensor SE2 and the first read rollers 2201

Le: distance between the first read rollers 2201 and the reading position 190

Lf: distance between the reading position 190 and the second read rollers 2203

Lg: distance between the second read rollers 2203 and the inverting position 2904

Lh: distance between a before-inversion sensor SE21 and the inverting position 2904

Li: distance between the inverting position 2904 and the inversion/discharge rollers 2901

Lj: distance between the inverting position 2904 and the holding rollers 2902

Lk: distance between the inverting position 2904 and an after-inversion sensor SE22

Ll: distance between the holding rollers 2902 and the holding position 2906

Lm: distance between the holding position 2906 and the first read rollers 2201

$V_{21}$: transport speed of the pick-up roller 2102 and the feed roller 2103

$V_{22}$: transport speed of the read rollers 2201 and 2203 for image reading $V_{23}$: transport speed of the read rollers 2201 and 2203 for purposes other than image reading $V_{24}(=V_{22})$: transport speed of the inversion/discharge rollers 2901 for image reading $V_{25}(=V_{23})$: transport speed of the inversion/discharge rollers 2901 and the holding rollers 2902

$V_{26}$: transport speed of the inversion/discharge rollers for discharge

In order to avoid a trouble that the leading edge and the trailing edge of a document are nipped between the inversion/discharge rollers 2901 simultaneously, if the length of a document of the maximum size is denoted by Lmax, the following condition (17) must be met.

$$Le+Lf+Lg+2Li+Lj+Ll+Lm>Lmax \quad (17)$$

In order to avoid a trouble that the second document reaches the inversion/discharge rollers 2901 before the first document is nipped by the holding rollers 2902, the following condition (18) must be met.

$$(Lf/V_{22})+\{(Lg+Lj+Ll)/V_{25}\}<(Le+Lf+Lg+Li)/V_{22} \quad (18)$$

As in the first embodiment, while the first document is waiting at a position right after the trailing edge of the first document has passed the reading position 190, the leading edge of the second document reaches the first read rollers 2201.

Further, in order to minimize the transport time during handling other than image reading, the transport speeds of the transport members are set to meet the conditions, $V_{22} \leq V_{23}$ and $V_{26} \leq V_{24} \leq V_{25}$. Also, in order to discharge documents in alignment onto the tray 2903, the speed $V_{26}$ is set low.

Next, referring to FIGS. 37a through 38i, feeding/transport of documents in the duplex document mode is described in detail. FIGS. 37a through 37f show a case wherein there is one duplex document, and FIGS. 38a through 38i show a case wherein there are two or more duplex documents.

A first document $D_1$ is fed from the tray 2101 by the pick-up roller 2102 and the feed roller 2103 at the speed $V_{21}$. The rollers 2102 and 2103 are stopped a specified time after the leading edge of the first document is detected by the registration sensor SE2, whereby the leading portion of the first document is bent at a position upstream of the nip portion of the first read rollers 2201. Thus, registration of the document is carried out (see FIGS. 37a, 37b, 38a and 38b).

Next, the document $D_1$ is transported by the read rollers 2201 and 2203 at the speed $V_{22}$ for image reading of its first side. When the leading edge of the document $D_1$ reaches the inversion/discharge rollers 2901, the driven roller 2901a is rotated counterclockwise at the speed $V_{24}$. The start of rotation of the driven roller 2901a is timed based on the time when the leading edge of the document $D_1$ is detected by the before-inversion sensor SE21. By the rotation of the inversion/discharge rollers 2901, the document $D_1$ is transported to the left. Then, when the trailing edge of the document $D_1$ has passed the reading position 190, the speed of the read rollers 2201 and 2203 is changed to $V_{23}$, and the speed of the driven roller 2901a is changed to $V_{25}$.

When the trailing edge of the document $D_1$ comes to the inverting position 2904 (see FIGS. 37c and 38c), the driven roller 2901a is switched to clockwise rotation at the speed $V_{25}$. The switch of rotation of the driven roller 2901a is timed based on the time when the trailing edge of the document $D_1$ is detected by the before-inversion sensor SE21. Thereby, the document $D_1$ is transported to the circular path 2905 with its leading edge trailing.

Subsequently, the document $D_1$ is transported by the holding rollers 2902 which are rotating at the speed $V_{25}$.

Figure 37C:
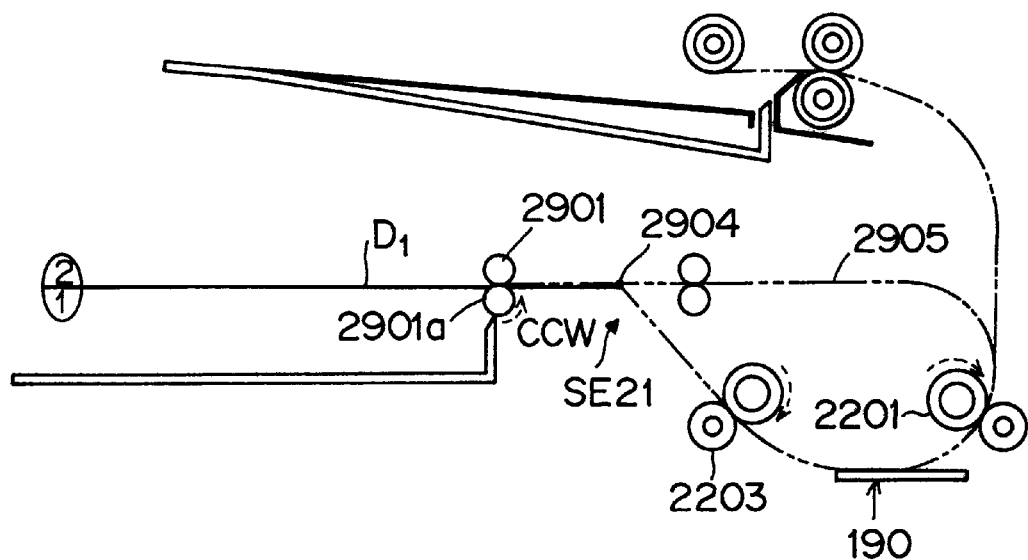
Figure 37D:
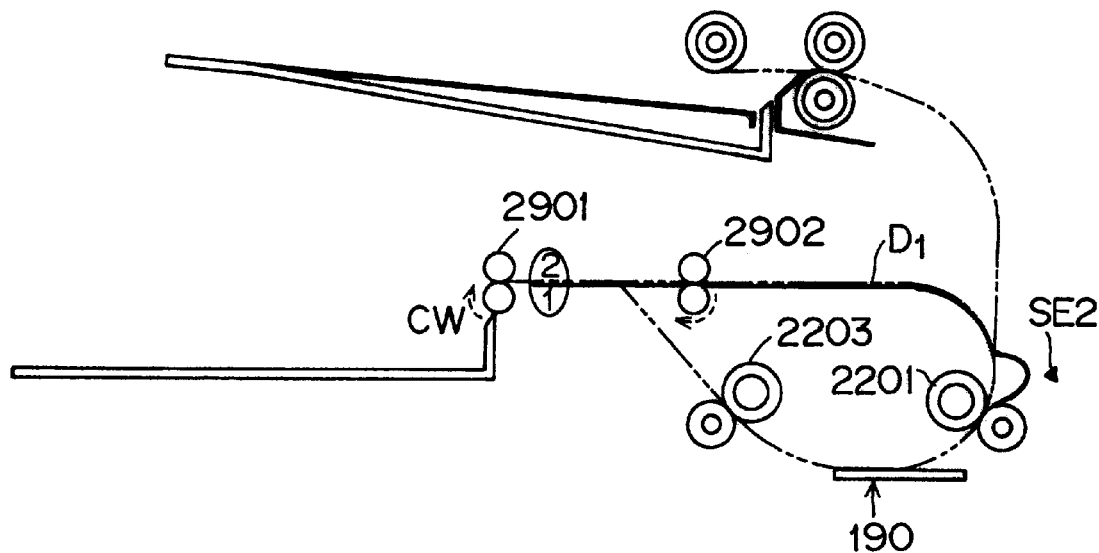
Figure 37E:
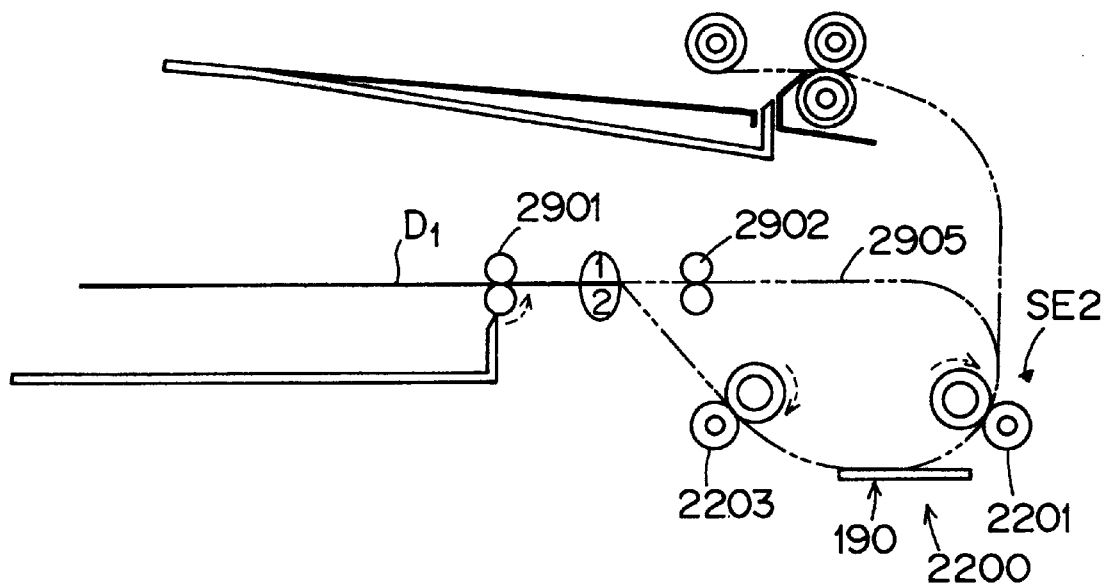
Figure 37F:
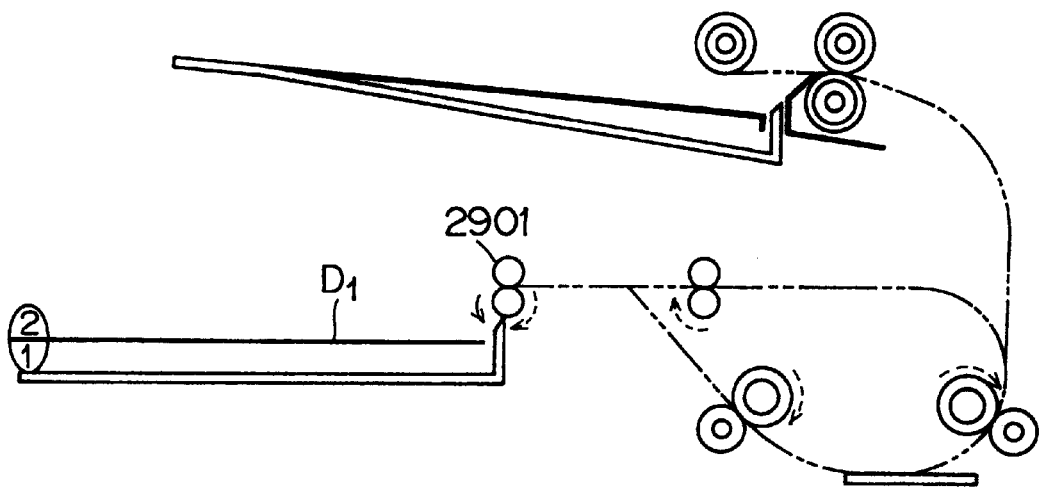
Figure 38A:
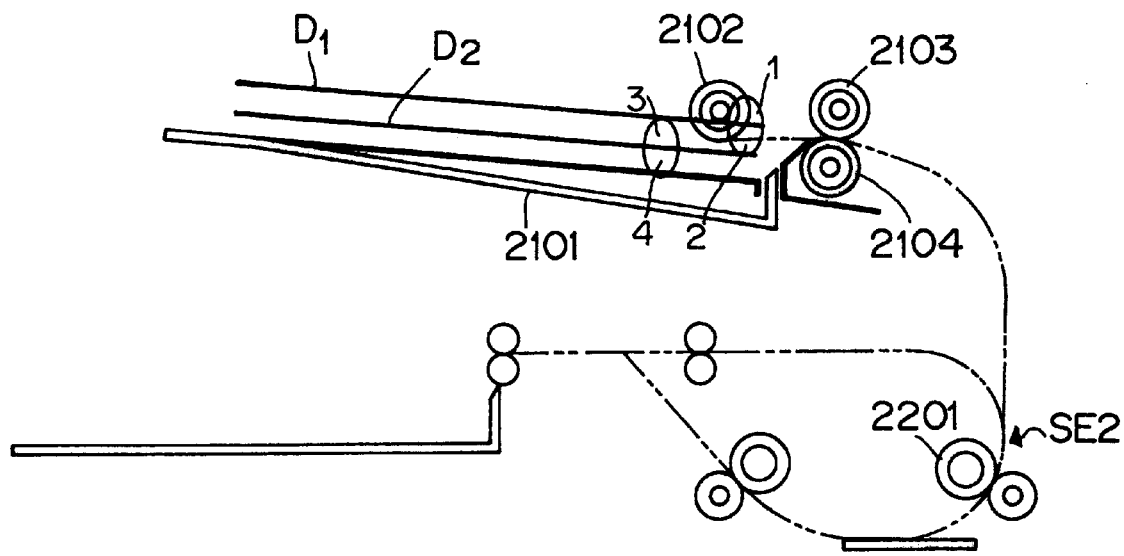
Figure 38B:
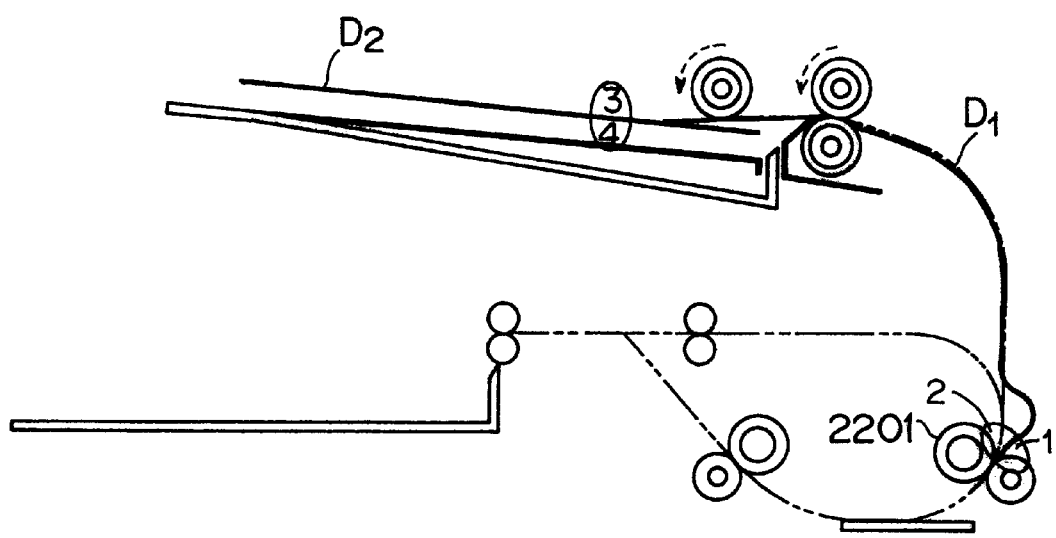
Figure 38C:
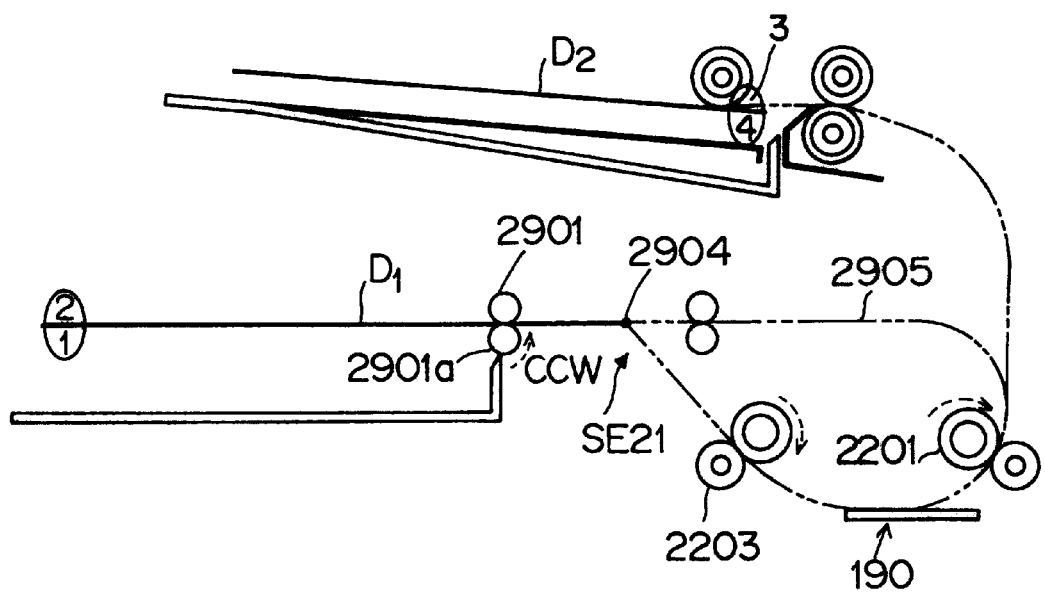
Figure 38D:
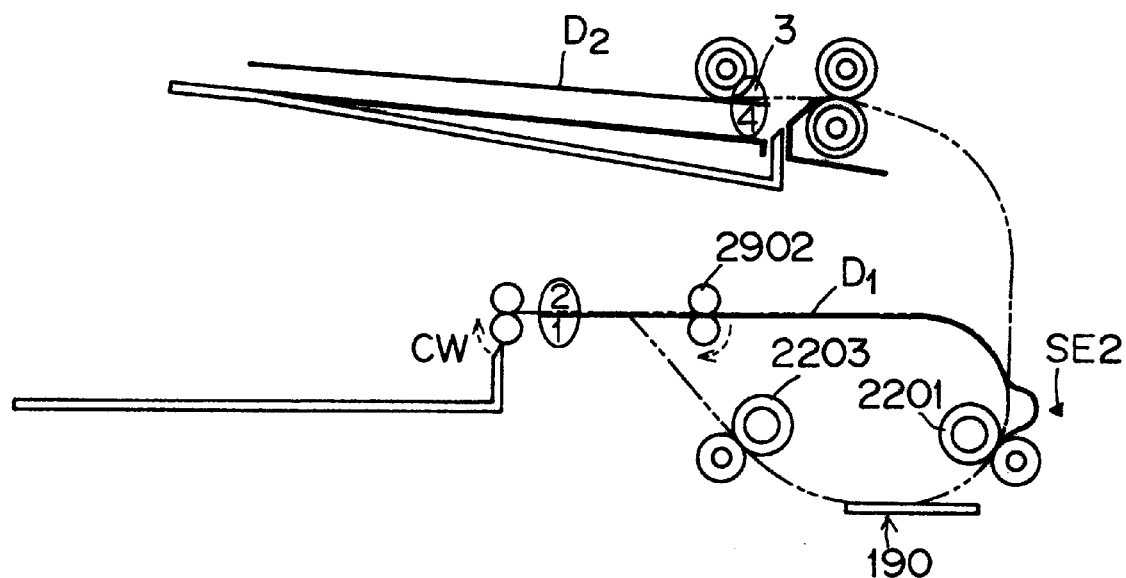
Figure 38E:
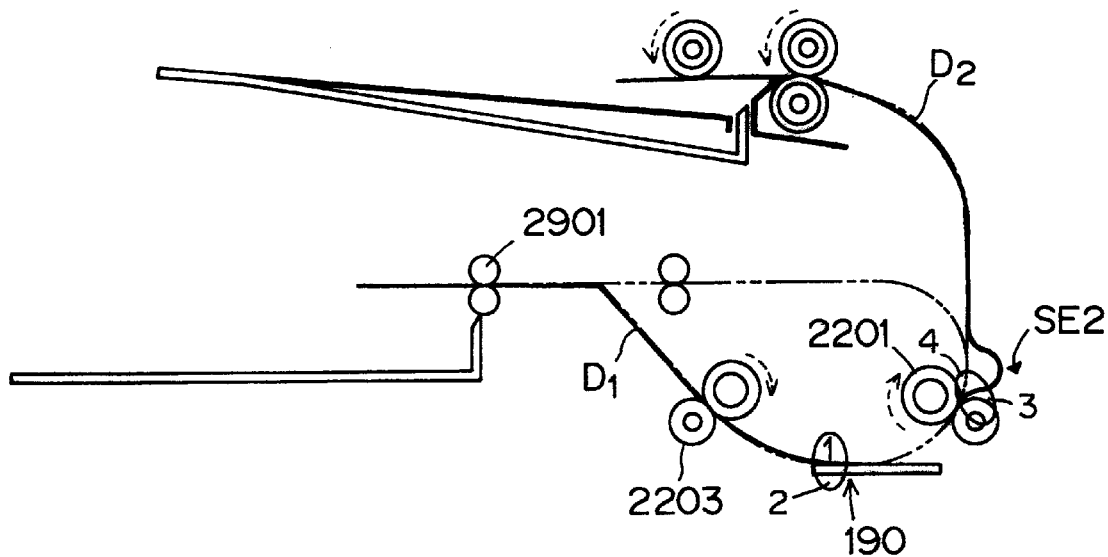

Then, the holding rollers 2902 keep rotating for a while after the leading edge of the document $D_1$ is detected by the registration sensor SE2, whereby the leading portion of the document $D_1$ is bent immediately before the first read rollers 2201 as it was after feeding from the tray 2101, and thus registration of the document $D_1$ is carried out (see FIGS. 37d and 38d). The rotation of the read rollers 2201 and 2203 was stopped when the trailing edge of the document $D_1$ passed the second read rollers 2203.

Next, the read rollers 2201 and 2203 are rotated at the speed $V_{22}$ for image reading of the second side of the document $D_1$, and simultaneously, the holding rollers 2902 and the inversion/discharge rollers 2901 are rotated at the speed $V_{24}$. Thereafter, in the same manner as image reading of the first side, the driven roller 2901a is rotated counterclockwise at the speed $V_{25}$.

When the trailing edge of the document $D_1$ has passed the registration sensor SE2, the presence of a document on the tray 2101 is checked. If there are no documents on the tray 2101, when the trailing edge of the document $D_1$ passes the reading position 190, the speed of the read rollers 2201 and 2203 is changed to $V_{23}$, and the speed of the inversion/discharge rollers 2901 is changed to $V_{25}$. Then, the document $D_1$ is transported to the circular path 2905 with its leading edge trailing in the same manner as described above (see FIG. 37e). When the leading edge of the document $D_1$ reaches the registration sensor SE2, the read rollers 2201 and 2203 are rotated at the speed $V_{23}$, and the document $D_1$ is transported to pass through the reading section 2200 without being subjected to image reading. Then, when the leading edge of the document $D_1$ reaches the inversion/discharge rollers 2901, the driven roller 2901a is switched to counterclockwise rotation at the speed $V_{25}$. Further, a specified time after the trailing edge of the document $D_1$ passes the before-inversion sensor SE21, the speed of the inversion/discharge rollers 2901 is lowered to $V_{26}$ for discharge of the document $D_1$ onto the tray 2903 (see FIG. 37f).

On the other hand, if the presence of a second document $D_2$ on the tray 2101 is judged when the trailing edge of the first document $D_1$ passes the registration sensor SE2 during image reading of its second side, feeding of the second document $D_2$ toward the first read rollers 2201 is started in the same manner as described above. Then, when the trailing edge of the first document $D_1$ passes the reading position 190, the read rollers 2201 and 2203 are stopped to get ready for registration of the second document $D_2$ (see FIG. 38e). At that time, the inversion/discharge rollers 2901 are stopped.

Figure 38F:
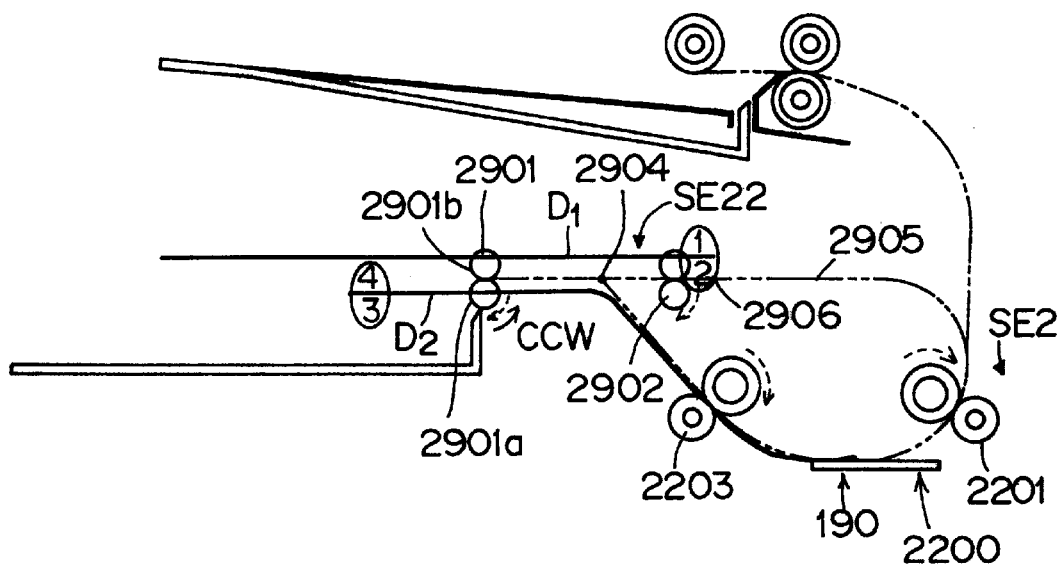
Figure 38I:
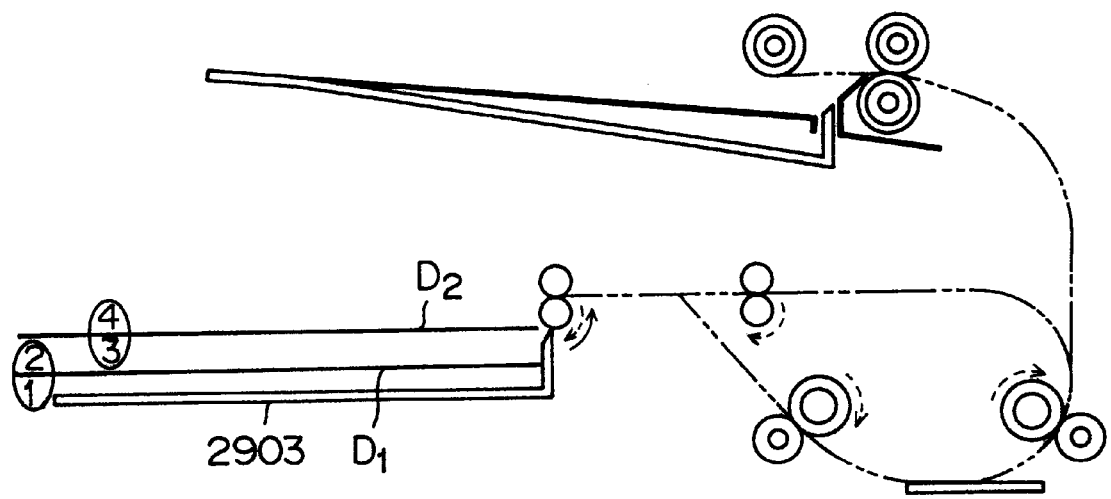

Next, the read rollers 2201 and 2203 are rotated at the speed $V_{22}$ for image reading of the first side of the second document $D_2$, and simultaneously, the driven roller 2901a is rotated counterclockwise at the speed $V_{24}$. Thereafter, the first document $D_1$ makes a switchback and is transported into the circular path 2905. When the leading edge of the document $D_1$ reaches the holding position 2906, the holding rollers 2902 and the inversion/discharge rollers 2901 are stopped temporarily. Then, when the leading edge of the second document $D_2$ reaches the inversion/discharge rollers 2901, the driven roller 2901a is rotated counterclockwise at the speed $V_{24}$. In this moment, the first document $D_1$ is still nipped between the inversion/discharge rollers 2901 as shown in FIG. 38f. However, because the nipping force of the holding rollers 2902 is larger than the transport force of the inversion/discharge rollers 2901, the first document $D_1$ is held by the holding rollers 2902 and stays in the position in spite of the counterclockwise rotation of the driven roller 2901a. Meanwhile, the second document $D_2$ is transported to the left by the driven roller 2901a passing the first document $D_1$.

When the trailing edge of the second document $D_2$ passes the reading position 190, the holding rollers 2902 are rotated at the speed $V_{25}$, whereby the first document $D_1$ is transported toward the reading section 2200. Meanwhile, the second document $D_2$ is transported in the opposite direction to the first document $D_1$ until its trailing edge comes to the inverting position 2904. Because the coefficient of friction between the driven roller 2901a and the second document $D_2$ is larger than that between the documents $D_1$ and $D_2$, the documents $D_1$ and $D_2$ are transported in the opposite direction respectively in accordance with the rotation of the holding rollers 2902 and the rotation of the driven roller 2901a. The follower roller 2901b rotates counterclockwise until the trailing edge of the first document $D_1$ passes thereby, and thereafter, the follower roller 2901b comes into contact with the second document $D_2$ and rotates clockwise. When the trailing edge of the second document $D_2$ passed the reading position 190, the speed of the read rollers 2201 and 2203 was changed to $V_{23}$, and the speed of the driven roller 2901a was changed to $V_{25}$.

Next, when the leading edge of the first document $D_1$ reaches the registration sensor SE2, the read rollers 2201 and 2203 are rotated at the speed $V_{23}$, whereby the first document $D_1$ passes through the reading section 2200 without being subjected to image reading. When the trailing edge of the second document $D_2$ passes the inverting position 2904, the driven roller 2901a is switched and set for clockwise rotation. Immediately if the trailing edge of the document $D_1$ has passed the after-inversion sensor SE22, or after waiting for the passage if not, transport of the second document $D_2$ into the circular path 2905 is started.

When the trailing edge of the first document $D_1$ passes the first read rollers 2201, the read rollers 2201 and 2203 are stopped. The stop of rotation of the rollers 2201 and 2203 is timed based on detection of the trailing edge of the document $D_2$ by the registration sensor SE2. Then, the leading edge of the second document $D_2$ comes to the first read rollers 2201 and is registered (see FIG. 38g). For this registration, the distance Lk between the inverting position 2904 and the after-inversion sensor SE22 is larger than the amount of a bend made by the registration.

Subsequently, the read rollers 2201 and 2203 are rotated at the speed $V_{22}$. Thereby, the second side of the second document $D_2$ is subjected to image reading, and the first document $D_1$ is discharged onto the tray 2903 (see FIG. 38h). When the trailing edge of the second document $D_2$ passes the registration sensor SE2, the presence of documents on the tray 2101 is checked, and the above-described motions are repeated.

Next, the efficiency of image reading in the above-described operation is studied.

The time Ta from the start of feeding of the first document to the completion of feeding and registration of the second document at the first read rollers 2201 is expressed as follows.

$$Ta = \{(La + Lb + Ln)/V_{11} + \{(Lp + Le)/V_{12}\} + \qquad (19)$$
$$\{(Lf + Lg)/V_{23}\} + \{(Lj + Ll + Lm + Ln)/V_{23}\} +$$
$$\{Lp - Ld)/V_{22}\} + \{La + Lb + Ln)/V_{11}\}$$

Lp: length of the documents

Ln: amount of a bend made by the registration

The time Tb from the completion of registration of the second document to the completion of feeding and registration of the third document is expressed as follows.

$$Tb = \{(Lp + Le)/V_{22}\} + \{(Lf + Lg)/V_{23}\} + \qquad (20)$$
$$[\{(Lm + Lp) - (Lj + Ll - Lk)\}/V_{23}\}] -$$
$$\{(Lf + Lg)/V_{23}\} + \{(Lj + Ll + Lm + Ln)/V_{23}\} +$$
$$\{(Lp - Ld)/V_{22}\} + \{(La + Lb + Ln)/V_{11}\}$$

The time indicated by the third term and the fourth term in the right side of the expression (20) means the time from the arrival of the trailing edge of the second document at the inverting position 2904 to the passage of the trailing edge of the first document by the after-inversion sensor SE22. For registration of the second document before image reading of its second side, the start of transport of the second document into the circular path 2905 is delayed. However, if the calculated value of the third term and the fourth term is a minus quantity (third term<fourth term), it means that the trailing edge of the first document passed the registration sensor SE2 before the trailing edge of the second document reaches the inverting position 2904. In this case, the calculated value of the third term and the fourth term is regarded as zero.

From the above expressions (19) and (20), the time Tn required for handling n($\geq$2) documents is expressed as follows.

$$Tn = Ta + Tb(n-1) \qquad (21)$$

For comparison, the efficiency of a conventional type document feeder is studied. The conventional type is one wherein a duplex document is inverted twice (passes through the reading section three times) and after the third passage through the reading section, feeding of the next document is started. In the conventional type, the time Tc from the start of feeding of the first document to the completion of registration of the first document is expressed as follows.

$$Tc = (La + Lb + Ln)/V_{11} \qquad (22)$$

The time Td from the completion of registration of the first document to the completion of feeding and registration of the second document is expressed as follows.

$$Td = (Lp + Le)/V_{12} + (Lf + Lg)/V_{13} + \qquad (23)$$
$$(Lj + Ll + Lm + Ln)/V_{13} + (Lp + Le)/V_{12} +$$
$$(Lf + Lg)/V_{13} + (Lj + Ll + Lm)/V_{13} +$$
$$(Lp - Ld)/V_{13} + (La + Lb + Ln)/V_{11}$$

From the expressions (22) and (23), the time Tn required for handling n($\geq$2) documents is expressed by the following expression (24), and it is apparent that it takes much more time in the conventional type than in the third embodiment.

$$Tn = Tc + Td \cdot n \qquad (24)$$

FIG. 39 is a graph which shows the relationship between the number of imaged sides to be read and the handling time. In the first, second and third embodiments of the present invention, the handling time is shorter than that of the conventional type, and the larger the number of documents, the larger the difference between the conventional type and the respective embodiments.

Fourth Embodiment

Figure 40:
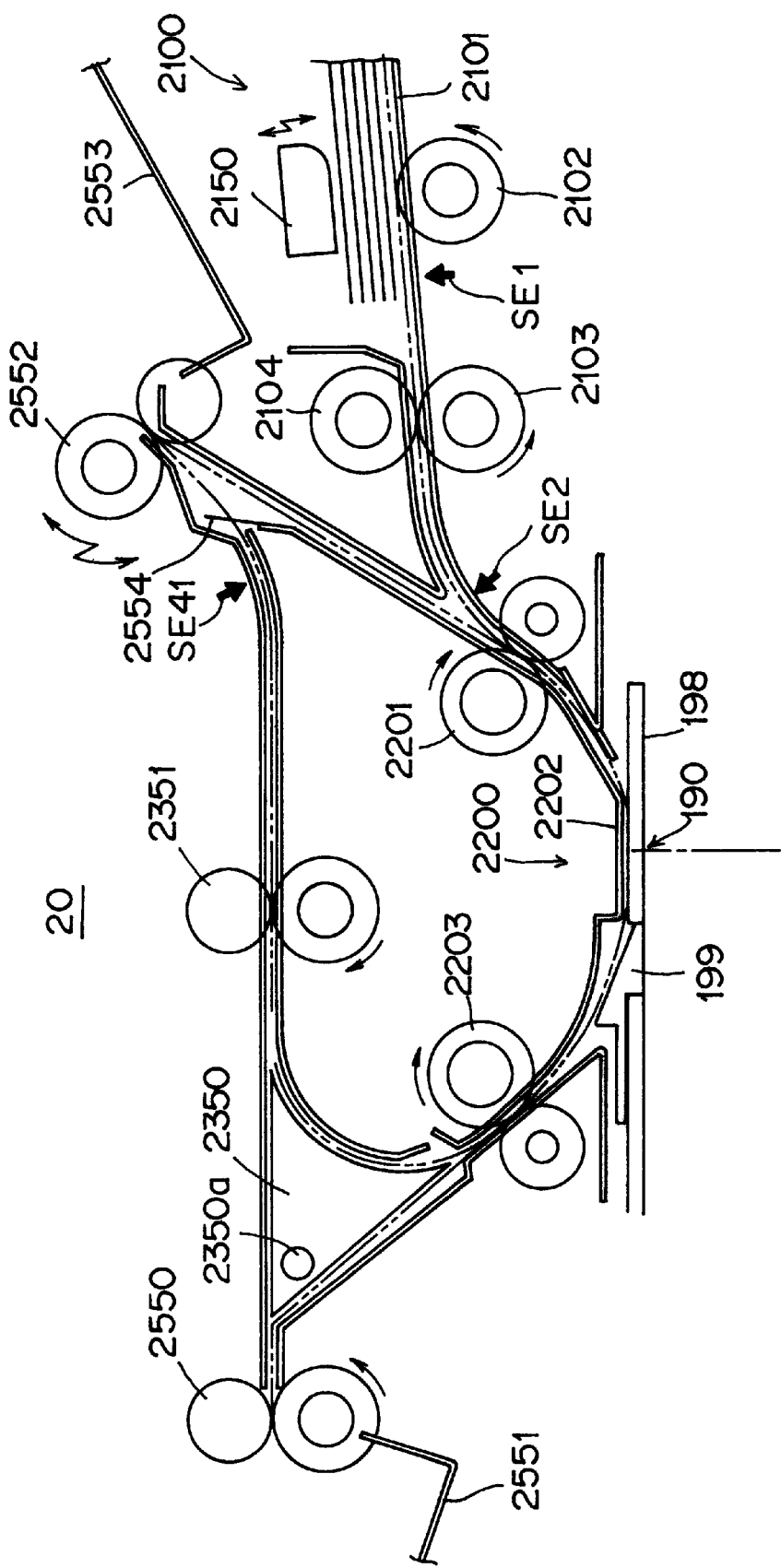
FIG. 40 is a schematic view of a document feeder which is a fourth embodiment of the present invention.

FIG. 40 shows the structure and the arrangement of the members of the fourth embodiment. The members which have the same functions as those of the first embodiment are provided with the same reference symbols as the counterparts in the first embodiment.

A feeding section 2100 comprises a document tray 2101, a pick-up roller 2102, a feed roller 2103, a separation rollers 2104, a weight plate 2150, etc. Documents are set on the tray 2101 with the first page facing down, and the documents are fed to the left one by one with the bottom one first. The weight plate 2150 is initially in an upper retreating position, and after setting of documents on the tray 2101, the weight plate 2150 comes down in response to a feeding start signal and presses the documents toward the pick-up roller 2102. Then, before the leading edge of the fed document reaches the reading position 190, the weight plate 2150 returns to the retreating position.

A reading section 2200 comprises pairs of read rollers 2201 and 2203, etc.

A first discharging section comprises a pair of discharge rollers 2550, a first discharge tray 2551, etc.

A second discharging section comprises a pair of inversion/discharge rollers 2552, a second discharge tray 2553, a resin film 2554 for prevention of reverse travel. While the inversion/discharge rollers 2552 receives a document of which first side has been subjected to image reading and is transported by a pair of transport rollers 2351, the inversion/discharge rollers 2552 transports the document to the right until the trailing edge of the document passes the resin film 2554. Thereafter, the inversion/discharge rollers 2552 are rotated in reverse to transport the document to the reading section 2200. Further, while the inversion/discharge rollers 2552 receives the document of which second side has been subjected to image reading and is transported by the transport rollers 2351, the inversion/discharge rollers 2552 continues transporting the document to the right to discharge the document onto the second discharge tray 2553.

Operation in the simplex document mode is described. Documents are set on the tray 2101 with the first page facing down. When the feeding start signal is generated, the weight plate 2150 comes down. Subsequently, the pick-up roller 2102 is rotated, and some documents are picked up. Then, the bottom one is separated from the others by the feed roller 2103 and the separation roller 2104 and transported toward the first read rollers 2201. The first read rollers 2201 has stopped, and as in the first through third embodiments, the leading portion of the document is bent at the nip portion of the first read rollers 2201 (registration).

After the registration, the read rollers 2201 and 2203 are rotated, whereby the document is subjected to image reading while passing the reading position 190. Then, the document is discharged onto the first discharge tray 2551 through the discharge rollers 2550. When the trailing edge of the document passes the registration sensor SE2, the presence of a document on the tray 2101 is checked by the empty sensor SE1. If there is a second document on the tray 2101, feeding of the second document is carried out. When the trailing edge of the first document passes the reading position 190, the read rollers 2201 and 2203 are stopped to get ready for registration of the second document.

On the completion of registration of the second document, the read rollers 2201 and 2203 are rotated again, whereby the first document is discharged onto the first discharge tray 2551 through the discharge rollers 2550. When the trailing edge of the second document passes the registration sensor SE2, the presence of a document on the tray 2101 is checked. If there is a third document, the above-described motions are repeated. Each simplex document is discharged onto the first discharge tray 2551 with its imaged side facing down, and all the documents are stacked on the first discharge tray 2551 as they were set on the tray 2101.

Operation in the duplex document mode is described. A first document is fed and registered in the same manner as in the simplex document mode. After the registration, a diverter 2350 pivots on a shaft 2350a and is set in a position slightly clockwise from the position shown by the solid line in FIG. 40. Further, the read rollers 2201 and 2203 are rotated, whereby image reading of the first side of the first document is carried out. Then, the document is guided by the curved surface of the diverter 2350 to the transport rollers 2351 while being inverted, and further the document is transported toward the inversion/discharge rollers 2552. When the trailing edge of the document passes the reading position 190, the rollers 2203, 2351 and 2552 are accelerated, and when the trailing edge of the document passes the resin film 2554, the inversion/discharge rollers are rotated in reverse. Thereby, the document is transported toward the first read rollers 2201 with its leading edge trailing. The first read rollers 2201 have stopped, and the document is registered.

Subsequently, the read rollers 2201 and 2203 are rotated, whereby the second side of the document is subjected to image reading. The document is guided by the curved surface of the diverter 2350 and is transported by the transport rollers 2351 and the inversion/discharge rollers 2552 to be discharged onto the second discharge tray 2553 with its first side facing down.

When the trailing edge of the document passes the registration sensor SE2 during image reading of the second side, the presence of a document on the tray 2101 is checked by the empty sensor SE1. If there is a second document, in the same manner as in the simplex document mode, feeding of the second document is started. When the trailing edge of the first document passes the reading position 190, the read rollers 2201 and 2203 are stopped to get ready for registration of the second document.

The above-described motions are repeated toward the documents set on the tray 2101, and all the duplex documents are stacked on the second discharge tray 2553 as they were set on the tray 2101.

Other Embodiments

Transport of a document in the reading section 2200 can be carried out by not only the read rollers 2201 and 2203 provided before and after the reading position 190 but also rollers provided on the slit glass 198 or by a combination of the read rollers 2201 and 2203 and rollers on the slit glass 198.

Although the present invention has been described in connection with the preferred embodiments above, it is to be noted that various changes and variations are possible to those who are skilled in the art. Such changes and modifications are to be understood as being within the scope of the present invention.

What is claimed is:

1. A document feeder comprising:

image reading means which is parked at a position near a reading position;

feeding means for feeding a document;

first transporting means for transporting the fed document toward the reading position;

second transporting means for transporting the document on the reading position at a constant speed, said second transporting means being located at least partially upstream of said image reading means with respect to the direction of document transport;

a document sensor which is located between the first transporting means and the second transporting means; and starting means for, when the document sensor detects a trailing edge of the document, starting feeding of a next document.

2. A document feeder comprising:

image reading means which is parked at a position near a reading position;

feeding means for feeding a document;

a transport roller for transporting the fed document toward the reading position;

a first roller and a second roller which are located immediately before the reading position and immediately after the reading position, respectively, the first roller and the second roller transporting the document on the reading position at a same speed;

a document sensor which is located between the transport roller and the first roller;

stopping means for stopping the first roller when a trailing edge of the document passes the reading position; and starting means for, when the document sensor detects the trailing edge of the document, starting feeding of a next document.

3. A document feeder as claimed in claim 2, wherein the following condition is fulfilled:

$$L_A/V_A < L_B/V_B$$

wherein, $L_A$ is a distance between the document sensor and the reading position, $V_A$ is a transport speed of the first roller and the second roller, $L_B$ is a distance between the transport roller and the first roller, and $V_B$ is a transport speed of the transport roller.

4. A document feeder as claimed in claim 3, wherein the following condition is further fulfilled:

$$L_C/V_B < L_A/V_A$$

wherein, $L_A$ is the distance between the document sensor and the reading position, $V_A$ is the transport speed of the first roller and the second roller, $L_C$ is a distance between the transport roller and the document sensor, and $V_B$ is the transport speed of the transport roller.

5. A document feeder comprising:

image reading means which is parked at a position near a reading position;

feeding means for feeding a document;

transporting means for transporting the document on the reading position at a constant speed;

a circular inversion path which enables the image reading means to read images on both sides of a document, the circular inversion path including the reading position; and control means for, while a document, which has passed the reading position once and has been transported to the reading position via the circular inversion path, is passing the reading position for the second time, starting feeding of a next document before a trailing edge of the document passes the reading position.

6. A document feeder as claimed in claim 5, further comprising:

a document sensor which is located immediately before the reading position, wherein, while a foregoing document is passing the reading position for the second time, the control means starts feeding of a next document when a trailing edge of the foregoing document is detected by the document sensor.

7. A document feeder comprising:

a document transporter operable to transport a document across a reading position at a constant speed, the document transporter including a first roller and a second roller, said reading position being located between said first roller and said second roller;

a document feeder for feeding the document to said document transporter, said document transporter being located at least partially between said document feeder and said reading position;

a document sensor located between said reading position and said document feeder;

a stopping device for stopping said first roller when the trailing edge of the document passes said reading position; and a starting device for starting feeding of a next document when the document sensor detects a trailing edge of the document.

8. A document feeder comprising:

a document transporter operable to transport a document across a reading position at a constant speed;

a document feeder for feeding the document to said document transporter, said document transporter being located at least partially between said document feeder and said reading position;

a document sensor located between said reading position and said document feeder;

a starting device for starting feeding of a next document when the document sensor detects a trailing edge of the document; and a circular inversion path.

* * * * *